United States Patent
Fujita et al.

(10) Patent No.: US 11,946,773 B2
(45) Date of Patent: Apr. 2, 2024

(54) MOTOR ROTATION AND POSITION DETECTION DEVICE AND CONTROL UNIT

(71) Applicant: DENSO CORPORATION, Kariya (JP)

(72) Inventors: Toshihiro Fujita, Kariya (JP); Nao Uematsu, Kariya (JP); Katsuhiko Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 649 days.

(21) Appl. No.: 16/823,771

(22) Filed: Mar. 19, 2020

(65) Prior Publication Data
US 2020/0309566 A1   Oct. 1, 2020

(30) Foreign Application Priority Data

Mar. 28, 2019 (JP) ................. 2019-062419
Feb. 10, 2020 (JP) ................. 2020-020475
Feb. 10, 2020 (JP) ................. 2020-020548

(51) Int. Cl.
*G01D 5/14* (2006.01)
*G01L 5/00* (2006.01)

(52) U.S. Cl.
CPC .............. *G01D 5/14* (2013.01); *G01L 5/0042* (2013.01)

(58) Field of Classification Search
CPC ................................ G01D 5/14; G01L 5/0042
See application file for complete search history.

(56) References Cited

U.S. PATENT DOCUMENTS

| | | | |
|---|---|---|---|
| 9,528,856 B2 * | 12/2016 | Gehringer | G01D 5/145 |
| 9,843,241 B2 * | 12/2017 | Yoshidomi | H02K 11/215 |
| 2008/0157705 A1 | 7/2008 | Sasaki et al. | |
| 2009/0140731 A1 | 6/2009 | Miyashita et al. | |
| 2010/0194385 A1 | 8/2010 | Ronnat et al. | |
| 2015/0239501 A1 | 8/2015 | Fujita et al. | |
| 2016/0153850 A1 | 6/2016 | Takahashi et al. | |
| 2016/0231142 A1 | 8/2016 | Kawano et al. | |
| 2017/0291640 A1 * | 10/2017 | Fujita | G01D 5/14 |
| 2018/0216965 A1 | 8/2018 | Richard et al. | |

(Continued)

FOREIGN PATENT DOCUMENTS

| | | |
|---|---|---|
| JP | S62-261016 A | 11/1987 |
| JP | H06-069730 U | 9/1994 |
| JP | H09-101175 A | 4/1997 |

(Continued)

*Primary Examiner* — Walter L Lindsay, Jr.
*Assistant Examiner* — Milton Gonzalez
(74) *Attorney, Agent, or Firm* — MASCHOFF BRENNAN

(57) ABSTRACT

A control unit having a detection device that includes: a multi-turn detection unit capable of continuing detection of a rotation position of multiple rotations of a steering shaft driven by a motor without power supply from outside; a position detector detecting the rotation position in one rotation of the rotor; a count calculator calculating multiple rotation position information related to the rotation position of multiple rotations based on a detection value of the multi-turn detection unit; and an angle calculator calculating a motor rotation angle related to the rotation position in one rotation based on a detection value of the position detector. The multi-turn detection unit is disposed at a position different from the motor, thereby detection of the rotation position of multiple rotations is continuable even when a supply of electric power from outside is interrupted.

20 Claims, 37 Drawing Sheets

(56) References Cited

U.S. PATENT DOCUMENTS

2019/0152524 A1    5/2019  Fujita et al.
2019/0242764 A1*   8/2019  Nicholl .............. B62D 15/0215

FOREIGN PATENT DOCUMENTS

| JP | 09292264 A | * | 11/1997 |
| JP | 2001-289671 A | | 10/2001 |
| JP | 2009222576 A | * | 10/2009 |
| JP | 2016-102671 A | | 6/2016 |
| JP | 5958572 A | | 8/2016 |
| JP | 6095845 B2 | | 3/2017 |
| JP | 2017-191092 A | | 10/2017 |
| JP | 2017-191093 A | | 10/2017 |

* cited by examiner

FIG. 8

| (1) $\theta a\_A, \theta a\_B$ | ○ | × | ○ | × | ○ | × | ○ | × |
|---|---|---|---|---|---|---|---|---|
| (2) $\theta a\_A, \theta a\_C$ | ○ | ○ | × | × | ○ | ○ | × | × |
| (3) $\theta a\_B, \theta a\_C$ | ○ | ○ | ○ | ○ | × | × | × | × |
| ABNORMALITY IDENTIFIED | — | — | — | $\theta a\_A$ | — | $\theta a\_B$ | $\theta a\_C$ | — |

# MOTOR ROTATION AND POSITION DETECTION DEVICE AND CONTROL UNIT

CROSS REFERENCE TO RELATED APPLICATION

The present application is based on and claims the benefit of priority of Japanese Patent Applications No. 2019-062419, filed on Mar. 28, 2019, and No. 2020-020475, filed on Feb. 10, 2020, and No. 2020-020548, filed on Feb. 10, 2020, the disclosure of which are incorporated herein by reference.

TECHNICAL FIELD

The present disclosure relates to a detection device and a control unit.

BACKGROUND INFORMATION

The related art includes a rotation angle detection device that detects a rotation angle of a motor. In the related art, a steering angle is calculated based on a rotation angle, the number of rotations, a gear ratio of the motor and the steering shaft, and the like by continuing the calculation of the number of rotations even during a switch-off period of the ignition switch.

Since the number of rotations is an integrated value of motor rotation, it is necessary to continue detection even when the vehicle is stopped. Therefore, power supply to the rotation angle detection device is continued even while the ignition switch is being turned off. As such, there is a possibility that the battery may run out due to the power consumption while the ignition switch is being turned off.

SUMMARY

It is an object of the present disclosure to provide a detection device and a control unit capable of appropriately detecting a rotation position of a plurality of rotations even when power supply is interrupted.

BRIEF DESCRIPTION OF THE DRAWINGS

Objects, features, and advantages of the present disclosure will become more apparent from the following detailed description made with reference to the accompanying drawings, in which:

FIG. 8 is an explanatory diagram of how abnormality is identified according to the third and a seventeenth embodiment;

DETAILED DESCRIPTION

Hereinafter, a detection device and a control unit according to the present disclosure is described based on the drawings. In the following plural embodiments, substantially same structural configurations are designated with the same reference numbers thereby to simplify the description.

First Embodiment

Figure 1:
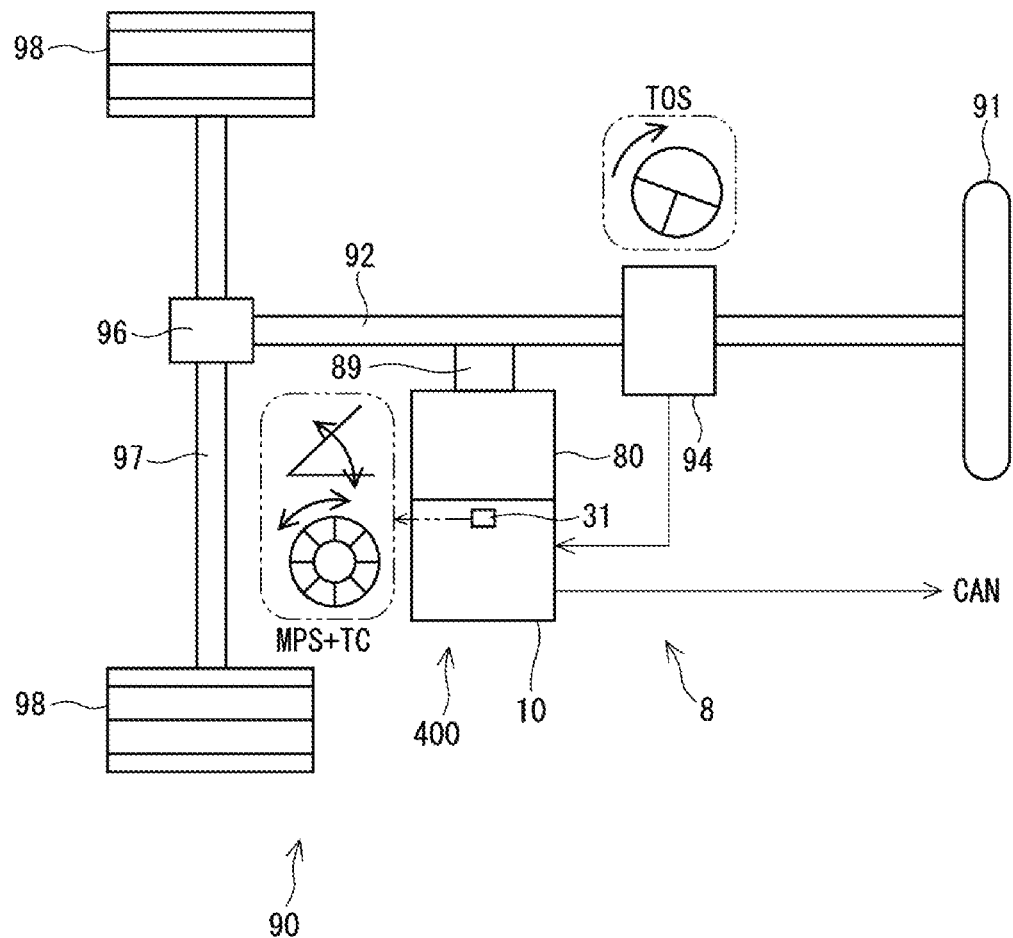
FIG. 1 is a schematic configuration diagram of a steering system according to a first embodiment.

The detection device and the control unit according to the first embodiment are shown in FIGS. 1 to 4. As shown in FIG. 1, an electronic control unit, or ECU, 10 as a detection unit is applied to an electric power steering apparatus 8 for assisting a steering operation of a vehicle together with a motor which is a rotating electric machine. FIG. 1 shows an overall configuration of a steering system 90 including the electric power steering apparatus 8. The steering system 90 includes a steering wheel 91, a steering shaft 92, a pinion gear 96, a rack shaft 97, road wheels 98, the electric power steering apparatus 8 and the like.

The steering wheel 91 is connected to the steering shaft 92. A torque sensor 94 is provided on the steering shaft 92 to detect a steering torque.

The pinion gear 96 is provided at an axial end of the steering shaft 92. The pinion gear 96 engages with the rack shaft 97. A pair of road wheels 98 a coupled with both ends of the rack shaft 97 via, for example, tie rods. When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 are steered to an angle corresponding to the displacement amount of the rack shaft 97.

The electric power steering apparatus 8 includes a drive device 400, which includes the motor 80 and the ECU 10, and includes a speed-reduction gear 89 or the like as a power transmission mechanism that reduces the rotation speed of the motor 80 and transmits the rotation to the steering shaft 92. The electric power steering apparatus 8 of the present embodiment is a column assist type. However, the electric power steering apparatus may alternatively be a rack assist type that transmits the rotation of the motor 80 to the rack shaft 97. In the present embodiment, the steering shaft 92 is a driven object. Assuming that a mechanical portion from the steering wheel 91 to the road wheels 98 is a "steering system," the speed-reduction gear 89 can be designated as a member connecting the motor 80 and the steering system.

Figure 2:
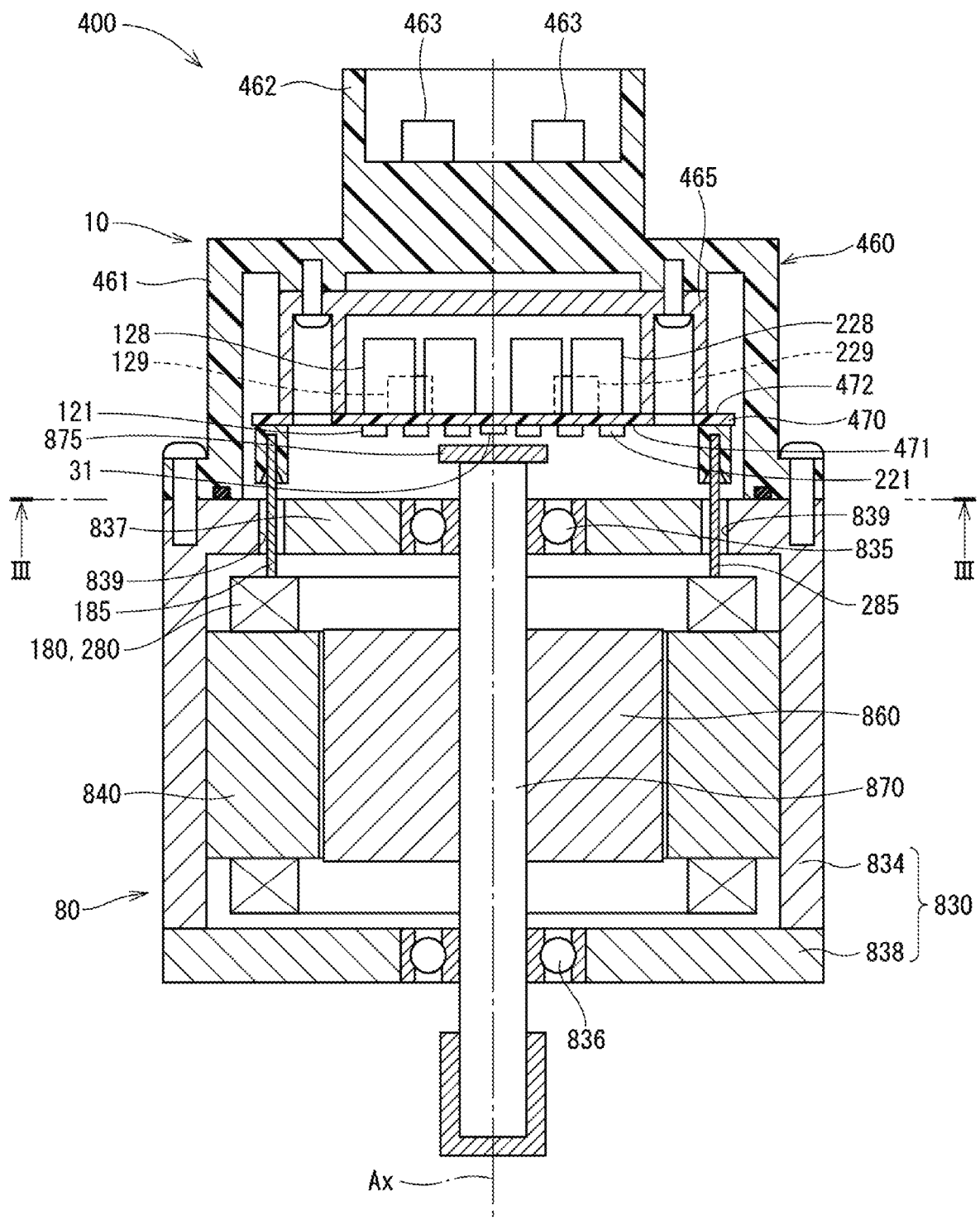
FIG. 2 is a cross-sectional view of a drive device according to the first embodiment.
Figure 3:
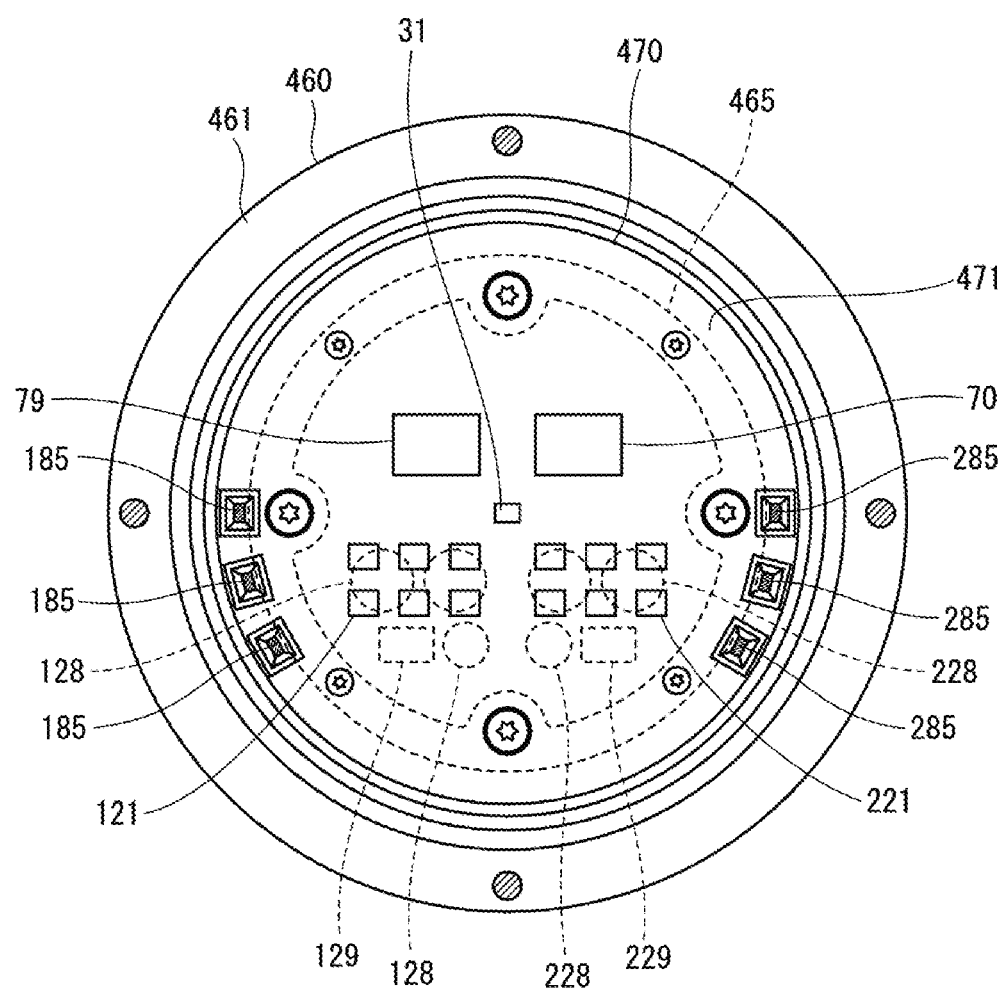
FIG. 3 is a cross-sectional view taken along a line III-Ill in FIG. 2.

As shown in FIGS. 2 and 3, the motor 80 outputs part or all of the torque required for steering operation, for rotating the speed-reduction gear 89 in a forward/backward rotation direction when driven by a supply of electric power from a non-illustrated battery. The motor 80 is a three-phase brushless motor and has a rotor 860 and a stator 840 as shown in FIG. 2.

The motor 80 has a first motor winding 180 and a second motor winding 280 respectively as a set of winding wire. The motor windings 180 and 280 have the same electrical characteristics, and are cancel-wound around the common stator 840 with a shift of an electric angle of 30 [deg] from each other. Correspondingly, phase currents are controllably supplied to the motor windings 180 and 280 such that the phase currents have a phase difference φ of 30 degrees. By optimizing a current supply phase difference, the output torque is improved. It is also possible to reduce sixth-order torque ripple. Further, it is possible to maximize advantages of cancellation of noise and vibration since the electric current is averaged among the motor windings by the current supply with such phase difference. Heat generation is also averaged among the motor windings (i.e., among two systems of motor winding and other components). Therefore, it is also possible to reduce temperature-dependent inter-system errors in detection values of each sensor or torque between the systems, and it is further possible to average the suppliable amount of electric current. The electrical characteristics of motor windings 180 and 280 may be different from each other.

Hereinafter, the configuration of the first drive circuit 120 and the like related to the drive control of the first motor winding 180 is referred to as a first system L1, and the configuration of the second drive circuit 220 and the like related to the drive control of the second motor winding 280 is described as a second system L2. The configuration related to the first system L1 is basically assigned with reference numbers of 100, and the configuration related to the second system L2 is basically indicated with reference numbers of 200. Further, in the first system L1 and the second system L2, same or similar configuration is indicated with same reference numbers in the least significant two digits. For the other configuration described below, the term "first" is indicated with a suffix "1," and the term "second" is indicated with a suffix "2" and description may be omitted as appropriate.

In the drive device 40, the ECU 10 is integrally provided on one side in an axial direction of the motor 80. That is, the drive device 40 is provided as a mechanism-circuitry integrated type. The motor 80 and the ECU 10 may alternatively be disposed separately. The ECU 10 is disposed coaxially with an axis Ax of a shaft 870 on one side opposite to the output shaft of the motor 80. The ECU 10 may alternatively be disposed on an output shaft side of the motor 80. By adopting the mechanism-circuitry integrated type configuration, an efficient arrangement of the ECU 10 and the motor 80 is enabled in a restricted installation space of the vehicle.

The motor 80 includes the stator 840, the rotor 860 and a housing 830 which houses the stator 840 and the rotor 860 therein. The stator 840 is fixed to the housing 830 and the motor windings 180 and 280 are wound thereon. The rotor 860 is provided radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. An end portion of the shaft 870 on the ECU 10 side protrudes from the housing 830 toward the ECU 10. A magnet 875 is provided at an axial end of the shaft 870 on the ECU 10 side. The center of the magnet 875 is disposed on the axis Ax.

The housing 830 includes a bottomed cylindrical case 834, which has a rear frame end 837, and a front frame end 838 provided on an open side of the case 834. The case 834 and the front end frame 838 and are fastened to each other by bolts or the like. Lead wire insertion holes 839 are formed in the rear frame end 837. Lead wires 185 and 285 connected to each phase of the motor windings 180 and 280 are inserted through the lead wire insertion holes 839. The lead wires 185 and 285 are taken out from the lead wire insertion holes 839 toward the ECU 10, and are connected to a circuit board 470.

The ECU 10 includes a cover 460, a heat sink 465 fixed to the cover 460, the circuit board 470 fixed to the heat sink 465, and other electronic components mounted on the circuit board 470.

The cover 460 is provided to protect the electronic components from external impacts and to prevent dust and water from entering into the ECU 10.

In the cover 460, a cover main body 461 and a connector member 462 are integrally formed. Note that the connector member 462 may alternatively be separated from the cover main body 461. Terminals 463 of the connector member 462 are connected to the circuit board 470 via a wiring (not shown) or the like. The number of connectors and the number of terminals are changeable as appropriate depending on the number of signals or the like. The connector member 462 is provided at an end portion in the axial direction of the drive device 400, and is open on one side opposite to the motor 80.

The circuit board 470 is, for example, a printed circuit board, and is positioned to face the rear frame end 837. On the circuit board 470, electronic components for two systems are mounted in two regions separately for each system. Note that, in the present embodiment, electronic components sharingly used by both systems, e.g., a control unit 70, are implemented on one circuit board 470. However, electronic components may also be implemented on a plurality of circuit boards.

Of the two principal surfaces of the circuit board 470, one surface on the side of the motor 80 is referred to as a motor-side surface 471 and the other surface opposite from the motor 80 is referred to as a cover-side surface 472. As shown in FIG. 3, on the motor-side surface 471, a switching element 121 constituting the drive circuit 120, a switching element 221 constituting the drive circuit 220, a rotation angle sensor 31 as a detection device, and a microcomputer and a custom IC 79 or the like constituting the control unit 70 are implemented. In FIG. 3, 70 is numbered about the microcomputer which comprises the control unit 70. At least one of the custom IC 79 and the control unit 70 may be provided on the cover-side surface 472. The rotation angle sensor 876 is mounted at a portion facing the magnet 875 so as to be able to detect change of the magnetic field according to the rotation of the magnet 875.

Capacitors 128 and 228, inductors 129 and 229, etc. are mounted on the cover-side surface 472. Capacitors 128 and 228 smooth the input of electric power from the battery. The capacitors 128 and 228 assist supply of electric power to the motor 80 by storing electric charge therein. The capacitors 128, 228 and the inductors 129, 229 configures filter circuits, respectively, to reduce noises transmitted from other devices which share the battery with the drive device 40, and also to reduce noises transmitted to the other devices, which share the battery, from the drive device 40. It is noted that, power supply relays, motor relays, current sensors, etc. (not shown in the drawings) are also mounted on the motor-side surface 471 or on the cover-side surface 472.

Figure 4:
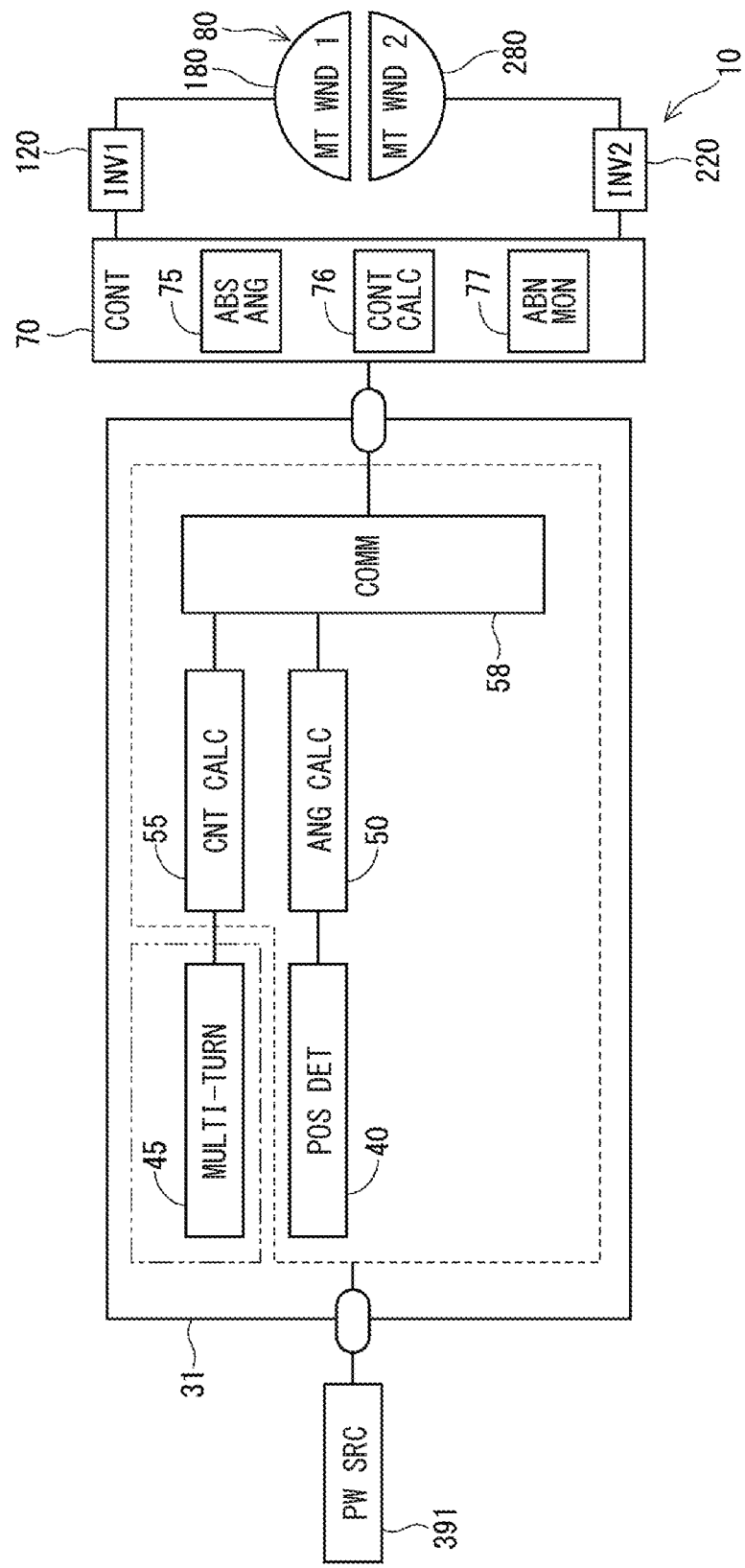
FIG. 4 is a block diagram of an electronic control unit (ECU) according to the first embodiment.

As shown in FIG. 4, the ECU 10 includes the drive circuits 120 and 220, the control unit 70, the rotation angle sensor 31, and the like. In FIG. 4, the driver circuit, which is generally an inverter, is described as "INV." The first driver circuit 120 is a three-phase inverter having six switching elements 121, and converts the electric power supplied to the first motor winding 180. The second driver circuit 220 is a three-phase inverter having six switching elements 221, and converts the electric power supplied to the second motor winding 280. The on/off operation of the switching elements 121 and 221 is controlled based on a control signal output from the control unit 70.

The rotation angle sensor 31 has a position detector 40, a multi-turn detection unit 45, an angle calculator 50, a count calculator 55, and a communication unit 58, and electric power is supplied from a power source 391 when a start switch such as an ignition switch of a vehicle (not shown) is turned on. The power source 391 is, for example, a constant voltage power source such as a regulator. Hereinafter, the start switch is appropriately described as "IG." The position detector 40 detects change in the magnetic field of the magnet 875 according to the rotation of the motor 80, and is, for example, a magneto-resistive element such as an AMR sensor, a TMR sensor, a GMR sensor, a Hall element or the like. Alternatively, inductive sensors or resolvers may also be used.

The multi-turn detection unit 45 is configured to be capable of capturing change in magnetic flux accompanying the rotation of the magnet 875 even without supply of electric power. In other words, the multi-turn detection unit 45 uses a storage method other than electricity (i.e., magnetic storage method in the present embodiment). More specifically, in the multi-turn detection unit 45, the magnetic detection elements are arranged in a helical shape, and the elements initially face a specific magnetic direction. When the magnet 875 rotates, the magnetic detection element changes its magnetic direction sequentially from one end of the spiral shape, and, everytime the rotor 860 makes one complete rotation, a position where the magnetic flux changes outward or inward changes according to the rotation direction of the rotor 860. The magnetic detection element changes its resistance value according to the magnetic direction. Electric power is not required for the change in the magnetic direction of the magnetic detection element. Further, the rotation position of the rotor 860 can be detected by supplying an electric current to the magnetic detection element and by detecting the output therefrom. That is, the multi-turn detection unit 45 does not need electric power when detecting a rotation, and needs electric power when reading the detection value.

The multi-turn detection unit 45 may be a detector capable of detecting a preset number of rotation positions between a rotation starting end and a rotation finishing end, or a detector capable of practically detecting an infinite number of rotation positions by connecting the rotation starting end and the rotation finishing end.

The angle calculator 50 calculates a motor rotation angle θm based on the detection value of the position detector 40 that is AD-converted by an AD conversion unit (not shown). The motor rotation angle θm is a value corresponding to the rotation angle of the rotor 860, and may be any value that is convertible to the rotation angle.

The count calculator 55 calculates a count value TC according to the output of the multi-turn detection unit 45 when the multi-turn detection unit 45 is energized (i.e., receives supply of electric power). The count value TC is counted up or down according to the rotation direction n times (i.e., n is an integer of 1 or more) in one rotation of the rotor 860. When n is 3 or more, the rotation direction is detectable. In the present embodiment, n is set to 4, (i.e., n=4), and counting up or down is performed each time the rotor 860 rotates 90 [deg]. In the present embodiment, the count value TC is counted up when rotating in a forward direction and is counted down when rotating in a backward direction. Further, sampling of the rotation of the rotor 860 is performed at sufficiently short intervals in view of the rotation speed of the rotor 860. In the drawing, a block enclosed by a two-dot chain line is a power-free block that demands no power supply, and a block enclosed by a broken line receives supply of electric power when the IG is turned on.

The communication unit 58 generates an output signal including the motor rotation angle θm and the count value TC, and outputs the output signal to the control unit 70 by digital communication such as SPI communication. The communication method may be a method other than the SPI communication. Further, the motor rotation angle θm and the count value TC may separately be output to the control unit 70. Furthermore, an absolute angle θa may be calculated based on the motor rotation angle θm and the count value TC, and the absolute angle θa may be output to the control unit 70.

The control unit 70 is mainly composed of a microcomputer and the like, and includes a CPU, a ROM, a RAM, an I/O, and a bus line connecting these components, which are not shown in the drawing. Each processing in the control unit 70 may be software processing by executing a program stored in advance in a tangible memory device (that is, a readable, non-transitory, tangible recording medium) such as a ROM by a CPU, or may be hardware processing by using a dedicated electronic circuit. The same applies to control units 170 and 270 according to embodiments described later.

The control unit 70 includes an absolute angle calculator 75, a control calculator 76, an abnormality monitoring unit 77, and the like. The absolute angle calculator 75 calculates the absolute angle θa by using the count value TC and the motor rotation angle θm. The absolute angle θa is a rotation angle from a reference position, and includes multiple rotation position information. The control calculator 76 performs various control calculations by using the information obtained from the rotation angle sensor 31 and the like. In the present embodiment, control calculation related to drive control of the motor 80 is performed by using the information obtained from the rotation angle sensor 31. The abnormality monitoring unit 77 monitors abnormality of the rotation angle sensor 31.

The calculation of the absolute angle θa is shown in an equation (1). INT (TC/n) in the equation (1) means an integer part of a quotient obtained by dividing the count value TC by the count number n per one rotation, and indicates the number of rotations of the motor 80. Note that, if the count value TC and a zero point of the motor rotation angle θm are different, INT (TC/n) is calculated as a wrong number. Therefore, the count value TC may be corrected by a TC correction value TC_c added thereto for the matching with the motor rotation angle θm in terms of the zero point, before being used for the calculation of the INT(TC/n). In such case, the number of rotations is calculable as INT {(TC+TC_c)/n}. The TC correction value TC_c needs to be calculated each time the count value TC is reset, and the TC correction value TC_c is stored in a non-volatile area of the memory. Although the absolute angle calculator 75 is provided in the control unit 70 in an example of FIG. 4, the rotation angle sensor 31 may calculate the absolute angle θa and may output the absolute angle θa to the control unit 70. The same applies to the embodiments described later.

$$\theta a = INT(TC/n) \times 360 + \theta m \quad (1)$$

Figure 16:
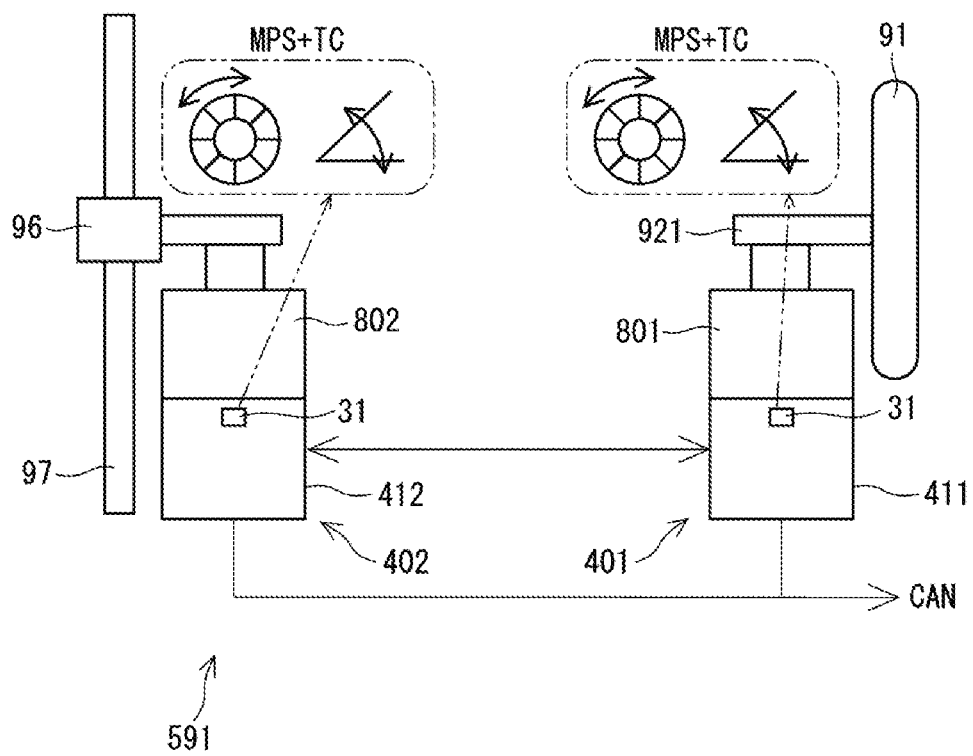
FIG. 16 is a schematic configuration diagram of a steer-by-wire system according to one of the other embodiments.
Figure 17:
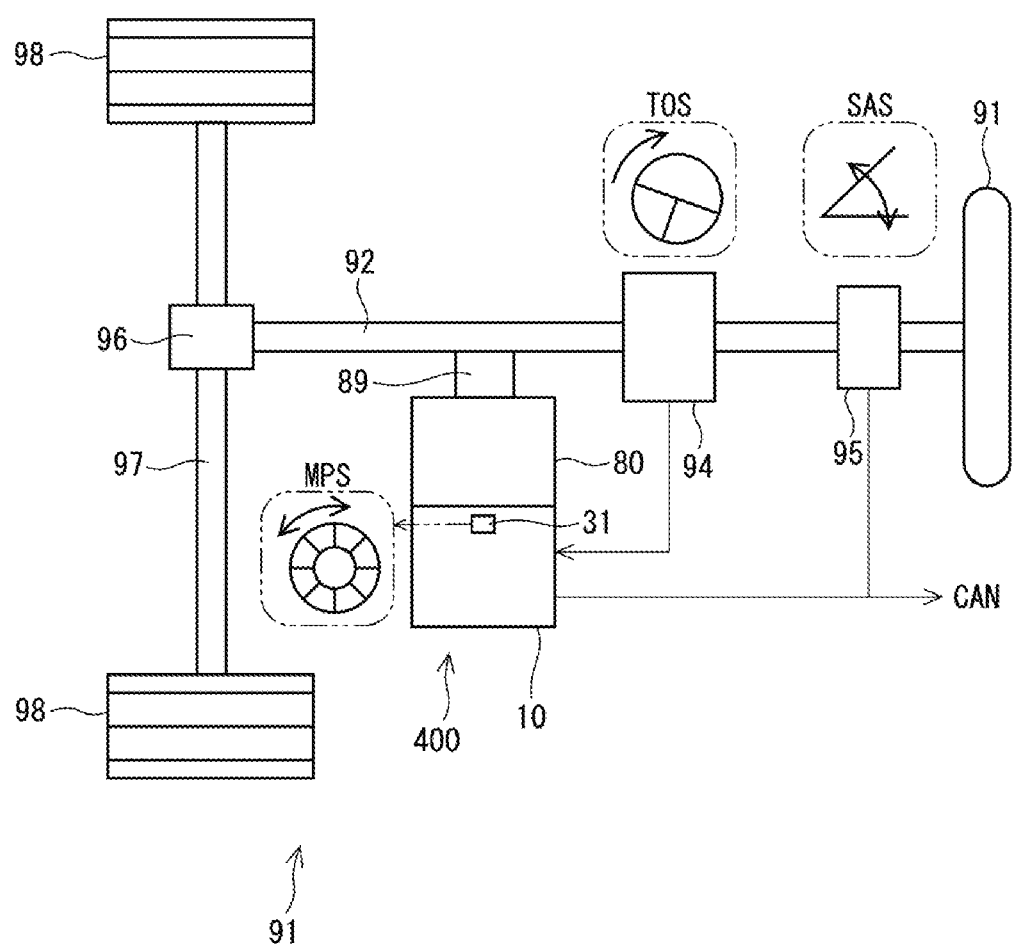
FIG. 17 is a schematic configuration of a steering system provided with a steering sensor.

As shown in FIG. 17, a steering sensor 95 may be provided on the steering shaft 92 in order to detect a steering angle θs which is a rotation angle of the steering wheel 91. In FIGS. 1, 16, 17 and 21, the function of the torque sensor 94 is labeled as "TASTOS," the function of the steering sensor 95 is labeled as "SAS," and the function of the rotation angle sensor 31 is labeled as "MPS," respectively circled by a two-dot chain line.

Figure 18:
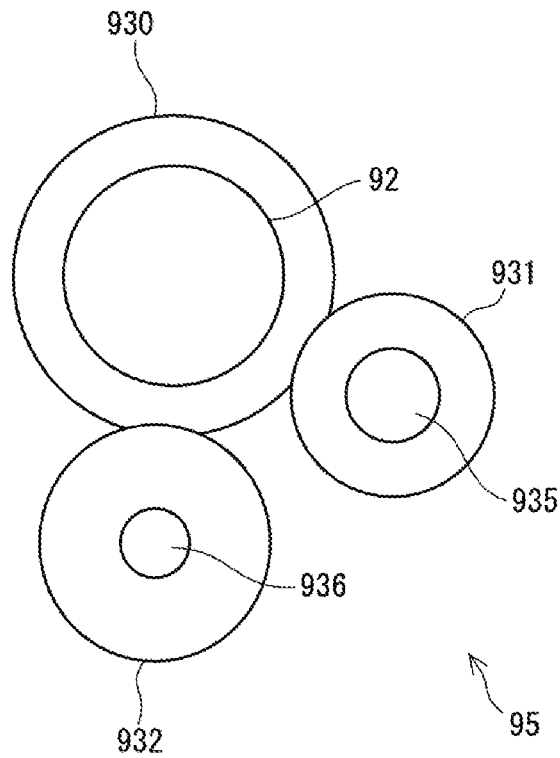
FIG. 18 is a schematic diagram of the steering sensor.

Since the steering wheel 91 rotates by more than one rotation, the steering sensor 95 that detects the steering angle θs is configured to be able to obtain information of a plurality of rotations (i.e., rotation information of 360 [deg] or more). For example, as shown in FIG. 18, the steering sensor 95 includes a rotating portion gear 930, a first gear 931, a second gear 932, and detection magnets 935 and 936. The rotating portion gear 930 is provided on the steering shaft 92 and rotates integrally with the steering wheel 91 and the steering shaft 92. The first gear 931 and the second gear 932 engage with the rotating portion gear 930, and the number of teeth is different from each other. The detection magnets 935 and 936 detect the rotation angles of the gears 931 and 932, respectively. The rotation angle of the first gear 931 is a first gear angle θg1, and the rotation angle of the second gear 932 is a second gear angle θg2.

Figure 19:
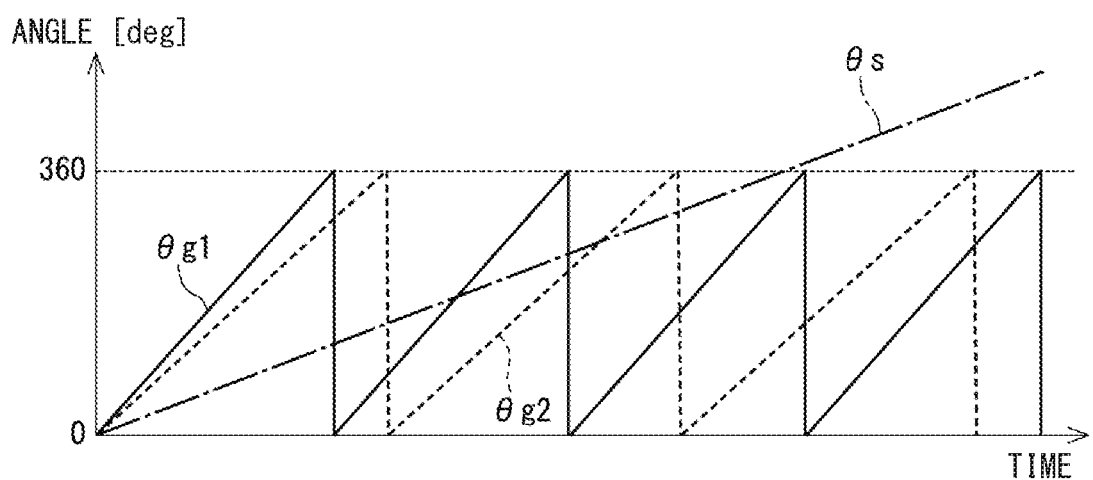
FIG. 19 is a time chart of a gear angle of the steering sensor and a steering angle.

As shown in FIG. 19, since the first gear angle θg1 and the second gear angle θg2 have different cycles, the steering angle θs of 360 [deg] or more is detectable based on the difference between the first gear angle θ1 and the second gear angle θ2.

Figure 20:
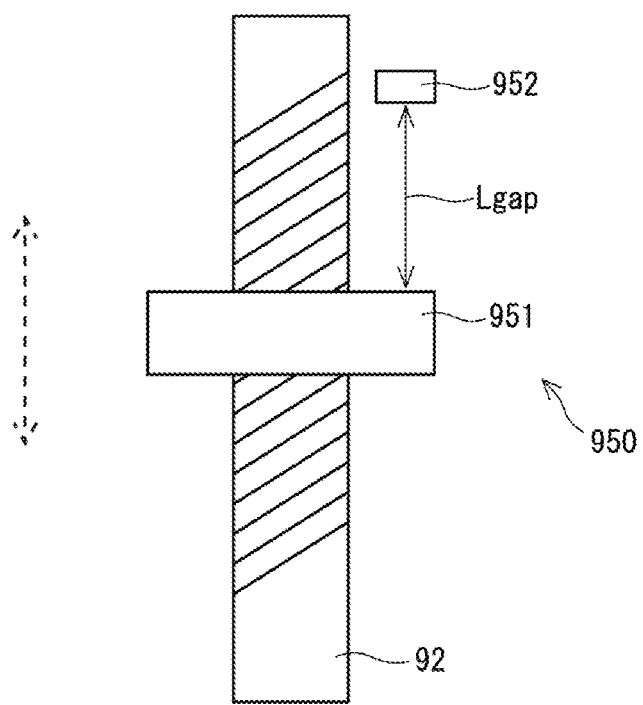
FIG. 20 is another schematic diagram of the steering sensor.
Figure 21:
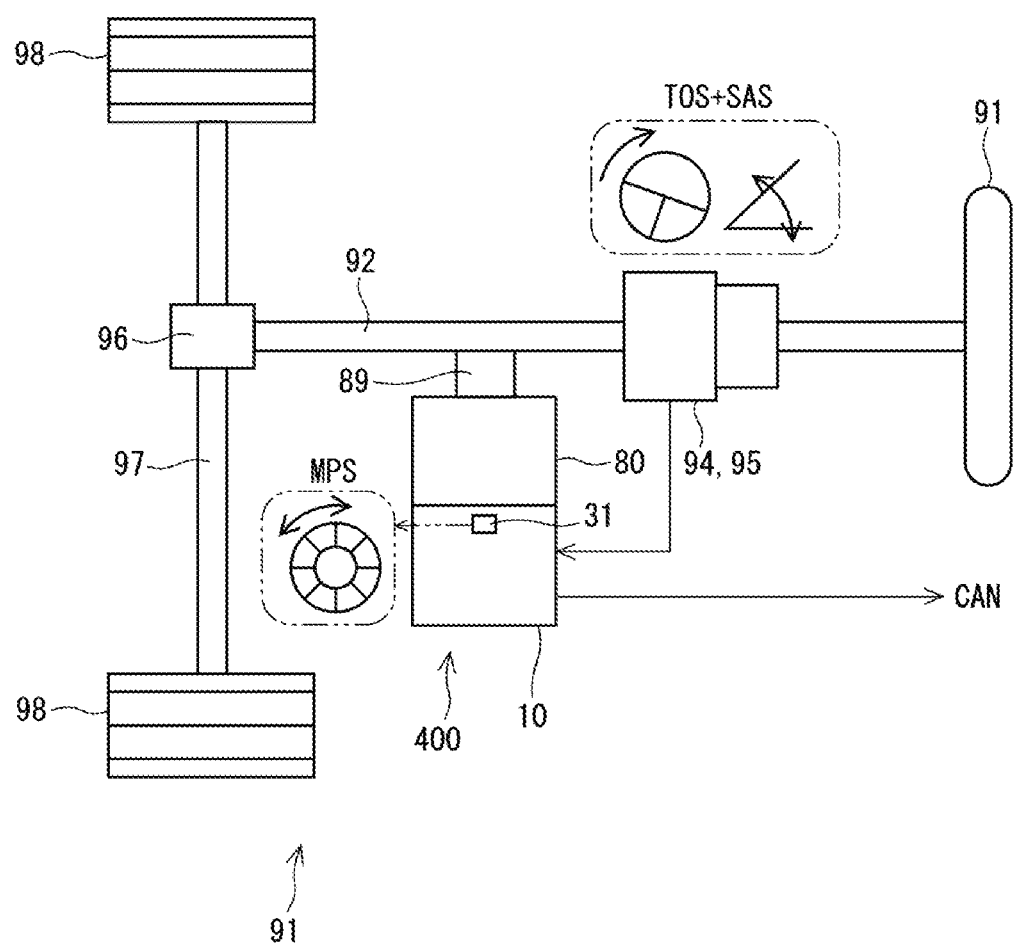
FIG. 21 is a schematic configuration diagram of the steering system in which a torque sensor and the steering sensor are integrated into one body.

Further, a steering sensor 950 shown in FIG. 20 includes a ball screw 951 and a sensor 952. The ball screw 951 is provided on the steering shaft 92 and moves up and down according to the rotation of the steering shaft 92. The sensor 952 measures a gap distance Lgap relative to the ball screw 951, and calculates the steering position from the gap distance Lgap. Here, although an example in which the steering sensor 950 is provided on the steering shaft 92 has been described, measurement can be performed similarly even if the ball screw 951 is provided on the rack shaft 97. However, such steering sensors 95 and 950 have a large number of components and thus have a low detection accuracy.

In addition, by integrating the torque sensor 94 and the steering sensor 95 (see FIG. 21) or by integrating the drive device 400 of the electric power steering apparatus 8 and the steering sensor 95, the functions can be integrated and the size can be reduced. However, even after integration by simply combining the two components, the number of components is still large.

In the present embodiment, as shown in FIGS. 1 and 4, the steering angle θs is calculated from the motor rotation angle θm and the count value TC detected by the rotation angle sensor 31 that detects the rotation of the motor 80 of the electric power steering apparatus 8. (See an equation (2)). Rg in the equation is a gear ratio of a gear (i.e. the speed-reduction gear 89 in the present embodiment) provided in between the motor 80 and the steering wheel 91. In such case, the function may be added to the rotation angle sensor 31, and the steering angle θs can be calculated with a small number of components. Further, since the resolution of the motor rotation angle θm is high, the steering angle θs can be calculated with high accuracy.

$$\theta s = \{INT(TC/n) \times 360 + \theta m\}/Rg = \theta a/Rg \quad (2)$$

In order to calculate the steering angle θs from the information of the rotation angle sensor 31, it is necessary to constantly detect the count value TC. Therefore, when detecting the count value TC with an element requiring electric power, supply of electric power to the rotation angle sensor 31 is required even during the IG-off time. In addition, the steering angle θs cannot be detected until the learning of a neutral position is complete after run out of the battery or after replacement of the battery.

Therefore, in the present embodiment, the multi-turn detection unit 45 is configured to be capable of detecting change of the magnetic field without supply of electric power, and to enable continuation of detecting change of the magnetic field related to the count value TC even while electric power is not supplied. Thus, when the IG is turned on and electric power is supplied to the rotation angle sensor 31, the electric current is supplied to the multi-turn detection unit 45, and the output is detected therefrom, whereby the steering angle θs is appropriately calculable even when the steering wheel 91 is rotated during the IG off time. Note that the motor rotation angle θm is required only during the IG-on time, the detection of the motor rotation angle θneeds not be continuously detected during the IG-off time.

As described above, the rotation angle sensor 31 includes the multi-turn detection unit 45, the position detector 40, the count calculator 55, and the angle calculator 51. The multi-turn detection unit 45 can continue detection of rotation position of the rotor 860 for multiple rotations thereof without using electric power. The position detector 40 detects the rotation position of the rotor 860 in one rotation. Note that the position detector 40 has higher resolution than the multi-turn detection unit 45.

Based on the detection value of the multi-turn detection unit 45, the count calculator 55 calculates multiple rotation position information related to the rotation position of multiple rotations. The multiple rotation position information is a value related to the number of rotations of the rotor 860, which is counted up or down according the rotation direction n times in one rotation of the rotor 860 (i.e., n is an integer of 1 or more) in the present embodiment, i.e., is the count value TC. The angle calculator 50 calculates the motor rotation angle θm related to the rotation position in one rotation based on the detection value of the position detector 40. Since the multi-turn detection unit 45 can continue detection of the rotation position of multiple rotations without using electric power, for example, the detection of the count value TC is continuable even when the supply of electric power is interrupted due to, for example, replacement of the battery.

The multi-turn detection unit 45 of the present embodiment magnetically holds the rotation position of multiple rotations, and can read the magnetically-held rotation position upon having the supply of electric power. Thereby, detection of the rotation position of multiple rotations is continuable appropriately without using electric power.

The ECU 10 includes the rotation angle sensor 31 and the control unit 70. The rotation angle sensor 31 or the control unit 70 includes the absolute angle calculator 75 that calculates the absolute angle θa that is a displacement amount from the reference position based on the count value TC and the motor rotation angle θm. In the present embodiment, since the count value TC is calculated based on the detection value of the multi-turn detection unit 45 which does not require electric power, calculation of the absolute angle θa is continuable even when the power source is removed or replaced. Further, the absolute angle calculator 75 calculates the absolute angle θa by using a value obtained by correcting the count value TC with the TC correction value TC_c. In such manner, the calculation of the wrong rotation number due to the zero point shift between the count value TC and the motor rotation angle θm (e.g., skipping of the rotation number) is preventable, thereby always enabling appropriate calculation of the absolute angle θa.

Second Embodiment

Figure 5:
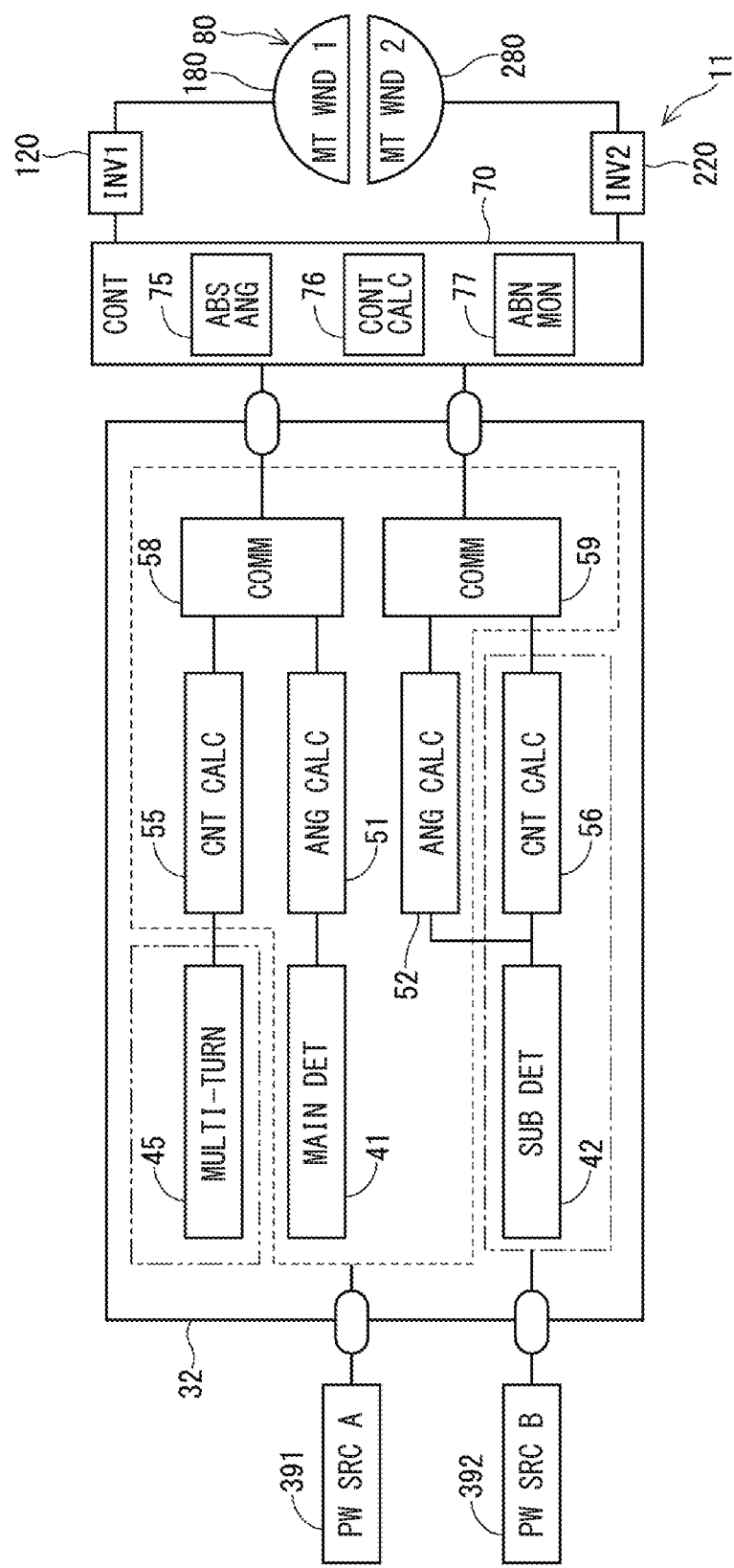
FIG. 5 is a block diagram of an ECU according to a second embodiment.
Figure 6:
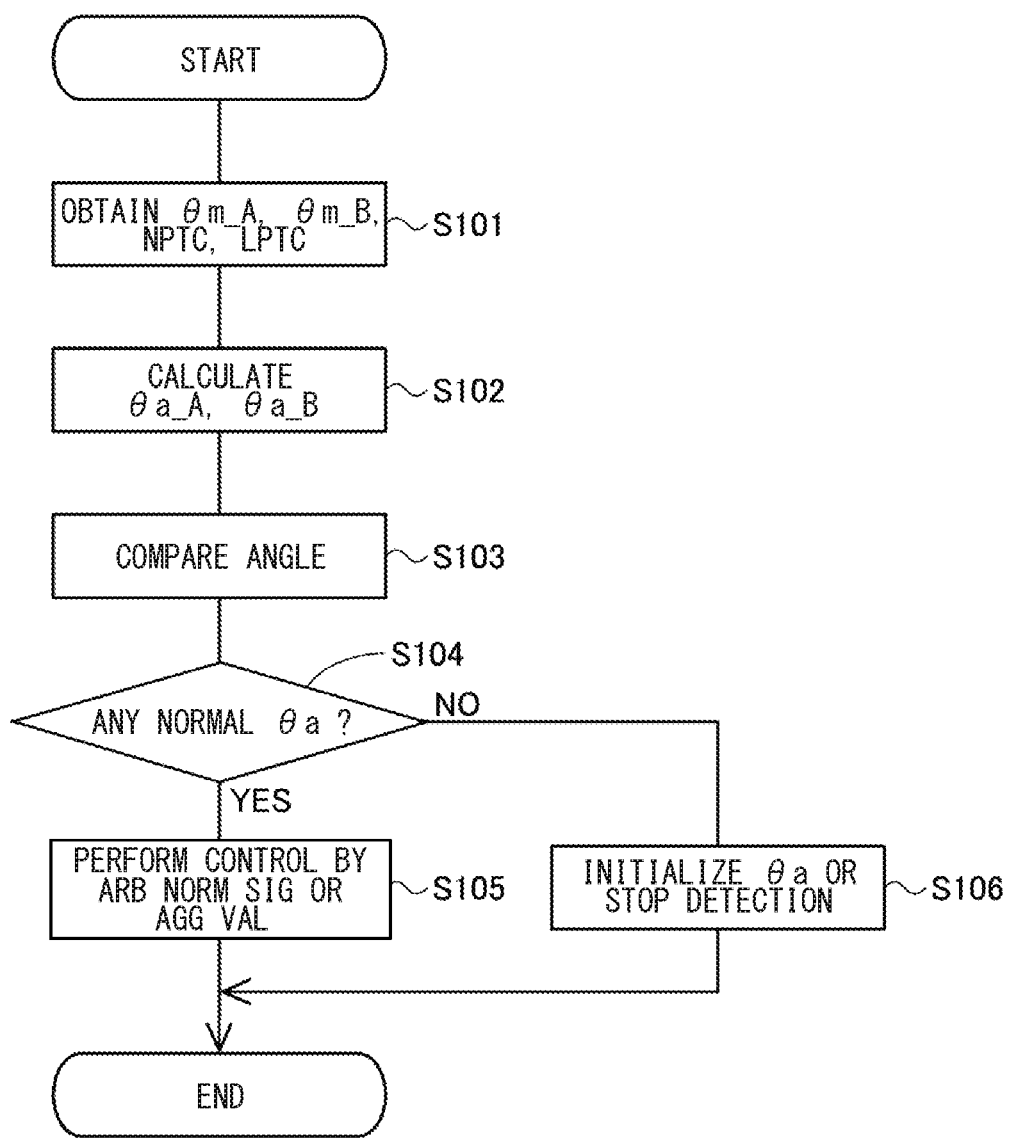
FIG. 6 is a flowchart if an abnormality monitoring process according to the second embodiment.

The second embodiment is shown in FIG. 5 and FIG. 6. As shown in FIG. 5, an ECU 11 includes the drive circuits 120 and 220, a control unit 70, a rotation angle sensor 32, and the like. A rotation angle sensor 32 includes a main detection unit 41, a sub detection unit 42, the multi-turn detection unit 45, angle calculators 51 and 52, count calculators 55 and 56, and communication units 58 and 59, and electric power is supplied from power sources 391 and 392. The power source 391 can supply electric power to the rotation angle sensor 32 via the IG when the IG is turned on, and the power source 392 which is a constant voltage power source such as a regulator, for example, can supply electric power to the rotation angle sensor 32 from a non-illustrated battery, regardless of the on/off state of the IG. In the drawing, a block surrounded by a one-dot broken line constantly receives a supply of electric power.

Like the position detector 40, the main detection unit 41 and the sub detection unit 42 detect change of the magnetic field of the magnet 875 according to the rotation of the motor 80. Preferably, the main detection unit 41 and the sub detection unit 42 have different sensor characteristics. For example, the main detection unit 41 is an AMR element, and the sub detection unit 42 is a TMR element. Here, even if the types of elements are the same, a difference such as circuit layout and ratio of materials used therein, manufacturing lots, a wafer number in the manufacturing lot, and chip positions in wafers or the like may also be regarded as a "difference in the configuration related to detection elements." Further, a difference not only in the element but also in the detection circuit connected to the element, the calculation circuit, as well as the type and voltage of the power source supplied thereto may also be regarded as a "difference of the configuration related to the detection element." By using a sensor having different sensor characteristics, for example, a common cause failure such as a magnetic flux density abnormality may less likely be suffered, which is preferable from the viewpoint of functional safety. The sub detection unit 42 preferably uses a TMR element when reducing power consumption, or preferably uses an AMR element when prioritizing magnetic field resistance.

Here, the reason why the detection units 41 and 42 have "main" and "sub" attached thereto is to establish distinction between the two, but they may be functionally the same. Further, for example, the functions may be divided in such a manner that the main detection unit 41 is used for control and the sub detection unit 42 is used for abnormality monitoring. This also applies to the following embodiments. Hereafter, as appropriate, "A" is attached to the configuration and value related to the main detection unit 41, and "B" is attached to the configuration and value related to the sub detection unit 42.

The angle calculator 51 calculates a motor rotation angle θm_A based on the detection value of the main detection unit 41 that has been AD-converted by an AD conversion unit (not shown in the drawing). The angle calculator 52 calculates a motor rotation angle θm_B based on the detection value of the sub detection unit 42 that has been AD-converted by the AD conversion unit (not shown in the drawing). Hereinafter, when the values calculated by the angle calculators 51 and 52 are distinguished as appropriate, the values are designated as the motor rotation angles θm_A and θm_B, and when distinction is unnecessary, the values are simply designated as the motor rotation angle θm. By comparing the motor rotation angles θm_A and θm_B, the presence or absence of abnormality can be detected.

The count calculator 56 receives a supply of electric power constantly from the power source 392, and calculates the count value TC of the rotor 860 based on the detection value of the sub detection unit 42. Hereinafter, in order to distinguish the value calculated by the count calculator 55 from the value calculated by the count calculator 56, the value calculated by the count calculator 55 is referred to as a count value NPTC (i.e., No Power Turn Count) and the value calculated by the count calculator 56 is referred to as LPTC (i.e., Low Power Turn Count). The count values NPTC and LPTC are calculated by using the detection values of respectively-different detection methods, and have different-type redundant configurations (i.e., heterogeneous redundancy). Note that the count value NPTC may be counted by one in one rotation of the rotor 860, and the count value LPTC may be counted by four in one rotation of the rotor 860, for example. In other words, the number of counts may be respectively different in the count value NPTC and the count value LPTC. That is, for example, when comparing the count values NPTC and LPTC, conversion may be performed as appropriate. Hereinafter, when the distinction between the detection units is unnecessary, the count value TC is simply used.

By comparing the count values NPTC and LPTC, it is possible to detect the presence or absence of abnormality. The comparison of the count values may be performed in the rotation angle sensor 32 or may be performed by the control unit 70. The same applies to the motor rotation angles θm_A and θm_B. In addition, the same effect is obtainable even when the comparison is performed after the calculation (i.e., the conversion to) the absolute angles θa_A and θa_B. The communication unit 58 outputs the motor rotation angle θm_A and the count value NPTC to the control unit 70, and the communication unit 59 outputs the motor rotation angle θm_B and the count value LPTC to the control unit 70.

Although the multi-turn detection unit 45 has an advantage that a supply of electric power is unnecessary, the multi-turn detection unit 45 may possibly suffer a shift of the corresponding rotation number, or may lose data due to external disturbance of the magnetic fields and/or long-term data retention. Therefore, in the present embodiment, in addition to the calculation of the count value NPTC by using the detection value of the multi-turn detection unit 45, electric power is constantly supplied to the sub detection unit 42 and to the count calculator 56 for the calculation of the count value LPTC. In such manner, the calculation of the count value TC is made redundant, and abnormality in the calculation is detectable. Further, by making the multi-turn detection unit 45 and the sub detection unit 42 configurationally different from each other, a common cause failure hardly occurs and abnormality caused therein is easily detectable.

The absolute angle calculator 75 calculates the absolute angle θa_A based on the motor rotation angle θm_A and the count value LPTC, and calculates the absolute angle θa_B based on the motor rotation angle θm_B and the count value NPTC. The abnormality monitoring unit 77 performs abnormality monitoring based on the absolute angles θa_A and θa_B.

The abnormality monitoring process of the present embodiment is described based on the flowchart of FIG. 6. The abnormality monitoring process is performed by the control unit 70. Here, when the count value TC is used in the first calculation after startup and the count value TC is not used during the operation, the process is performed when the IG is switched from off to on or when the control unit 70 is reset. When the count value TC is used not only in the initial calculation after startup but is also used during the operation, the process is performed at a predetermined cycle during the operation. Hereinafter, "step" of step S101 is simply indicated as a symbol "S."

In S101, the control unit 70 obtains the motor rotation angles θm_A, θm_B and the count values NPTC, LPTC. In S102, the control unit 70 calculates the absolute angle θa_A by using the count value NPTC and the motor rotation angle θm_A, and calculates the absolute angle θa_B by using the count value LPTC and the motor rotation angle θm_B (see the equation (1)).

In S103, the control unit 70 performs abnormality determination by comparing the absolute angles θa_A and θa_B. When the number of values calculated in S102 is two, it is determined as normal if the difference of the two values is within a normal range, and when the difference is outside the normal range, it is determined as abnormal, i.e., the values are determined as two different values. Also, for example, when there are three or more detection units and three or more absolute angles θa are calculable, a normal value is identified by majority decision. The motor rotation angle θm and the count value TC having been used for the calculation of the normal absolute angle θa are referred to as "normal signals."

At S104, the control unit 70 determines whether there is a normal absolute angle θa. When it is determined that there is a normal absolute angle θa (S104: YES), the process proceeds to S105, and various control calculations such as calculation of the steering angle θs and the like are performed by using arbitrary normal signals or by using an aggregate value of a plurality of normal signals. If it is determined that there is no normal absolute angle θa (S104: NO), the process proceeds to S106, and the absolute angle θa is reset. In such case, since the relationship (i.e., correspondence) between the absolute angle θa and the steering angle θs becomes indefinite, the relationship between the absolute angle θa and the steering angle θs is learned and re-established based on the detection of the absolute angle θa or the like when the steering wheel 91 is in the neutral position, i.e., when the vehicle is traveling straight. Also, depending on the system configuration, the detection of the absolute angle θa may be stopped.

The rotation angle sensor 32 includes the count calculator 56 that calculates the count value TC based on the detection value of the sub detection unit 42. Electric power is constantly supplied to the sub detection unit 42 and the count calculator 56 in which the detection value is used to calculate the count value TC. In such manner, even when abnormality due to external disturbance of the magnetic field or the like occurs in the multi-turn detection unit 45, detection of the count value TC is continuable. Further, the abnormality detection is performable by comparing the count values NPTC and LPTC. Further, since the detection principle of the detection values used in the calculation of the count values NPTC and LPTC is respectively different, the probability of having common cause failure in the calculation of both of those count values is reducible.

In the present embodiment, the main detection unit 41 and the sub detection unit 42 are respectively provided as a position detector. In other words, the position detector of the present embodiment is implemented as plural units. The detection value of the sub detection unit 42, which is at least one position detector, is shared by the angle calculator 52 and the count calculator 56. Thereby, the calculation of the motor rotation angle θm and the count value TC can be made redundant with a relatively simple configuration.

The main detection unit 41 and the sub detection unit 42 are different in the configuration related to the detection element. In such manner, since the occurrence of abnormality due to the same cause can be prevented, functional safety of the system is improvable. The "configuration related to the element" means that either (i) the type of the element is different (for example, TMR element, AMR element, Hall element, etc.), (ii) the internal configuration of the element is different (for example, different wafers, different layouts, different materials used therein, the manufacturing conditions are different, the manufacturing lot is different, etc.), (iii) the circuit configuration connected to the element is different, or (iv) the type and/or voltage of the electric power supplied to the element are different.

At least two absolute angles θa_A and θa_B are calculated by using the different count values NPTC and LPTC and the different motor rotation angles θm_A and θm_B. The control unit 70 has the abnormality monitoring unit 77 that performs abnormality monitoring based on multiple absolute angles θa_A and θa_B calculated by using the different detection values. Thereby, abnormality monitoring of the rotation angle sensor 32 is appropriately performable. Further, the same effects as the embodiment described above are achievable.

Third Embodiment, Fourth Embodiment

Figure 7:
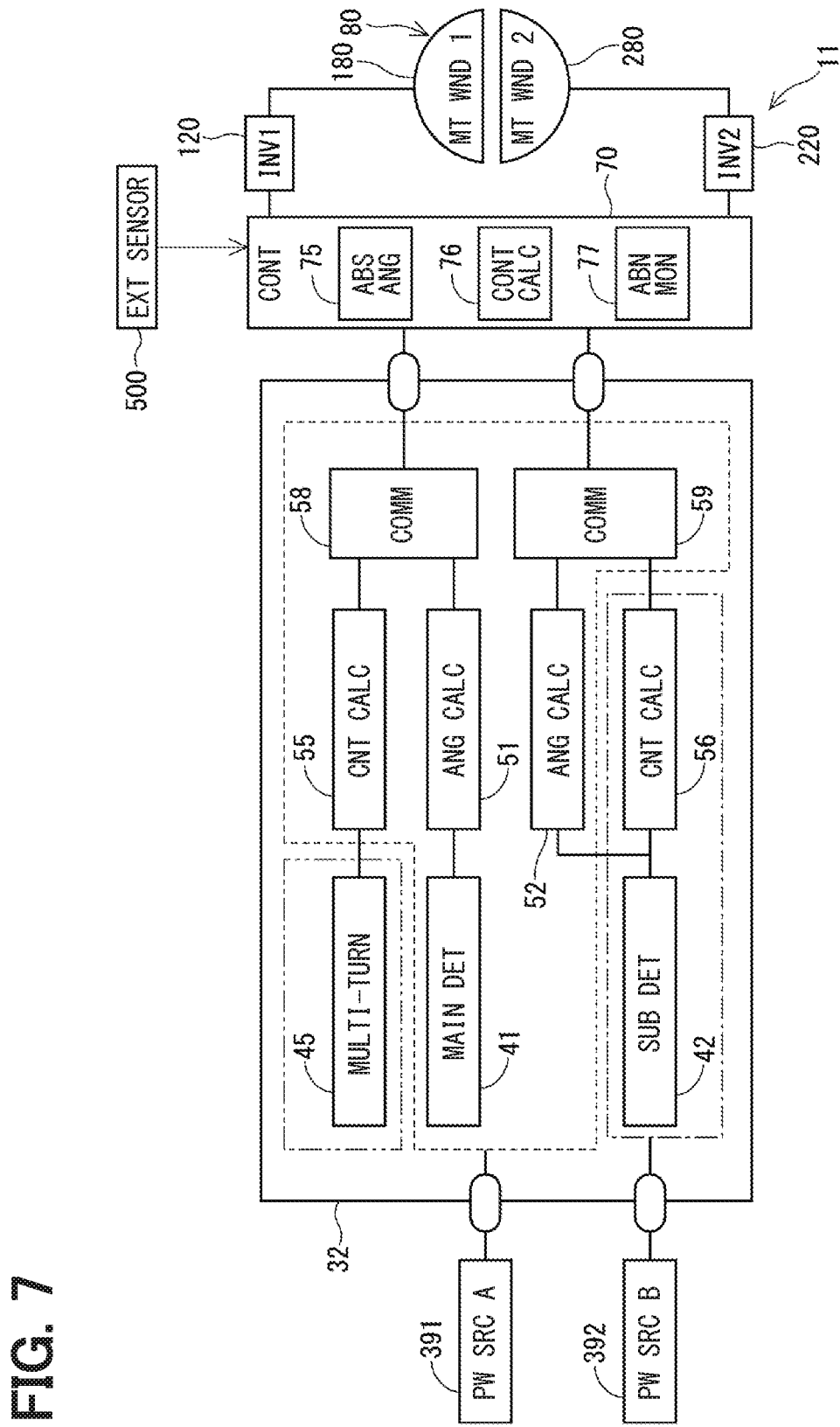
FIG. 7 is a block diagram of an ECU according to a third embodiment.
Figure 9:
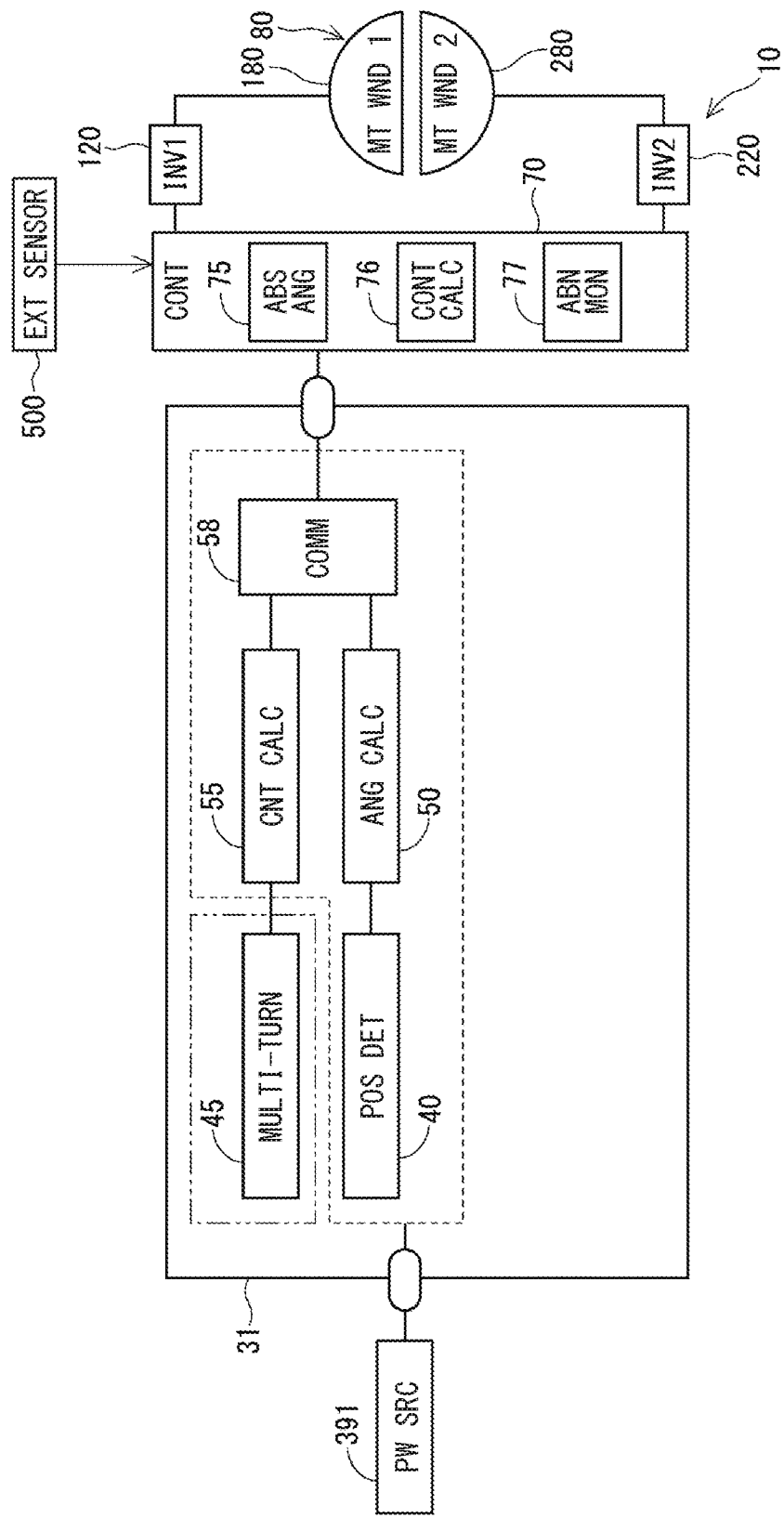
FIG. 9 is a block diagram of the ECU according to a fourth embodiment and a nineteenth embodiment.

The third embodiment is shown in FIGS. 7 and 8, and the fourth embodiment is shown in FIG. 9. As shown in FIGS. 7 and 9, the control unit 70 of the present embodiment can obtain an external detection value that is convertible to the absolute angle θa from the external sensor 500. As a rotation angle sensor, FIG. 7 of the third embodiment shows the rotation angle sensor 32 of the second embodiment, and FIG. 9 of the fourth embodiment shows the rotation angle sensor 31 of the first embodiment. Communication between the external sensor 500 and the control unit 70 may be any communication method such as CAN (Controller Area Network), LIN (Local Interconnect Network), Flexray, and the like. The external sensor 500 is, for example, a steering sensor, a torque sensor with a built-in steering sensor, a stroke sensor, a torque sensor with a built-in stroke sensor, or the like. A value obtained by converting the detection value of the external sensor 500 into a comparable absolute angle (i.e., to be comparable with the absolute angle θa_A or θa_B) by using a gear ratio or the like of a gear connecting the motor 80 and the steering system is designated as an absolute angle θa_C.

Hereinafter, abnormality monitoring is described focusing on the third embodiment. In the third embodiment, since three values can be used as the absolute angle θa, in S103 of FIG. 6, one that is different from the other two values is identified as abnormal. In FIG. 8, comparison (1) is a comparison between the absolute angles θa_A and θa_B, comparison (2) is a comparison between the absolute angles θa_A and θa_C, and comparison (3) is a comparison between the absolute angles θa_B and θa_C. If all of the comparisons (1), (2) and (3) are normal, the absolute angles θa_A, θa_B and θa_C are all identified as normal, and if the comparisons (1), (2) and (3) are all abnormal, it is not possible to identify a normal value and an abnormal value. Further, in case that two of the comparisons (1), (2), and (3) are normal and one is abnormal, identification is also not possible.

If the comparisons (1) and (2) are abnormal and the comparison (3) is normal, the absolute angle θa_A is identified as abnormal. Abnormality of the absolute angle θa_A may include a situation where detection continuation disabling failure is caused, and a situation where a data skip is caused in the multi-turn detection unit 45 due to the external disturbance of the magnetic field.

If the comparisons (1) and (3) are abnormal and the comparison (2) is normal, the absolute angle θa_B is identified as abnormal. Abnormality of the absolute angle θa_B may include a situation where the sub detection unit 42 has a detection continuation disabling failure, and a situation of power failure such as battery replacement or the like.

If the comparisons (2) and (3) are abnormal and the comparison (1) is normal, the absolute angle θa_C is identified as abnormal. Abnormality of the absolute angle θa_C may include a situation where the external sensor 500 has a detection continuation disabling failure, and a situation of jumping of gears or belts at the joint between the motor 80 and the steering shaft 92.

That is, even when the absolute angles θa_A, θa_B, and θa_C are abnormal, abnormality may be being caused, not by the device failure, but by abnormal data. Therefore, by using the internal monitoring function of each sensor or by using the external monitoring function, whether the situation is being caused by the device failure or not may be separately determined, and when the situation is determined that abnormality is not being caused by the device failure, a correction process may be performed according to an amount of difference from the data of the normal sensor.

Alternatively, by configuring the sensor such that each of the absolute angles θa_A, θa_B, and θa_C is calculated multiple times, such as absolute angles θa_Ax and θa_Ay, and, when both of the absolute angles θa_Ax and θa_Ay respectively corresponding to the absolute angle θa_A are identified as abnormal, it may be determined not as a device failure but as a detection-continuable data abnormality which is correctable. When one of the absolute angles θa_Ax and θa_Ay is abnormal, it may be determined as a device failure.

The control unit 70 has the abnormality monitoring unit 77 which performs abnormality monitoring by obtaining the external detection value from the external sensor 500, which is convertible to the absolute angle θa_A and by performing a comparison between (i) the absolute angle θa_C calculated from the detection value of the external sensor 500 and (ii) the absolute angles θa_A and θa_B calculated based on the detection values of the rotation angle sensors 31 and 32. That is, in the present embodiment, the absolute angles θa_A, θa_B, and θa_C correspond to "a plurality of absolute positions calculated by using respectively different detection values." In such manner, abnormality monitoring is appropriately performable by using the detection values of the external sensor 500. In addition, if at least one of (i) the absolute angle based on the detection values of the rotation angle sensors 31 and 32 and (ii) the absolute angle based on the detection value of the external sensor 500 is available in plurality (e.g., as two values), totaling at least to three available absolute angles, the position of abnormality is determinable by the majority decision. Further, the same effects as the embodiment described above are achievable.

Fifth Embodiment

Figure 10:
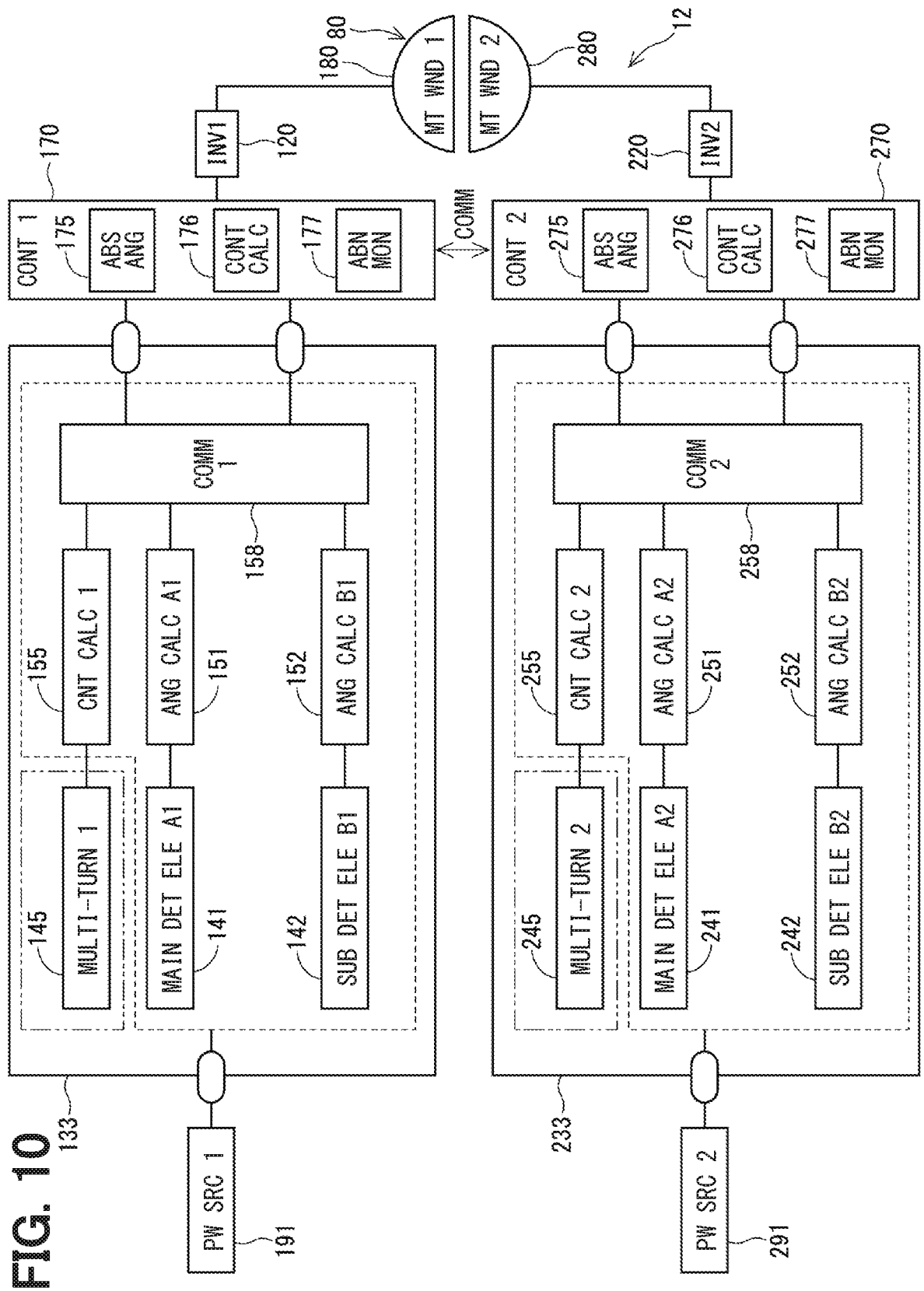
FIG. 10 is a block diagram of the ECU according to a fifth embodiment.

The fifth embodiment is shown in FIG. 10. An ECU 12 according to the present embodiment includes the drive circuits 120 and 220, control units 170 and 270, and rotation angle sensors 133 and 233. In the present embodiment, since two control units 170 and 270 are provided, the drive control of the motor 80 is continuable even when one of the two control units fails.

The first control unit 170 includes an absolute angle calculator 175, a control calculator 176, and an abnormality monitoring unit 177. The second control unit 270 includes an absolute angle calculator 275, a control calculator 276, and an abnormality monitoring unit 277. The absolute angle calculators 175 and 275 calculate the steering angle θs in addition to the absolute angle θa.

The control calculator 176 controls the energization of the motor winding 180 by controlling the on/off operation of a first switching element 121. The control calculator 276 controls the energization of the motor winding 280 by controlling the on/off operation of a second switching element 221. The abnormality monitors 177 and 277 perform abnormality monitoring by mutual monitoring of the absolute angles. The control units 170 and 270 can transmit and receive information by communication. Hereinafter, communication of the control units 170 and 270 is referred to as inter-microcomputer communication as appropriate.

The first rotation angle sensor 133 includes a main detection unit 141, a sub detection unit 142, a multi-turn detection unit 145, angle calculators 151 and 152, a count calculator 155, and a communication unit 158. The second rotation angle sensor 233 includes a main detection unit 241, a sub detection unit 242, a multi-turn detection unit 245, angle calculators 251 and 252, a count calculator 255, and a communication unit 258. The first rotation angle sensor 133 receives a supply of electric power from a power source 191 when the IG is turned on, and the second rotation angle sensor 233 receives a supply of electric power from a power source 291 when the IG is turned on. The power supplies 191 and 291 are constant voltage power supplies such as a regulator as in the power source 391 of the above embodiment.

The main detection units 141 and 241 are the same as the main detection unit 41 of the second embodiment, the sub detection units 142 and 242 are the same as the sub detection unit 42 of the second embodiment, and the angle calculators 151 and 251 are the same as the angle calculator 51, and the angle calculators 152 and 252 are the same as the angle calculator 52. Hereinafter, the configuration and values of the main detection unit 141 have a sign "A1," the configuration and values of the sub detection unit 142 have a sign "B1," the configurations and values of the main detection unit 241 have a sign "A2," and the configurations and values of the sub detection unit 242 have a sign "B2." The multi-turn detection units 145 and 245 are similar to the multi-turn detection unit 45, and the count calculators 155 and 255 are similar to the count calculator 55.

Here, the value calculated by the angle calculator 151 is designated as a motor rotation angle θm_A1, and the value calculated by the angle calculator 152 is designated as a motor rotation angle θm_B1, and the value calculated by the angle calculator 251 is designated as a motor rotation angle θm_A2, and the value calculated by the angle calculator 252 is designated as a motor rotation angle θm_B2. Further, the value calculated by the count calculator 155 is designated as a count value NPTC1, and the value calculated by the count calculator 255 is designated as a count value NPTC2.

The communication unit 158 transmits the motor rotation angles θm_A1 and θm_B1 and the count value NPTC1 to the first control unit 170. Communication unit 258 transmits the motor rotation angles θm_A2, θm_B2 and the count value NPTC 2 to the second control unit 270.

In the present embodiment, the first rotation angle sensor 133 and the first control unit 170 are included in the first system, and the second rotation angle sensor 233 and the second control unit 270 are included in the second system. In each system, one count value NPTC and two motor rotation angles θm are calculated. In the present embodiment, since the rotation angle sensors 133 and 233 and the control units 170 and 270 are configured similarly in the first system and the second system, the process in the first control unit 170 is mainly described. Since the processing in the second control unit 270 may be replaced with the value of the subject system (i.e., the first system) for the calculation purposes, the description is appropriately omitted.

The first control unit 170 calculates the steering angle θs by using the count value NPTC1 in the first calculation after the IG is switched from off to on, and thereafter calculates the steering angle θs by integrating a change amount of the motor rotation angle θm to a value of the first calculation after performing the first calculation of the steering angle θs. In such manner, need for constant monitoring of the count value NPTC is eliminated. In terms of the count value NPTC1, abnormality monitoring is performed at a timing before the first calculation and after IG-on either (i) as the in-system self-monitoring described in the third embodiment, or (ii) as the abnormality monitoring by comparison with the count value NPTC2 obtained by the inter-microcomputer communication.

Further, the motor rotation angle θm is configured as calculable as two values in each system, and by comparison in the system, which enables in-system comparison of the two values for constant monitoring at a predetermined cycle while the IG is on. In such manner, the load of inter-microcomputer communication is reducible as compared with the case where abnormality monitoring is performed by obtaining the motor rotation angle from the other system by the inter-microcomputer communication. Further, since abnormality monitoring is performable within the system, the absolute angle θa is calculable at high speed by using a value determined as normal. By devising such configuration, abnormality monitoring is appropriately performable without requiring constant power supply. The fifth embodiment also provides the same advantages as the above-described embodiments.

Sixth Embodiment

Figure 11:
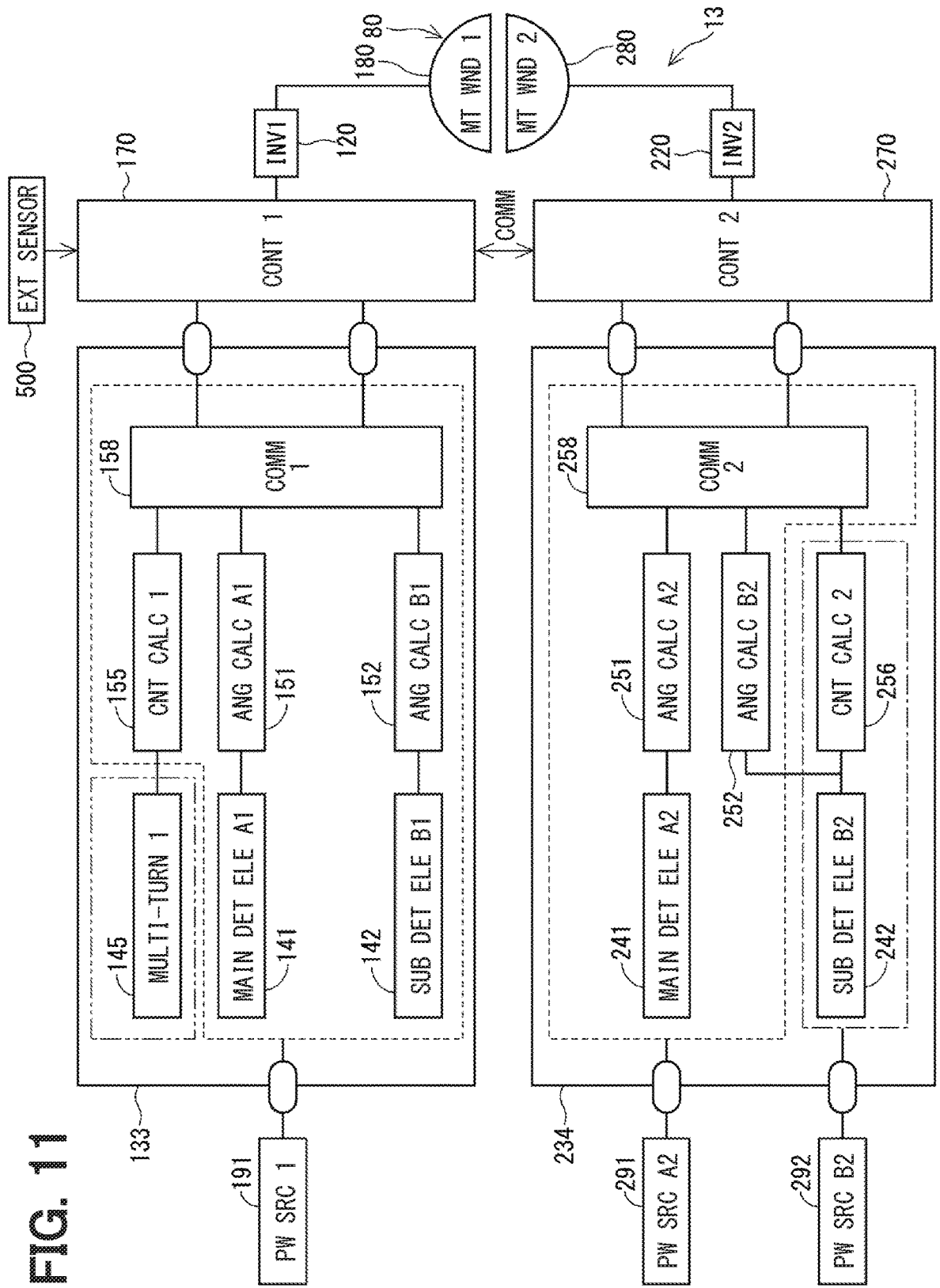
FIG. 11 is a block diagram of the ECU according to a sixth embodiment.

The sixth embodiment is shown in FIG. 11. An ECU 13 of the present embodiment includes the drive circuits 120 and 220, the control units 170 and 270, and rotation angle sensors 133 and 234. A second rotation angle sensor 234 includes the main detection unit 241, the sub detection unit 242, the angle calculators 251 and 252, a count calculator 256, and the communication unit 258, and electric power is supplied from power sources 291 and 292. Similar to the power source 391, the power source 291 can supply electric power via the IG when the IG is turned on, and the power source 292 can constantly supply electric power from the battery regardless of the on/off state of the IG, just like the power source 392.

In the present embodiment, the multi-turn detection unit is omitted from the second rotation angle sensor 234, and a count calculator 256 calculates a count value LPTC2 by using the detection value of the sub detection unit 242. The count calculator 256 is similar to the count calculator 56. The communication unit 258 transmits the motor rotation angles θm_A2 and θm_B2 and the count value LPTC2 to the second control unit 270. Further, the first control unit 170 can obtain the detection value of the external sensor 500.

In the present embodiment, three values are used for abnormality monitoring, i.e., (i) an absolute angle θa_A1 calculated by using the count value NPTC in the first system, (ii) an absolute angle θa_B2 calculated by using the count value LPTC in the second system, and (iii) the absolute angle θa_C based on the detection of the external sensor 500. The absolute angles θa_A1, θa_B2 and θa_C are shared by the control units 170 and 270 by inter-microcomputer communication.

The details of abnormality monitoring are substantially the same as the third embodiment, in which comparison is performed among three values of the absolute angles θa_A1, θa_B2 and θa_C in the normal time. If a power failure occurs due to battery run-out or battery replacement, abnormality monitoring is performed by the comparison of the absolute angles θa_A1 and θa_C, and if the count value NPTC becomes abnormal due to the external disturbance such as a strong magnetic field or the like, abnormality monitoring is performed by the comparison of the absolute angles θa_B2 and θa_C. Further, jumping of the teeth of the gears at the joint between the motor 80 and the steering system is detectable from the comparison between the absolute angles θa_A1, θa_B2 and the absolute angle θa_C.

In the present embodiment, since three values of the absolute angles θa_A1, θa_B2 and θa_C are available, abnormality due to a power source failure or an external disturbance is appropriately detectable. Further, in a situation such as when the drive device 400 is removed from the steering system, abnormality detection is still performable by the comparison between (i) the absolute angle θa_C based on the detection value of the external sensor 500 and (ii) a value from a component on a steering wheel side than the joint to the gear. Further, the present embodiment also provides the same advantages as those of the above embodiments.

Seventh Embodiment

Figure 12:
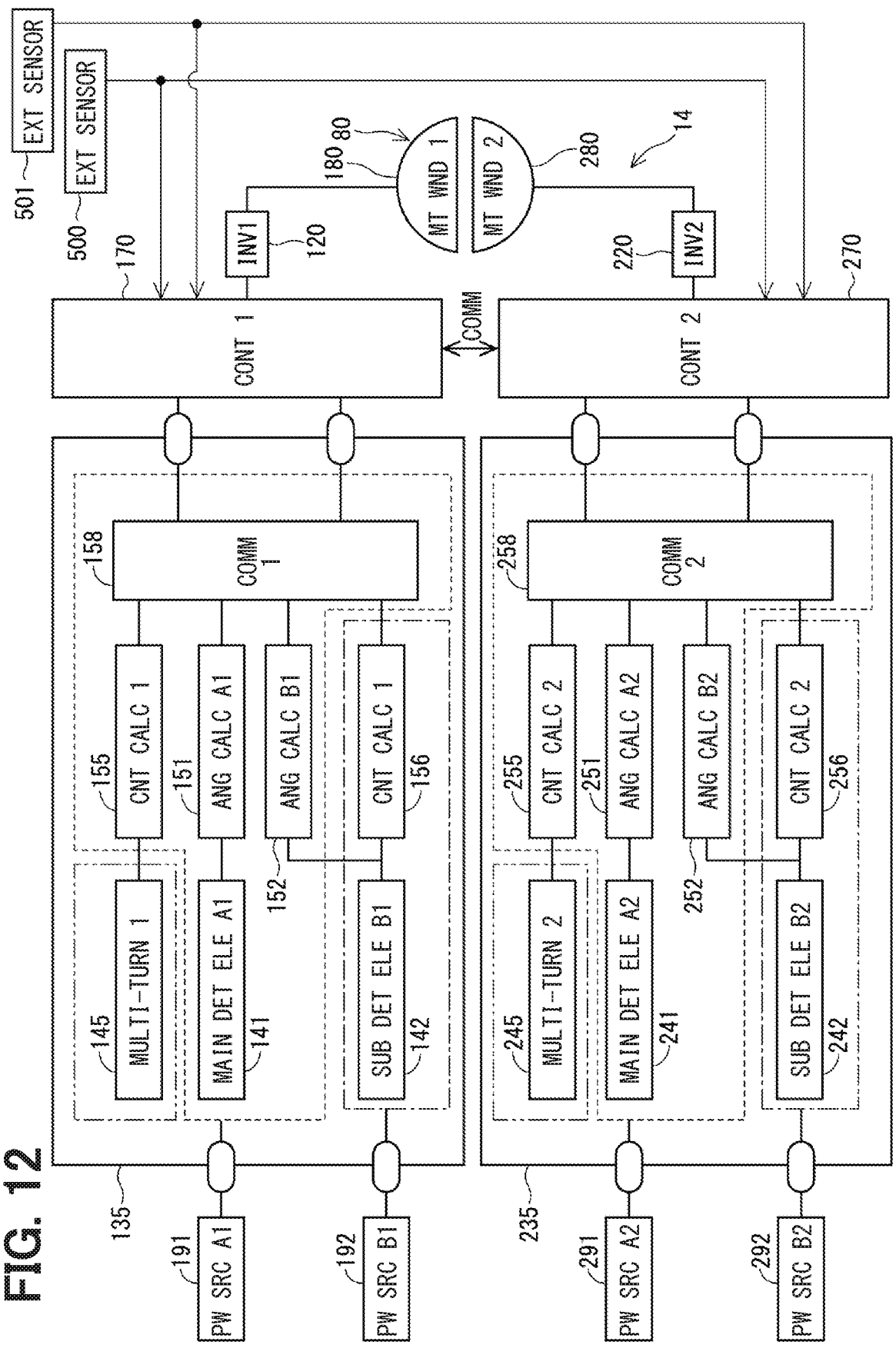
FIG. 12 is a block diagram of the ECU according to a seventh embodiment.

The seventh embodiment is shown in FIG. 12. An ECU 14 of the present embodiment includes drive circuits 120 and 220, the control units 170 and 270, and rotation angle sensors 135 and 235. A first rotation angle sensor 135 has a count calculator 156 in addition to the configuration of the first rotation angle sensor 133 of the fourth embodiment, and electric power is supplied from the power source 191 when the IG is turned on, and is also constantly supplied from a power source 192 regardless of the on/off state of the IG. The count calculator 156 calculates a count value LPTC1 by using the detection value of the sub detection unit 142. The communication unit 158 transmits the motor rotation angles θm_A1 and θm_B1 and the count values NPTC1 and LPTC1 to the first control unit 170.

The second rotation angle sensor 235 has the count calculator 256 in addition to the configuration of the second rotation angle sensor 233 of the fourth embodiment, and electric power is supplied from the power source 291 when the IG is turned on, and is also constantly supplied from the power source 292 regardless of the on/off state of the IG. The communication unit 258 transmits the motor rotation angles θm_A2, θm_B2 and the count values NPTC2, LPTC2 to the second control unit 270. Although there is one multi-turn detection unit 245 provided in the second rotation angle sensor 235, a more robust system is configurable by providing a plurality of detection units 245 redundantly therein. The same applies to the first rotation angle sensor 135.

The control units 170 and 270 can obtain external detection values that are convertible to the absolute angles from two external sensors 500 and 501. The external sensors 500 and 501 are, for example, a steering sensor, a torque sensor with a built-in steering sensor, a stroke sensor, a torque sensor with a built-in stroke sensor, etc., and may be the same type or different types. Also in the third embodiment and the fourth embodiment, external detection values may be obtained from a plurality of the external sensors.

In the present embodiment, in each system, two motor rotation angles θm, count values NPTC, LPTC, and external detection values from the two external sensors 500 and 501 can be used, and abnormality identification is performable in one system by the majority decision. Moreover, control using a normal detection value is continuable. In addition, even when one of the rotation angle sensors 135 and 235 fails, the detection value of a normal rotation angle sensor is sharable among the control units 170 and 270 by inter-microcomputer communication, whereby the two systems motor control is continuable. Further, the same advantages as the above embodiment are achievable.

Eighth Embodiment

Figure 13:
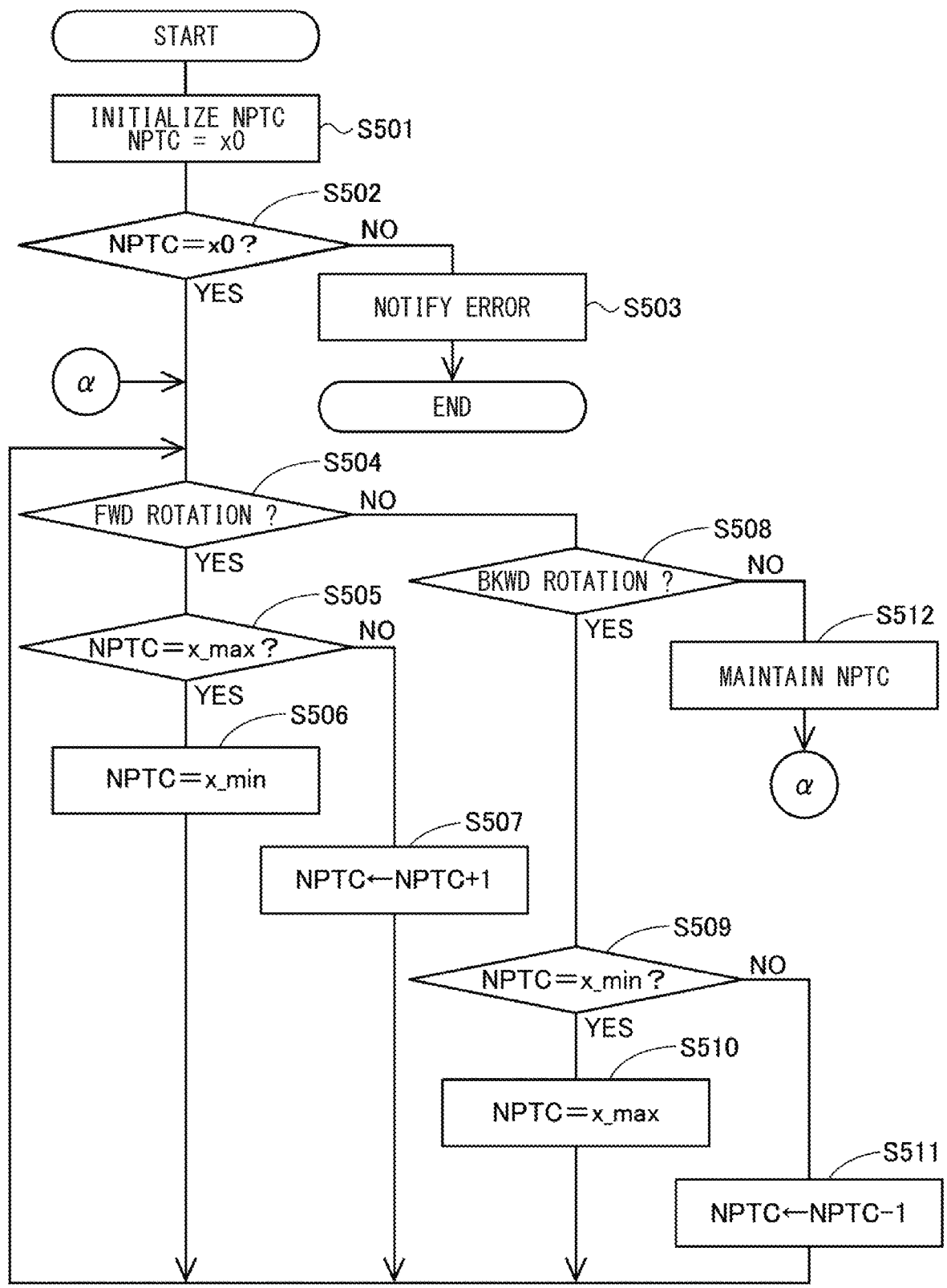
FIG. 13 is a flowchart of a count calculation process according to an eighth embodiment.
Figure 14:
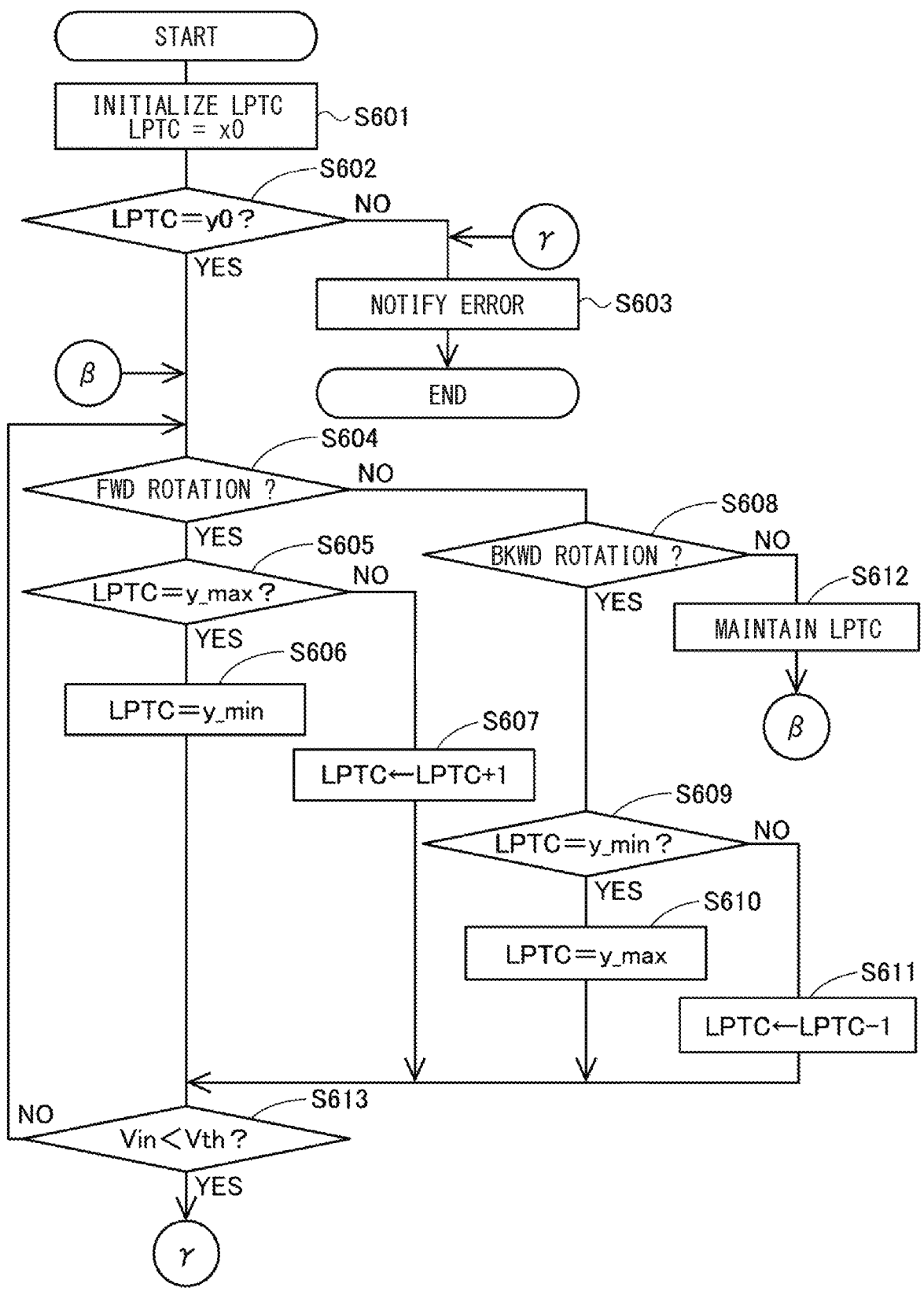
FIG. 14 is another flowchart of the count calculation process according to the eighth embodiment.
Figure 15:
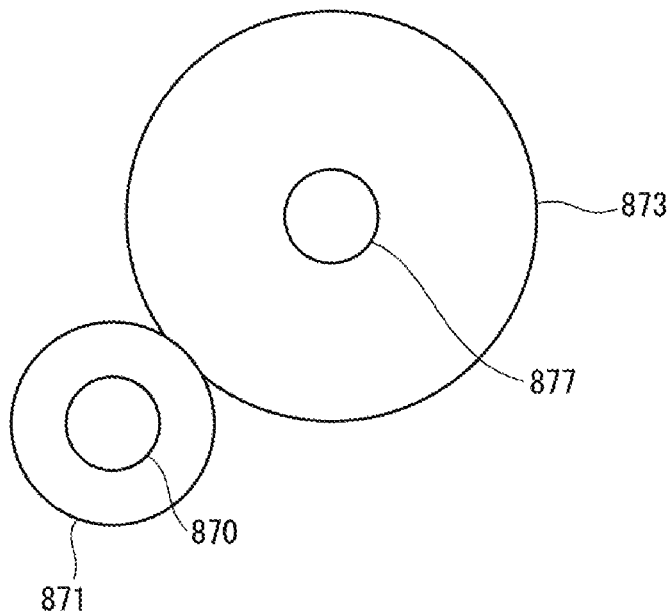
FIG. 15 is a schematic diagram of a multi-turn detection unit according to one of other embodiments.

The eighth embodiment is shown in FIGS. 13 and 14. In the present embodiment, the ECU 11 of second embodiment is taken as an example. However, the present embodiment is applicable to any of the preceding embodiments.

The multi-turn detection unit 45 may output the count value NPTC sticking either to an upper limit value x_max or to a lower limit value x_min when rotating magnetic field of the magnet 875 is applied thereto by a number exceeding a detectable range.

Therefore, in the present embodiment, when the count value TC reaches the upper limit value, the count value TC counts "up" to the lower limit value in subsequent count up, or the count value TC counts "down" to the upper limit value in subsequent count down, by configuration. In such manner, the count value TC counts up/down in loop, thereby preventing the sticking to the upper/lower limit values.

Further, the multi-turn detection unit 45 holds information of the rotation position without receiving supply of electric power. In other words, when power supply is turned off, the multi-turn detection unit 45 is not initialized. Therefore, in the present embodiment, at any timing, i.e., at the time of completion of assembly work of the multi-turn detection unit 45 or the like, for example, the count value TC is configured to be initializable.

The count calculator 55 performing the count calculation process is illustrated with reference to a flowchart in FIG. 13. The count calculation process is started by the count calculator 55 when the initialization of the count value NTPC is required. Note that, in case of restarting the supply of electric power to the count calculator 55 after stopping the power supply, if it is not necessary to initialize the count value NPTC, the process of only after S504 may be performed.

In S501, the initialization of the count value NTPC is performed. In the present embodiment, the strong magnetic field, the high voltage, and/or the large electric current may be applied to the multi-turn detection unit 45, for physically initializing the unit 45. Further, the initialization may also be performed by software reset in the count calculator 55, with which the current rotation position is considered as an initialization position. Further, the count calculator 55 initializes the count value NTPC to an initial value x0. The initial value x0 may be set to any value between the lower limit value x_min and the upper limit value x_max, which may be a median value of x_min and x_max, or may also be a value having offset from the median value. The same applies to the count value LPTC described later.

In S502, the count calculator 55 determines whether the count value NTPC is equal to the initial value x0. Initialization abnormality may occur not only by the abnormality of the multi-turn detection unit 45 but also by the internal abnormality of the count calculator 55. When it is determined that the count value NTPC is not equal to the initial value x0 (S502:NO), the process proceeds to S503, and an error is notified to the control unit 70. Notification of an error may be performed by using a flag or the like, or may be performed as an output having an error value, which is not existent as a normal count value. When it is determined that the count value NTPC is equal to the initial value x0 (S502:YES), the process proceeds to S504.

In S504, the count calculator 55 determines whether a forward rotation (i.e., rotation of the rotor 80 in a forward direction) is detected based on the detection value of the multi-turn detection unit 45. When it is determined that no forward rotation is detected (S504:NO), the process proceeds to S508. When it is determined that a forward rotation is detected (S504:YES), the process proceeds to S505.

In S505, the count calculator 55 determines whether the count value NPTC is equal to the upper limit value x_max. When it is determined that the count value NPTC is equal to the upper limit value x_max (S505:YES), the process proceeds to S506, setting the count value NPTC to the lower limit value x_min and returning the process to S504. When it is determined that the count value NPTC is not equal to the upper limit value x_max (S505:NO), the process proceeds to S507, counting up the count value NPTC and returning the process to S504.

In S508, to which the process proceeds when it is determined that no forward rotation is detected (S504:NO), the count calculator 55 determines whether a backward rotation is detected based on the detection value of the multi-turn detection unit 45. When it is determined that no backward rotation is detected (S508:NO), the process proceeds to S512, maintaining the count value NPTC and returning the process to S504. When it is determined that a backward rotation is detected (S508:YES), the process proceeds to S509.

In S509, the count calculator 55 determines whether the count value NPTC is equal to the lower limit value x_min. When it is determined that the count value NPTC is equal to the lower limit value x_min (S509:YES), the process proceeds to S510, setting the count value NPTC to the upper limit value x_max and returning the process to S504. When it is determined that the count value NPTC is not equal to the lower limit value x_min (S509:NO), the process proceeds to S511, counting down the count value NPTC and returning the process to S504.

Further, the count value LPTC calculated by the count calculator 56 is also counted in loop, for preventing the count value LPTC from sticking to the upper/lower limit value y_max/y_min.

The count calculator 56 performing the count calculation process is illustrated with reference to a flowchart in FIG. 14. The count calculation process is started by the count calculator 56 when the initialization of the count value LTPC is required, at the time of completion of assembly work or the like, for example.

The process of S601 to S612 are the same as the process of S501 to S512 in FIG. 13, only with the replacement of the LPTC with NPTC and x_max/min with y_max/min. Further, after S606, S607, S610 or S611, the process proceeds to S613.

In S613, the count calculator 56 determines whether a supply voltage Vin from the power source 392 is lower than a low voltage determination threshold Vth. When it is determined that the supply voltage Vin is equal to or higher than the low voltage determination threshold Vth (S613:NO), the process returns to S604. When it is determined that the supply voltage Vin is lower than the low voltage determination threshold Vth (S613:YES), the process returns to S603, notifying an error to the control unit 70.

In the present embodiment, the count calculator 55 counts the count value NPTC as a value between the lower limit value x_min and the upper limit value x_max, i.e., as a number m (m is an integer of 2 or more). The "count width" represented by the number m may be a value defined by the detection range of the multi-turn detection unit 45, or may be a value defined by the countable range of the count calculator 55. Here, n is an integer of 1 or more, and is a count number representing a count in one rotation of the rotor 860. The count calculator 55, upon having the count value NPTC reaching the upper limit value x_max, counts "up" the value NPTC to the lower limit value x_min in subsequent count up, or, upon having the count value NPTC reaching the lower limit value x_min, counts "down" the value NPTC to the upper limit value x_max in subsequent count down. In such manner, sticking of the count value NPTC to a certain value is prevented and the counting of the number of rotations is continuable with no upper limit or lower limit count.

The count calculator 55 is capable of initializing the count value NPTC, and, upon having the count value NPTC normally initialized, starts the counting of the count value NPTC. In such manner, just like the multi-turn detection unit 45, the count calculator 55 is capable of appropriately performing the initialization even when a sensor not reset by the power off is used. Further, the same effects as the preceding embodiments are achievable. The same applies to the count value LPTC calculated by the count calculator 56.

The rotation angle sensor 32 includes the sub detection unit 42 serving as a rotation detection unit and the count calculator 56. The sub detection unit 42 detects the rotation position of the rotor 860 which is the detection object. The count calculator 56 calculates a count value that is either counted up or down n times (n is an integer of 1 or more) in one rotation of the rotor 860 according to the rotation direction, based on the detection value of the sub detection unit 42.

The count calculator 56 counts the count value LPTC as a value between the lower limit value y_min and the upper limit value y_max, i.e., as a number m (m is an integer of 2n or more), and, upon having the count value LPTC reaching the upper limit value y_max, counts "up" the value LPTC to the lower limit value y_min in subsequent count up, or, upon having the count value LPTC reaching the lower limit value y_min, counts "down" the value LPTC to the upper limit value y_max in subsequent count down. In such manner, sticking of the count value LPTC to a certain value is prevented and the counting of the number of rotations is continuable with no upper limit or lower limit count.

In the above embodiments, the rotor 860 corresponds to a "detection object," the ECUs 10 to 14 respectively a "detection unit," the rotation angle sensors 31, 32, 133, 135, and 233 to 235 respectively correspond to a "detection device," the position detector 40 and the main detection units 41, 141, 241 and the sub detection units 42, 142, 242 respectively correspond to a "position detector." The count calculators 55, 155, 255 respectively correspond to a "multiple rotation position calculator" and a "first multiple rotation position calculator," and the count value TC corresponds to a "multiple rotation position information," and the TC correction value TC_c corresponds to rotation information correction value."

Further, the count calculators 155 and 255 respectively correspond to a "first multiple rotation position calculator," and the count calculators 56, 156 and 256 respectively correspond to a "second multiple rotation position calculator." Further, the absolute angle calculators 75, 175, and 275 respectively correspond to an "absolute position calculator," and the absolute angle θa corresponds to an "absolute position." Further, the sub detection unit 42, 142, 242 and the multi-turn detection unit 45, 145, 245 correspond to a "rotation detection unit."

Other Embodiments

In the above embodiment, the multi-turn detection unit magnetically holds the rotation position of the multiple rotations (e.g., a rotation angle from a reference position after a rotation of 360 degrees by multiple times). In other embodiments, the multi-turn detection unit may be configured to be capable of continuing detection of a multiple rotation position without using electric power, by using any means other than the magnetism. For example, as shown in FIG. 13, a gear 873 may be included, which engages with a gear 871 that rotates integrally with the shaft 870 of the motor 80 and rotates one time per multiple rotations of the motor 80, and a magnet 877 that rotates integrally with the gear 873 is provided for detecting the number of rotations of the motor 80 from a rotation position of the gear 873 after a supply of electric power is resumed. Even in such configuration, the rotation position of the multiple rotations is detectable without using electric power. Further, the number of components is reducible as compared with a normal steering sensor.

Further, in addition, "the detection of the rotation position of multiple rotations continuable without a supply of electric power from the outside" is not limited to the detection by using magnetism without a supply of electric power or the like as shown in the above-described embodiment. By providing an internal battery in the sensor, the detection of the rotation position of multiple rotations may be continued without a supply of electric power from the outside. In other embodiment, when the count value TC reaches the maximum value Cmax, the count value may be subsequently counted "up" to the minimum value Cmin, and when the count value TC reaches the minimum value Cmin, the count value may be subsequently counted down to the maximum value Cmax. That is, the value TC may be counted in loop.

In the above embodiments, the control unit is used in the electric power steering apparatus. In other embodiments, as shown in FIG. 16, the control unit may be used in a steer-by-wire system. A steer-by-wire system 591 includes a reaction force device 401 and a wheel steering device 402. The reaction force device 401 includes a reaction force control unit 411 and a reaction force motor 801. The wheel steering device 402 includes a wheel steering control unit 412 and a wheel steering motor 802. The reaction force control unit 411 and the wheel steering control unit 412 can communicate via a vehicle communication network such as CAN.

In FIG. 16, a steering shaft 921 is mechanically separated from the rack shaft 97. The reaction force motor 801 is provided on the steering shaft 921 and gives the steering wheel 91 a reaction force according to the driver's steering operation for providing the driver with an appropriate steering feeling. The steering motor 802 is provided on a rack shaft 97 side to control the steering angle of steered wheels.

The reaction force device 401 and the wheel steering device 402 can be configured in the same manner as the drive device 400 of the above embodiment. Further, absolute angle calculation can be performed by providing the reaction force control unit 411 and the wheel steering control unit 412 with the same rotation angle sensor as that of the above embodiment. Note that, although the rotation angle sensor 31 of the first embodiment is shown in FIG. 16, a rotation sensor other than the one that is used in the first embodiment may also be usable.

Further, the control unit may also be suitably applicable to applications that require detection of the number of rotations and detection of the rotation angle other than the steer-by-wire system. Furthermore, if a stroke position is converted into a rotation system by using a gear, the detection unit is also applicable to a stroke sensor.

In the third embodiment, as the external sensor, a steering sensor, a torque sensor with a built-in steering sensor, a stroke sensor, and a torque sensor with a built-in stroke sensor are exemplified. In other embodiments, an analysis value of an image captured by a camera or a laser displacement meter may also be used as the external sensor.

In the above embodiments, communication between the control units is performed by inter-microcomputer communication. In other embodiments, communication between control units may be performed via a vehicle communication network such as CAN, for example, instead of inter-microcomputer communication.

In the above embodiments, one sensor unit (e.g., a rotation angle sensor 31) includes one multi-turn detection unit and one or two position detectors. In other embodiments, two or more multi-turn sensors may be provided in one sensor unit, or three or more position detectors may be provided therein.

In the above embodiments, one control unit is provided for one sensor unit, and the number of systems is one or two. In other embodiments, the number of systems may be three or more. Also, one control unit may be provided for a plurality of sensor units, or one sensor unit may be provided for a plurality of control units.

In the above embodiments, the motor is a three-phase brushless motor. In other embodiments, the motor is not limited to a three-phase brushless motor, but may also be any type of motor. Further, the motor is not limited to an electric motor, but may also be a generator, or may also be a so-called motor-generator having both of the motor function and the generator function. In the above embodiments, the inverter and motor windings are provided in two systems. In other embodiments, the number of inverters and motor windings may be provided in one system or in three or more systems. Also, the number of inverters and the number of motor windings may be different from each other. In the above embodiments, a control unit is applied to the electric power steering apparatus. In other embodiments, the control unit may also be applied to other apparatus other than the electric power steering apparatus.

The control unit described in the present disclosure and the method thereof may be realized by a dedicated computer that is configured as a combination of a processor and a memory programmed to perform one or more functions embodied by a computer program. Alternatively, the control unit described in the present disclosure and the method thereof may be realized by a dedicated computer that is provided as a configuration of a processor including one or more dedicated hardware logic circuits. Alternatively, the control unit and the method described in the present disclosure may be realized by one or more dedicated computers which is provided as a combination of (i) a processor and a memory programmed to perform one or more functions and (ii) a processor configured by one or more hardware logic circuits. Further, the computer programs mentioned above may be stored, as instructions executable by a computer, in a tangible, non-transitory, computer-readable storage medium. The present disclosure is not limited to the above embodiments, but may encompass various modifications implementable without departing from the spirit of the present disclosure.

Ninth Embodiment

Figure 22:
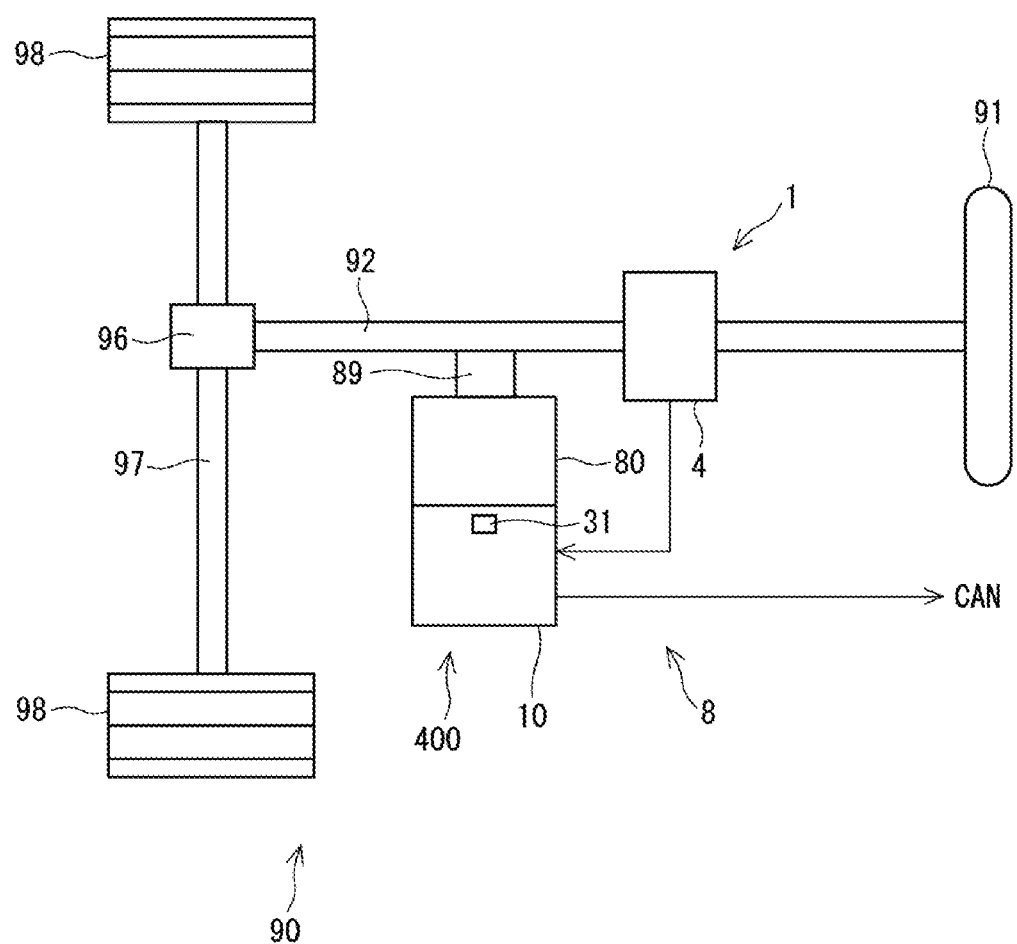
FIG. 22 is a schematic diagram of a steering system including a drive device according to a ninth embodiment.

FIGS. 22 to 28 show a detection device and a control device according to the ninth embodiment. FIG. 22 shows an overall configuration of a steering system 90 including an electric power steering apparatus 8. The steering system 90 includes a steering wheel 91, a steering shaft 92, a pinion gear 96, a rack shaft 97, road wheels 98, the electric power steering apparatus 8 and the like.

The steering wheel 91 is connected to the steering shaft 92. The steering shaft 92 has an input shaft 11 as a first shaft and an output shaft 12 as a second shaft (see FIG. 23). The steering shaft 92 is provided with a sensor unit 4 for detecting a steering torque.

The pinion gear 96 is provided at an axial end of the steering shaft 92. The pinion gear 96 engages with the rack shaft 97. A pair of road wheels 98 is coupled at both ends of the rack shaft 97 via, for example, tie rods. When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to the displacement amount of the rack shaft 97.

The electric power steering device 8 includes a drive device 400 having the motor 80 and the ECU 10, the sensor unit 4, and a speed reduction gear 89 as a power transmission unit that reduces the rotation of the motor 80 and transmits the rotation to the steering shaft 92. The electric power steering apparatus 8 of the present embodiment is a column assist type. However, it may alternatively be a rack assist type that transmits the rotation of the motor 80 to the rack shaft 97. In the present embodiment, the steering shaft 92 is a drive object. If the mechanical part from the steering wheel 91 to the wheel 98 is referred to as a "steering system," it can be said that the speed reduction gear 89 is a member that connects the motor 80 and the steering system.

The motor 80 outputs part or all of the torque required for steering. The motor 80 is driven by receiving a supply of electric power from a battery (not shown), and rotates the speed reduction gear 89 in the forward and backward directions. The drive device 400 is provided with the ECU 10 integrally on one side of the motor 80 in the axial direction, and is a so-called "mechanical integrated type." However, the motor 80 and the ECU 10 may be provided separately. The ECU 10 is arranged coaxially with an axis of a motor shaft (not shown) on the side opposite to an output shaft of the motor 80. The ECU 10 may alternatively be provided on the output shaft-side of the motor 80. By adopting the machine-electronics integrated type, it is possible to space-efficiently arrange the ECU 10 and the motor 80 in a vehicle having restricted mounting space.

Figure 25:
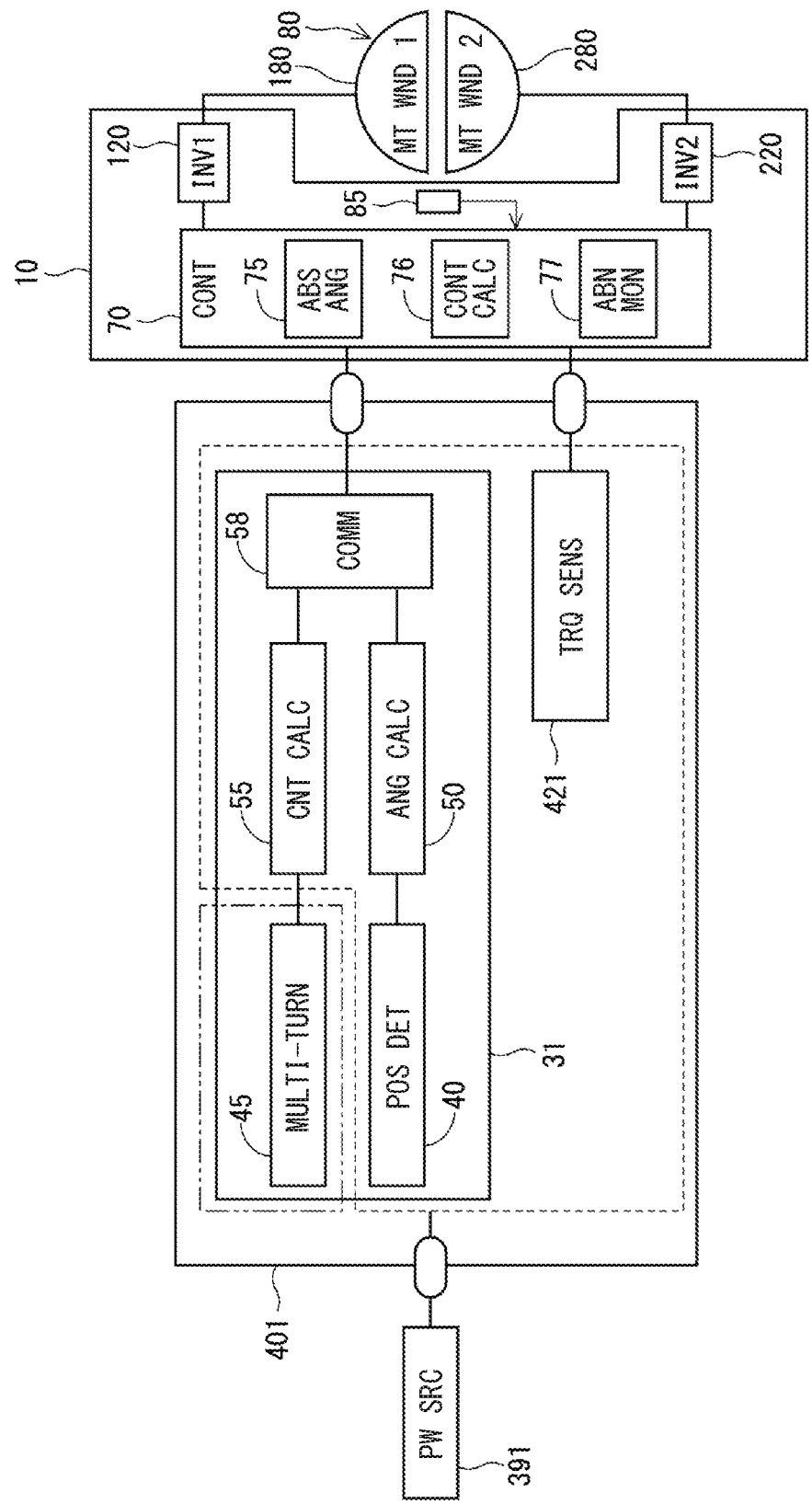
FIG. 25 is a block diagram of the detection device and the ECU according to the ninth embodiment.

The motor 80 is a three-phase brushless motor, and has a first motor winding 180 and a second motor winding 280 which are winding sets wound around a rotor (see FIG. 25). The motor windings 180 and 280 have the same electrical characteristics, and are wound around a common stator with an electric angle of 30 [deg] offset from each other. Correspondingly, phase currents are controlled to be supplied to the motor windings 180 and 280 such that the phase currents have a phase difference φ of 30 degrees. By optimizing a current supply phase difference, the output torque is improved. It is also possible to reduce sixth-order torque ripple. Furthermore, it is possible to maximize advantages of cancellation of noise and vibration since the electric current is averaged by the current supply with phase difference. Heat generation is also averaged. Therefore, it is also possible to reduce temperature-dependent errors in detection values of each sensor or torque between the two systems, and it is possible to average a suppliable amount of electric current. Note that the motor windings 180 and 280 may have different electrical characteristics.

Figure 23:
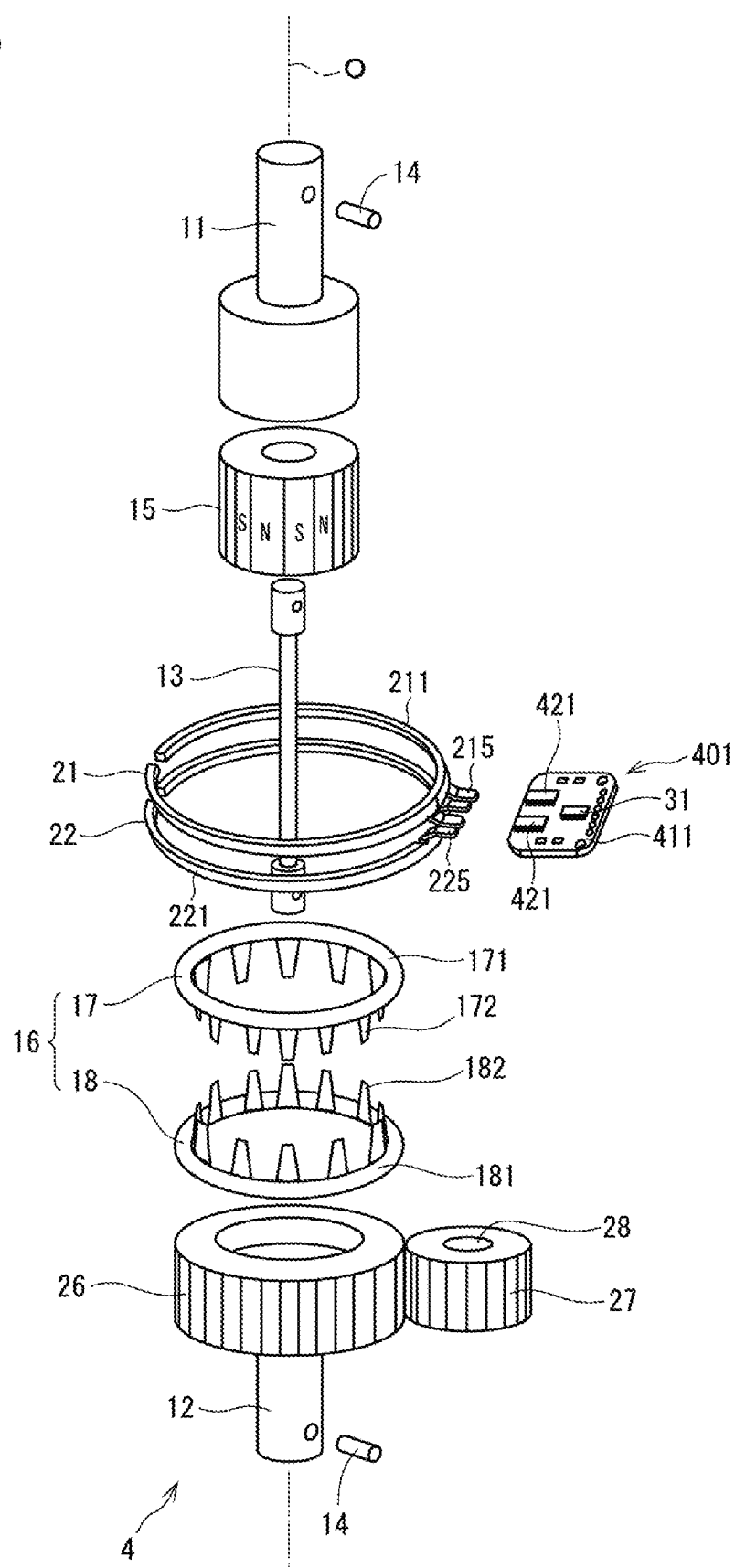
FIG. 23 is an exploded perspective view of a sensor unit according to the ninth embodiment.

As shown in FIG. 23, the sensor unit 4 includes the input shaft 11, the output shaft 12, a torsion bar 13, a multipolar magnet 15, a magnetic yoke 16, a detection device 401, and the like. One end of the torsion bar 13 is fixed to the input shaft 11 and the other end of the torsion bar 13 is fixed to the output shaft 12 with fixing pins 14, respectively, and connects the input shaft 11 and the output shaft 12 coaxially with the rotation axis O. The torsion bar 13 is a rod-shaped elastic member, and converts a torque applied to the steering shaft 92 into a torsional displacement. The multipole magnet 15 is formed in a cylindrical shape, and is fixed to the input shaft 11. In the multipole magnet 15, N poles and S poles are alternately magnetized along the circumferential direction. In the present embodiment, the number of N poles and S poles is 12 pairs, for a total of 24 poles.

The magnetic yoke 16 is held by a yoke holding member (not shown) formed of a non-magnetic material such as a resin, and forms a magnetic circuit in a magnetic field generated by the multipole magnet 15. The magnetic yoke 16 has a first yoke 17 provided on the input shaft 11 side and a second yoke 18 provided on the output shaft 12 side. The first yoke 17 and the second yoke 18 are both formed in a ring shape from a soft magnetic material, and are fixed to the output shaft 12 outside the multipole magnet 15 in the radial direction. The first yoke 17 has a ring portion 171 and claws 172. The claws 172 are provided at equal intervals around the entire circumference along an inner edge of the ring portion 171. The second yoke 18 has a ring portion 181 and claws 182. The claws 182 are provided at equal intervals around the entire circumference along the inner edge of the ring portion 181.

The number of the claws 172 and 182 is the same as the number of pole pairs of the multipole magnet 15 (i.e., 12 in the present embodiment). The claws 172 and the claws 182 are alternately arranged so as to be shifted in the circumferential direction. The first yoke 18 is opposed via an air gap to the second yoke 17. When no torsional displacement occurs in the torsion bar 13, that is, when no steering torque is applied to the steering shaft 92, the centers of the claws 172 and 182 are arranged to coincide with the boundaries between the N pole and the S pole of the multipole magnet 15.

Magnetic flux collecting rings 21 and 22 are arranged radially outside the magnetic yoke 16 and collect a magnetic flux from the magnetic yoke 16. The first magnetic flux collecting ring 21 is provided on the input shaft 11 side, and the second magnetic flux collecting ring 22 is provided on the output shaft 12 side. The first magnetic flux collecting ring 21 and the second magnetic flux collecting ring 22 are held by a magnetic flux collecting ring holding member (not shown) by insert molding or the like.

The first magnetic flux collecting ring 21 is made of a soft magnetic material, and includes a ring portion 211 formed in a substantially annular shape, and two magnetic flux collecting portions 215 protruding radially outward from the ring portion 211. Like the first magnetic flux collecting ring 21, the second magnetic flux collecting ring 22 is formed of a soft magnetic material, and has a substantially annular ring portion 221 and two magnetic flux collecting portions 225 protruding radially outward from the ring portion 221. The magnetic flux collecting portion 215 of the first magnetic flux collecting ring 21 and the magnetic flux collecting portion 225 of the second magnetic flux collecting ring 22 are provided such that opposing surfaces thereof are substantially parallel. A torque sensor 421 is disposed at a position between the magnetic flux collecting portions 215 and 225.

The torque sensor 421 has a magnetic detection element such as a Hall element, and detects a magnetic flux between the magnetic flux collecting portions 215 and 225. When no steering torque is applied between the input shaft 11 and the output shaft 12, the centers of the claws 172 of the first yoke 17 and the claws 182 of the second yoke 18 are arranged to coincide with the boundaries of the N and S poles of the multipole magnet 15. In such arrangement, since the same number of magnetic force lines enters and exits from the N pole and the S pole of the multipole magnet 15 to the claws 172 and 182, the magnetic force lines respectively form closed loops in an inside of the first yoke 17 and the second yoke 18. Therefore, no magnetic flux leaks into the gap between the yokes 17 and 18, and the magnetic flux density detected by the magnetic detection element becomes zero.

When a steering torque is applied (i.e., caused) between the input shaft 11 and the output shaft 12 to cause a torsional displacement of the torsion bar 13, the multipole magnet 15 fixed to the input shaft 11 has its position shifted along the circumferential direction relative to the yokes 17 and 18 fixed to the output shaft 12. As a result, the magnetic flux density passing through the magnetic detection element is substantially proportional to the amount of torsional displacement of the torsion bar 13, and the polarity is inverted according to the torsional direction of the torsion bar 13. The magnetic detection element detects the strength of the magnetic field in the thickness direction of the torque sensor 421, and outputs the detected strength of the magnetic field to the ECU 10 as a detected steering torque value (i.e., as a detection value).

The detection device 401 has a substrate 411, a rotation angle sensor 31, and the torque sensor 421. The rotation angle sensor 31 and the torque sensor 421 are mounted on the substrate 411. The torque sensor 421 is arranged close to one side of the substrate 411 and inserted between the magnetic flux collecting portions 215 and 225. By notching the substrate 411 at the position where the magnetic flux collecting portions 215 and 225 are arranged and inserting the magnetic flux collecting portion 225 into notched portions, the distance between the magnetic flux collecting portions 215 and 225 can be reduced, thereby reducing a gap in the magnetic flux circuit. In such manner, magnetic flux leakage is reduced and torque detection accuracy is improved.

Figure 24:
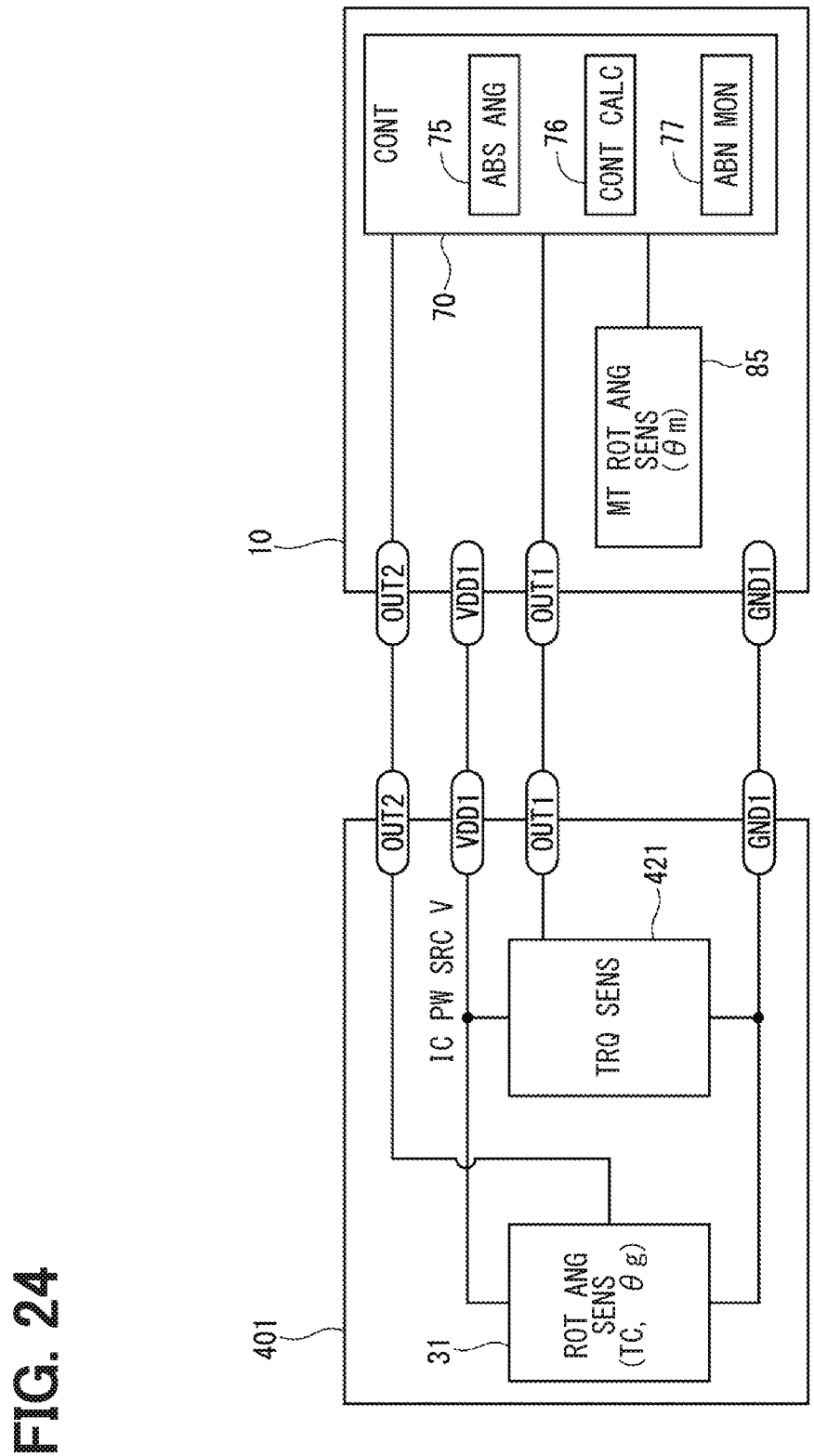
FIG. 24 is a block diagram of a detection device and an electronic control unit (ECU) according to the ninth embodiment.

As shown in FIGS. 24 and 25, the rotation angle sensor 31 includes a position detection unit 40, a multi-turn detection unit 45, an angle calculation unit 50, a count calculator 55, and a communication unit 58. When a start switch such as an ignition switch is turned on, electric power is supplied from a power source 391. The power source 391 is a constant voltage power source such as a regulator or the like. Hereinafter, the start switch is appropriately described as "IG." The position detection unit 40 detects the rotation of a detection gear 27 that engages with an output shaft gear 26 that rotates integrally with the output shaft 12 (see FIG. 23). The detection gear 27 is provided with a magnet 28, and the position detection unit 40 detects a change in the magnetic field of the magnet 28 according to the rotation of the detection gear 27. The position detection unit 40 is, for example, a magnetoresistive element such as an AMR sensor, a TMR sensor, a GMR sensor, or the like, or may also be a Hall element or the like. Further, an inductive sensor, a resolver, or the like may be used as the position detection unit 40.

The gear ratio between the output shaft gear 26 and the detection gear 27 can be set arbitrarily, and the resolution is determined according to the gear ratio. For example, if the gear ratio between the output shaft gear 26 and the detection gear 27 is 2:1, the detection gear 27 makes two rotations with one rotation of the steering shaft 92, thereby enabling highly accurate detection of rotation. Further, if the detection gear 27 is made greater than the output shaft gear 26, it is not necessary to detect the number of rotations.

The multi-turn detection unit 45 is configured to be able to detect a change in the magnetic flux due to the rotation of the magnet 28 without supply of power power. In other words, the multi-turn detection unit 45 uses a storage method other than the one using electric power (i.e., a magnetic storage method in the present embodiment). More practically, in the multi-turn detection unit 45, the magnetic detection elements are arranged in spiral shape, and initially have a magnetic direction aligned in a specific direction. When the magnet 28 rotates, the magnetic direction of the magnetic detection element is changed in order from one end, and a location where the magnetic flux changes either to the outside or to inside may change according to the rotation direction of the magnet 28, rotation by rotation, i.e., per one rotation of the detection gear 27. The resistance of the magnetic detection element changes according to the magnetic direction. No electric power is required to change the magnetic direction of the magnetic sensing element. In addition, the rotation position of the detection gear 27 can be measured by supplying an electric current to the magnetic detection element and by detecting the output therefrom. That is, the multi-turn detection unit 45 does not need electric power at the time of detection of the magnetic direction, and needs electric power at the time of reading a detection value.

The multi-turn detection unit 45 may be capable of detecting a predetermined number of rotation positions from one end to the other end (e.g., from a start end to a finishing end of rotation), or may be configured to detect the rotation position indefinitely by connecting the start end and the finishing end.

The angle calculation unit 50 calculates a gear rotation angle θg of the detection gear 27 based on the detection value of the position detection unit 40 that is AD-converted by an AD conversion unit (not shown). The gear rotation angle θg is a value corresponding to the rotation angle of the detection gear 27, and may be any value that is convertible to the rotation angle.

The count calculator 55 calculates a count value TC according to the output when the multi-turn detection unit 45 is energized (i.e., receives electric power). The count value TC is counted up or down n times (i.e., n is an integer of 1 or more) during one rotation of the detection gear 27 according to the rotation direction.

For preventing detection error of the gear rotation angle $\theta g$, at the time of switching of the gear rotation angle $\theta g$ from $\theta g=359°$ to $\theta g=0°$ (i.e., at a count up timing of the count value TC from TC=k to TC=k+1), n may preferably be set to a value of 2 or more, that is, one rotation of the detection gear 27 may preferably be configured to be 2 counts of the count value TC or more counts. In addition, the detection error, i.e., discrepancy between the gear rotation angle $\theta g$ and the count value TC accompanying the switching between 359° and 0° may appropriately be corrected as required. Note that, for simplification, the explanation has been made by omitting the decimal part of the gear rotation angle $\theta g$.

When n is set to be 3 or more, the rotation direction is detectable. In the present embodiment, setting of n=4 is used, and the count value TC is counted up or down every time the detection gear 27 rotates 90 [deg]. In the present embodiment, it is assumed that the count value TC is counted up when the steering wheel 91 rotates forward (i.e., in one direction) and counts down when the steering wheel 91 rotates backwards (i.e., in the other direction). In addition, sampling is performed at a speed that is sufficient for the rotation speed of the detection gear 27. In FIG. 25, a block surrounded by a two-dot chain line does not require electric power for operation, and a block surrounded by a broken line is supplied with electric power when the IG is turned on.

The communication unit 58 generates an output signal including the gear rotation angle $\theta g$ and the count value TC, and outputs the output signal to a controller 70 by digital communication such as SPI communication. The communication method may be a method other than the SPI communication, such as the SENT communication or the like. Further, the gear rotation angle $\theta g$ and the count value TC may be separately, e.g., one by one, output to the controller 70. Furthermore, an absolute angle $\theta a$ may be calculated based on the gear rotation angle $\theta g$ and the count value TC, and the absolute angle $\theta a$ may be output to the controller 70.

The ECU 10 includes drive circuits 120 and 220, the controller 70, a motor rotation angle sensor 85, and the like. In FIG. 25, the drive circuit is described as "INV." The first drive circuit 120 is a three-phase inverter having six switching elements, and converts electric power supplied to the first motor winding 180. The second drive circuit 220 is a three-phase inverter having six switching elements, and converts electric power supplied to the second motor winding 280. On/off operations of the switching elements included in the drive circuits 120 and 220 are controlled based on a control signal output from the controller 70.

The motor rotation angle sensor 85 detects the magnetic field of a magnet that rotates integrally with a rotor (not shown) in accordance with the rotation of the motor 80. For example, the motor rotation angle sensor 85 may include a magnetoresistive element such as an AMR sensor, a TMR sensor, a GMR sensor, or the like, or may include Hall elements or the like. Further, an inductive sensor, a resolver, or the like may also be used as the motor rotation angle sensor 85.

The controller 70 is configured primarily by a microcomputer or the like, and includes a CPU, a ROM, a RAM, an I/O (all not shown), a bus line for connecting these components, and the like. Each processing in the controller 70 may be software processing by executing a program stored in advance in a substantial memory device such as a ROM (that is, a readable, non-temporary tangible recording medium) by the CPU, or may be hardware processing by using a dedicated electronic circuit. The same applies to the controllers 170 and 270 according to the embodiments described later.

The controller 70 includes an absolute angle calculator 75, a control calculation unit 76, an abnormality monitoring unit 77, and the like. The absolute angle calculator 75 calculates the absolute angle $\theta a$ using the count value TC and the gear rotation angle $\theta g$. The absolute angle $\theta a$ is a rotation angle of the detection gear 27 from a reference position, and includes multiple rotation information. A steering angle $\theta s$ is calculable by converting the absolute angle $\theta a$ by the gear ratio of the gears 26 and 27. Hereinafter, the "absolute angle" is a rotation angle from the reference position of the detection object, and is a value including the multiple rotation information.

The control calculation unit 76 performs various control calculations using information obtained from the rotation angle sensor 31, the motor rotation angle sensor 85, and the like. In the present embodiment, a control calculation relating to the drive control of the motor 80 is performed using information obtained from the detection device 401 and the motor rotation angle sensor 85. The abnormality monitoring unit 77 monitors an abnormality of the detection device 401 and the motor rotation angle sensor 85.

An equation (3) shows the calculation of the steering angle $\theta s$. INT (TC/n) in the equation means an integer part of a quotient obtained by dividing the count value TC by the count number n per rotation, and indicates the number of rotations of the detection gear 27. Note that the count value TC and the gear rotation angle $\theta g$ having respectively different zero points lead to the error of the rotation number calculation by INT (TC/n). Therefore, the count value TC may have a TC correction value TC_c for the matching the zero point to the one in the gear rotation angle $\theta g$ added thereto, before using it in calculation. In such case, the number of rotations is calculated as INT {(TC+TC_c)/n}. The TC correction value TC_c needs to be calculated every time the count value TC is reset, and the TC correction value TC_c is stored in a nonvolatile memory area. In an example of FIG. 25, the absolute angle calculator 75 is provided in the controller 70. However, the absolute angle $\theta a$ may be calculated and output from the rotation angle sensor 31 to the controller 70. Further, the steering angle $\theta s$ after the gear ratio conversion may also be used. The same applies to the embodiments described later. Further, Rg in the equation is a gear ratio of the gears 26 and 27.

$$\theta s = \{\text{INT}(TC/n) \times 360 + g\}/Rg \tag{3}$$

The steering shaft 92, in configuration, makes two left and right rotations from a neutral position, that is, four rotations from a left-most rotation position to a right-most rotation position. When the gear ratio between the output shaft gear 26 and the detection gear 27 is set to 2:1 and the steering shaft 92 is rotated from one end to the other end, the detection gear 27 makes eight rotations. Further, in the present embodiment, since the number of counts n during one rotation of the detection gear 27 is 4, the multi-turn detection unit 45 is configured to be able to detect 8×4=32 counts or more.

If the count number detectable by the multi-turn detection unit 45 is increased more than necessary, the circuit scale becomes large, leading to an increase of the physique and cost of the IC product. Further, when there is a sticking mode in which the count value TC of the multi-turn detection unit 45 cannot be counted when the count value TC becomes a minimum value Cmin or a maximum value Cmax, if the neutral position of the steering wheel 91 and a middle value Cmid in the multi-turn detection unit 45 are shifted from each other, the absolute angle θa and the steering angle θs may be not properly calculable (see FIG. 27).

Figure 26A:
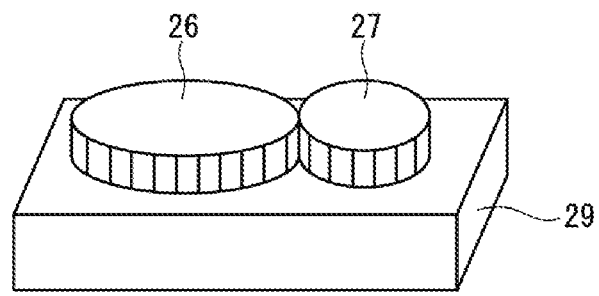
FIGS. 26A, 26B are respectively a schematic diagram of a gear fixing mechanism according to the ninth embodiment.
Figure 26B:
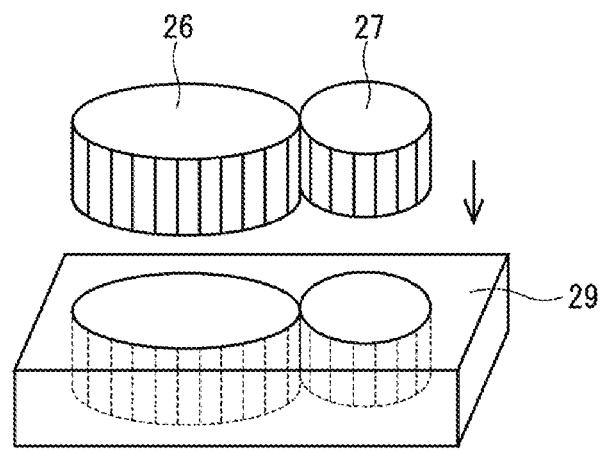

In the present embodiment, as shown in FIGS. 26A, 26B, the sensor unit 4 is provided with a gear fixing mechanism 29 capable of fixing the output shaft gear 26 and the detection gear 27. Since the multi-turn detection unit 45 is of a magnetic storage type, the gear fixing mechanism 29 is formed by using non-magnetic material. In the present embodiment, the detection device 401, the detection gear 27, and the output shaft gear 26 are (initially) positioned so that the count value TC has a specific value (for example, the middle value Cmid). More practically, as shown in FIG. 26A, in a state where the output shaft gear 26 and the detection gear 27 are fixed so as not to rotate by the gear fixing mechanism 29, the sensor unit 4 is assembled onto the steering shaft 92, for corresponding to a state with the specific value of the count value TC. That is, in other words, in a state in which the count value TC is the middle value Cmid and the gears 26 and 27 are fixedly associated therewith, the steering wheel 91 resting at the neutral position has the sensor unit 4 assembled thereto.

As shown in FIG. 26B, when the product assembly is complete, the gear fixing mechanism 29 is separated from the gears 26 and 27, whereby the fixing of the gears 26 and 27 is released. In the example of FIGS. 26A, 26B, the gear fixing mechanism 29 is a housing member that houses at least a part of the gears 26 and 27. However, the gear fixing mechanism 29 may be a pin or the like, as long as it is capable of stopping a rotation of the gears 26 and 27.

Further, when the multi-turn detection unit 45 has an initialization function, the rotation position of the steering shaft 92 may be adjusted according to the count value TC, i.e., a value after the initialization of the TC. In such case, the gear fixing mechanism 29 can be omitted. An initial value x0, which is the initialized count value TC, is preferably the middle value Cmid. However, it may be a different value different from the middle value Cmid, and may be appropriately offset according to, for example, an assembly error. In the present embodiment, the multi-turn detection unit 45 is physically initialized by applying a strong magnetic field, a high voltage, or a high electric current to the multi-turn detection unit 45. Further, beside physical initialization process, the method of initialization may also be performed as a software initialization process, which initializes the current position as the initial neutral position, for example, in an inside processing of the count calculator 55.

Figure 27:
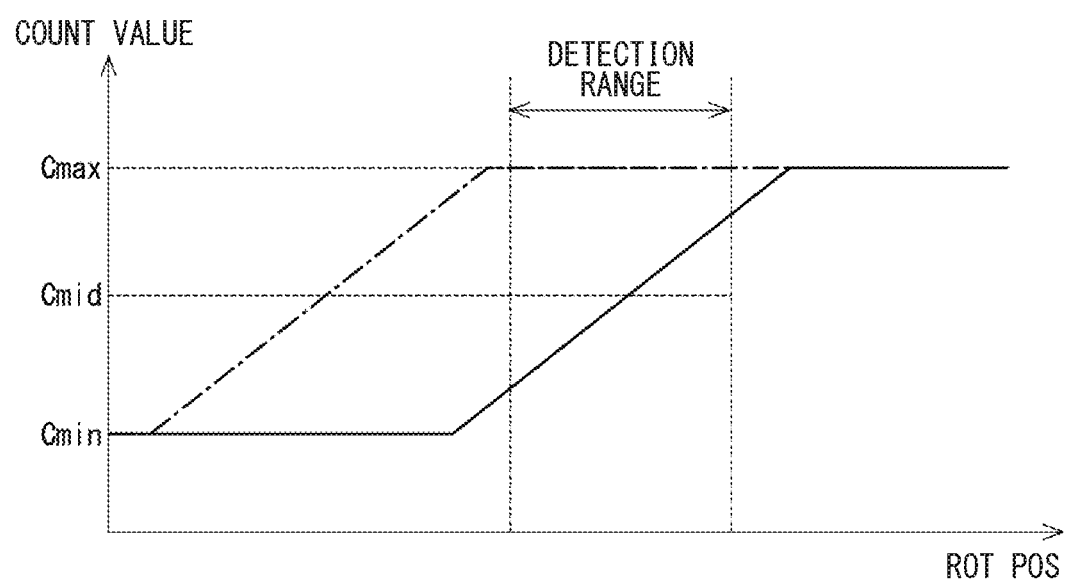
FIG. 27 is an explanatory diagram of a relationship between a rotation position and a count value according to the ninth embodiment.

In the meantime, as shown by a one-dot chain line in FIG. 27, when rotation of the multi-turn detection unit 45 is detected outside the normal detection range, the value may stick to a value outside the detection range. Further, when the count value TC can be changed from the minimum value Cmin or from the maximum value Cmax by rotating the detection object in the opposite direction, as shown by a solid line, the detection range of the multi-turn detection unit 45 and the operation range of the steering shaft 92 are matchable by rotating the steering shaft 92 either to the right-most rotation position or to the left-most rotation position. In such case, middle point learning of the steering operation is performed. Note that the present disclosure is applicable to a system in which the multi-turn detection unit 45 does not stick to the upper/lower limit detection values.

Figure 28:
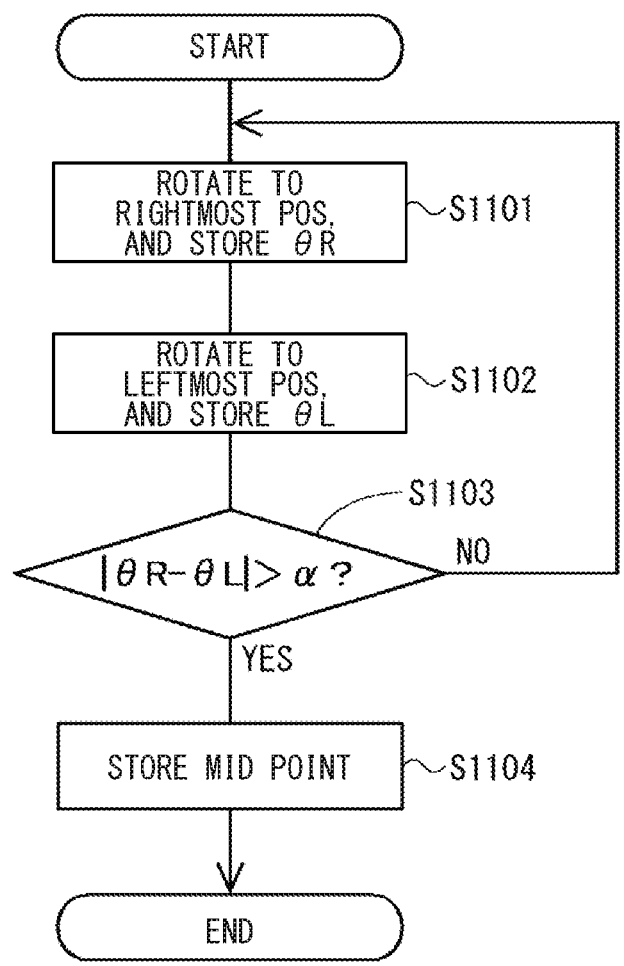
FIG. 28 is a flowchart of a middle point learning process according to the ninth embodiment.

The middle point learning process of the present embodiment will be described based on the flowchart of FIG. 28. This process is performed by the controller 70 when learning of the middle value Cmid is necessary, for example, when the assembly is complete. This process may also be performed in the detection device 401. Hereinafter, "step" of step S1101 is simplified as a symbol S.

In S1101, the controller 70 calculates and stores a right-most steering angle θR using a count value TC_R, which is a count value when the steering wheel 91 is rotated to the right-most rotation position.

In S1102, the controller 70 calculates and stores a left-most steering angle θL using a count value TC_L which is a count value when the steering wheel 91 is rotated to the left-most rotation position.

In S1103, the controller 70 determines whether or not an absolute value of difference between the right-most steering angle θR and the left-most steering angle θL is greater than an operation range determination value α. The operation range determination value α is set according to an operation range between the right-most rotation position and the left-most rotation position of the steering wheel 91. For example, S1103 is yields a negative determination when the count value TC is fixed at a position between the right-most position and the left-most position, or when the right/left-most position is determined erroneously. When it is determined that the absolute value of difference between the right-most steering angle θR and the left-most steering angle θL is equal to or smaller than the operation range determination value α (S1103: NO), the process returns to S1101, and the right-most steering angle θR and the left-most steering angle θL are re-calculated. In case that no positive determination is made after performing the re-calculation couple of times, the process may be terminated as having decisive abnormality. When it is determined that the absolute value of difference between the right-most steering angle θR and the left-most steering angle θL is greater than the operation range determination value α (S1103: YES), the process proceeds to S1104, and the steering midpoint θmid is calculated and stored by using an equation (4).

$$\theta mid = (\theta R + \theta L)/2 \qquad (4)$$

In the present embodiment, the multi-turn detection unit 45 is configured to be capable to detect a magnetic change without receiving a supply of electric power, and continues to detect a magnetic change related to the count value TC even when electric power is not supplied thereto. Further, when the IG is turned on and electric power is supplied to the rotation angle sensor 31, an electric current is supplied to the multi-turn detection unit 45 for detecting an output, thereby enabling appropriate calculation of the steering angle θs even when the steering wheel 91 is rotated while the IG is being turned off. Note that, as the gear rotation angle θg, a value of start switch start timing is usable, thereby continuation of detection of the angle θg is not required for an IG off period.

As described above, the detection device 401 includes the multi-turn detection unit 45, the position detection unit 40, the count calculator 55, and the angle calculation unit 50. The multi-turn detection unit 45 can continue to detect the rotation position of multiple rotations of the steering shaft 92 driven by the motor 80 without receiving a supply of electric power from the outside. The multi-turn detection unit 45 of the present embodiment can continue detection of rotation position(s) of multiple rotations without using electric power. The position detection unit 40 detects a rotation position of the rotor 860 during one rotation of the rotor 860.

Note that the position detection unit 40 has higher resolution than the multi-turn detection unit 45.

The count calculator 55 calculates the multiple rotation position information related to the rotation position(s) of the multiple rotations based on the detection value of the multi-turn detection unit 45. The multiple rotation position information of the present embodiment is the count value TC, i.e., a value related to the number of rotations of the detection gear 27, which is counted up or down n times (i.e., n is an integer of 1 or more) during one rotation of the detection gear 27, according to the rotation direction.

The angle calculation unit 50 calculates the rotation angle θg related to the rotation position during one rotation based on the detection value of the position detection unit 40. The multi-turn detection unit 45 is provided at a position different from the motor 80. More practically, the multi-turn detection unit 45 is provided in the sensor unit 4 having the torque sensor 421 that detects a torque input to the steering shaft 92. More specifically, the multi-turn detection unit 45 is disposed on the same substrate 411 where the torque sensor 421 is disposed.

Since the multi-turn detection unit 45 can continue to detect a rotation position or positions of multiple rotations without using electric power, the detection of the count value TC can be continued even when supply of electric power is interrupted, for example, after the removal of a battery or a replacement of the battery. Further, by disposing the multi-turn detection unit 45 on one substrate 411 together with the torque sensor 421, the configuration can be simplified as compared with a case where the multi-turn detection unit 45 is separately provided at other position.

The multi-turn detection unit 45 of the present embodiment magnetically holds the rotation position(s) of multiple rotations, which can be read by supplying electric power thereto. Thus, the detection of the rotation positions of multiple rotations can be appropriately continued without using electric power.

The multi-turn detection unit 45 detects a rotation position of the detection gear 27 that engages with the output shaft gear 26 that rotates integrally with the steering shaft 92. Therefore, rotation position(s) of the multiple rotations of the steering shaft 92 is appropriately detectable. Also, by setting the gear ratio appropriately, detection accuracy can be increased.

The detection device 401 is applied to the sensor unit 4. The sensor unit 4 is provided with the gear fixing mechanism 29 that can fix (i.e., can unmovably hold) the output shaft gear 26 and the detection gear 27 when the output shaft gear 26, the detection gear 27, and the multi-turn detection unit 45 are assembled to the steering shaft 92. Accordingly, the sensor unit 4 is appropriately assemblable to the steering shaft 92 in a state that enables appropriate detection of a rotation position of multiple rotations by using the multi-turn detection unit 45.

The multi-turn detection unit 45 can initialize a detection value by performing an initialization process. The initialization process according to the present embodiment is a process for applying a strong magnetic field, a high voltage, or a large electric current. In such manner, the detection value can be properly initialized. Further, by assembling the sensor unit 4 to the steering shaft 92 according to the detection value after the initialization, a rotation position of multiple rotations of the steering shaft 92 is appropriately detectable.

The count calculator 55 learns a reference value after operating the shaft 92 from one end of the operation range of the steering shaft 92 to the other end. In the present embodiment, the middle value Cmid is learned as a reference value. In such manner, appropriate detection of a rotation position of multiple rotations of the steering shaft 92 is enabled.

A control unit 1 includes the detection device 401 and the controller 70 having the absolute angle calculator 75 that calculates the absolute angle θa that is a displacement amount from a reference position based on the count value TC and the gear rotation angle θg. Since the count value TC is calculable based on the detection value of the multi-turn detection unit 45 that does not require a power source, the calculation of the absolute angle θa is appropriately performable even during a removal time of the power source (e.g., a battery).

Tenth Embodiment

Figure 29:
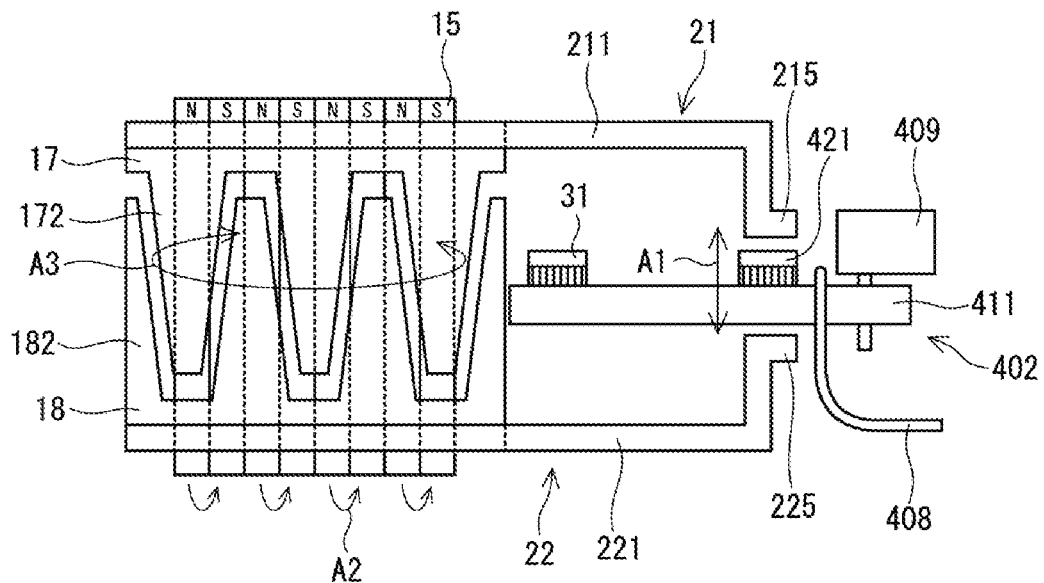
FIG. 29 is a side view of the detection device according to a tenth embodiment.

The tenth embodiment is shown in FIG. 29. In the present embodiment, the detection gear 27 is omitted, and the rotation angle sensor 31 detects the rotation of the multipole magnet 15. That is, in the present embodiment, the multipole magnet 15 is used for both of the detection of the torque and the detection of the rotation position of the steering shaft 92.

As shown in FIG. 29, the magnetic flux collecting rings 21 and 22 are formed such that the ring portions 211 and 221 are greater in diameter than the magnetic yoke 16. The magnetic yoke 16 is arranged radially inward of the magnetic flux collecting rings 21 and 22 and opposite to the magnetic flux collecting portions 215 and 225.

In the detection device 402, the substrate 411 is disposed at a position between the magnetic flux collecting rings 21 and 22. One end of the substrate 411 is formed to extend near the magnetic yoke 16. The torque sensor 421 is mounted on a portion of the substrate 411 between the magnetic flux collecting portions 215 and 225. The rotation angle sensor 31 is arranged on the magnetic yoke 16 side of the substrate 411. The detection values of the torque sensor 421 and the rotation angle sensor 31 are transmitted to the ECU 10 via a communication line 408, for example, by SENT communication or the like. Further, a connector 409 is provided on the substrate 411 outside the magnetic flux collecting rings 21 and 22. The detection device 402 and the ECU 10 may communicate via a harness (not shown) connected to the connector 409.

The angle calculation unit 50 calculates an electric angle θe based on the value detected by the position detection unit 40. In the present embodiment, one magnetic pole pair of the multipole magnet 15 corresponds to an electric angle of 360°. The count calculator 55 calculates a count value TC based on the detection value of the multi-turn detection unit 45. The count value TC according to the present embodiment corresponds to the number of times the magnetic pole of the multipole magnet 15 passes the multi-turn detection unit 45. Therefore, the absolute angle θa is calculable based on (i) the value obtained by converting the count value TC by using the number of magnetic poles and (ii) the electric angle θe. In the present embodiment, since the detection value of the multipole magnet 15 that rotates integrally with the steering shaft 92 is used, the absolute angle θa obtained by converting the number of magnetic poles matches the steering angle θs.

In the present embodiment, the number of components is reducible by sharing the multipole magnet 15. Further, as indicated by an arrow A1, the torque sensor 421 detects an axial magnetic field of the steering shaft 92, and as indicated by arrows A2, A3, the rotation angle sensor 31 detects a circumferential magnetic flux of the multipole magnet 15, thereby improving the detection accuracy without causing mutual disturbance between the arrow A2 magnetic flux and the arrow A3 magnetic flux.

The torque sensor 421 detects a torque by detecting a change in magnetic flux of the multipole magnet 15 that rotates integrally with the steering shaft 92. The multi-turn detection unit 45 detects the rotation position of the multipole magnet 15. Thereby, the number of parts is reducible as compared with a case where a magnet for detecting a rotation position of multiple rotations is provided as a separate magnet from the magnet 15. Further, the effects similar to those of the embodiment described above are achievable.

Eleventh Embodiment, Twelfth Embodiment

Figure 30:
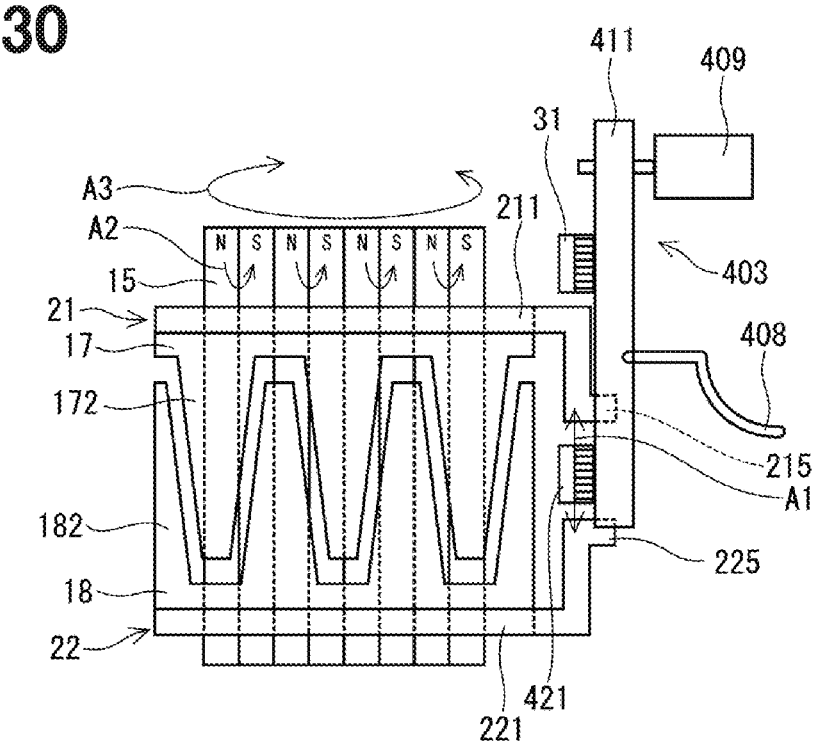
FIG. 30 is a side view of the detection device according to an eleventh embodiment.
Figure 31:
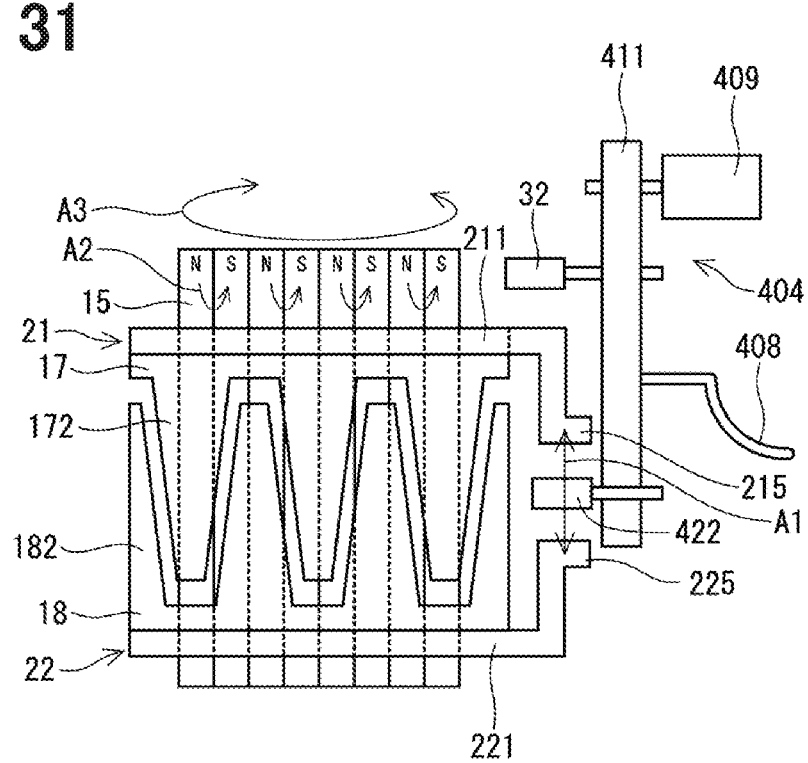
FIG. 31 is a side view of the detection device according to a twelfth embodiment.

FIG. 30 shows the eleventh embodiment, and FIG. 31 shows the twelfth embodiment. In the above embodiments, the substrate 411 is provided perpendicular to the steering shaft 92. As shown in FIG. 30, in a detection device 403 of the eleventh embodiment, the substrate 411 is provided in parallel with the steering shaft 92. Here, "perpendicular" positioning and "parallel" positioning respectively allow an error that affords an arrangement of the torque sensor 421 at a position between the magnetic flux collecting portions.

The torque sensor 421 is disposed at a position between the magnetic flux collecting portions 215 and 225, and detects the strength of the magnetic field in the direction of an arrow A1. Further, the substrate 411 may be formed with a notch for preventing interference with the magnetic flux collecting portions 215 and 225. The rotation angle sensor 31 is mounted on one surface of the substrate 411 facing the multipolar magnet 15 at an outside in the axial direction relative to the magnetic flux collecting rings 21 and 22. The connector 409 is provided on a surface opposite to the steering shaft 92.

In the eleventh embodiment shown in FIG. 30, a surface mount type element is used as the torque sensor 421 and the rotation angle sensor 31. In a detection device 404 of the twelfth embodiment shown in FIG. 31, through-hole type elements are used as a torque sensor 422 and a rotation angle sensor 32. By using a through-hole type element, it becomes easier to collect magnetic flux. The functions and the like of the torque sensor 422 and the rotation angle sensor 32 are the same as those of the torque sensor 421 and the rotation angle sensor 31 except for the mounting type. The configuration described above also achieves the effects similar to those of the embodiments described above.

Thirteenth Embodiment

Figure 32:
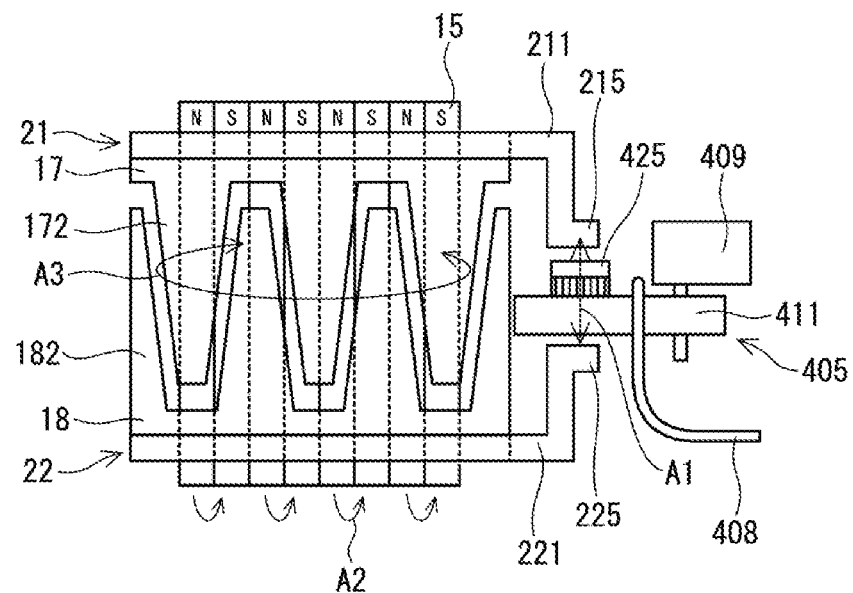
FIG. 32 is a side view of the detection device according to a thirteenth embodiment.

FIG. 32 shows the thirteenth embodiment. In a detection device 405 of the present embodiment, a sensor unit 425 is disposed at a position between the magnetic flux collecting portions 215 and 225, and the functions of the torque sensor and the rotation angle sensor of the above embodiment are integrated into one body. The sensor element of the sensor unit 425 is, for example, a 3D sensor, which detects (i) a rotation angle and the number of rotations of the steering shaft 92 by detecting a magnetic flux in XY directions and (ii) a torque by detecting a magnetic flux in a Z direction, when the radial direction of the multipolar magnet 15 is the XY directions and the axial direction of the magnet 15 is the Z direction. In such manner, the configuration of the detection device 405 is simplified. Further, the thirteenth embodiment also provides the same effects as the preceding embodiments.

Fourteenth Embodiment

Figure 33:
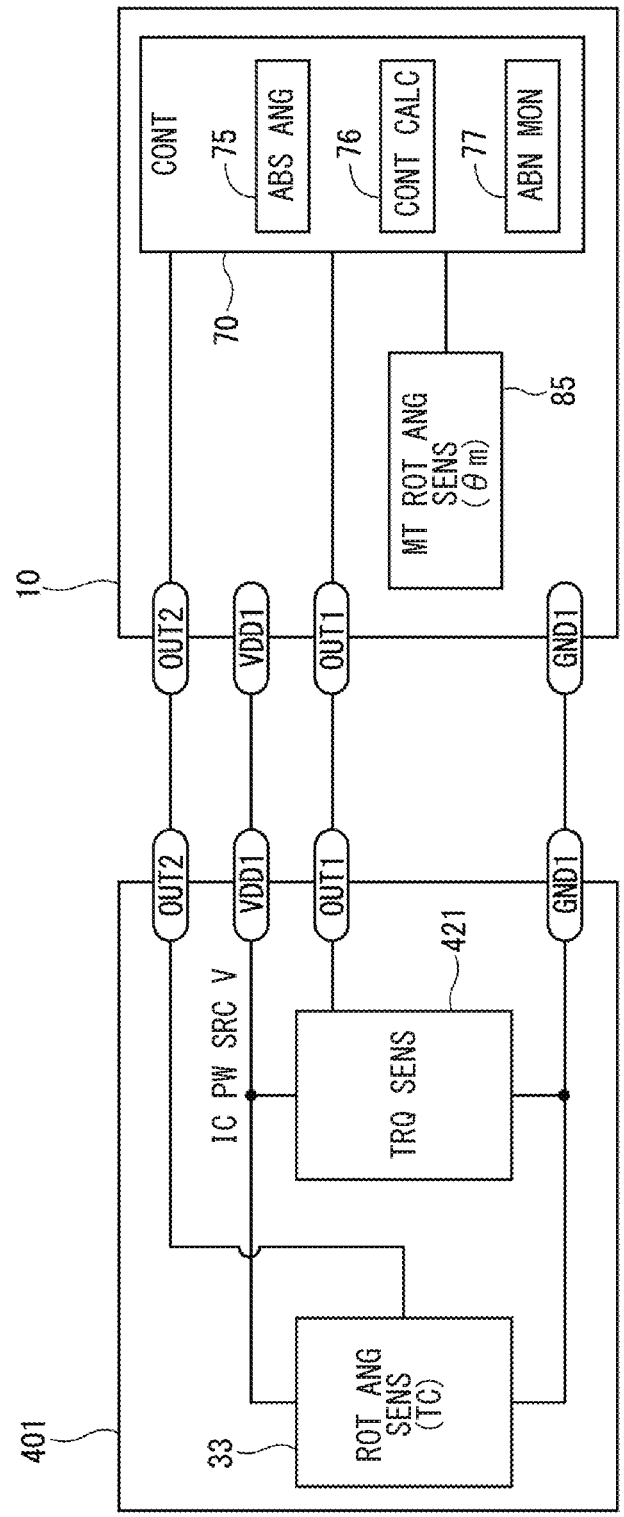
FIG. 33 is a block diagram of the detection device and the ECU according to a fourteenth embodiment.

The fourteenth embodiment is shown in FIG. 33. In the present embodiment, the absolute angle calculator 75 calculates the absolute angle θa based on the count value TC obtained from a rotation angle sensor 33 and a motor rotation angle θm obtained from the motor rotation angle sensor 85. That is, in the present embodiment, the count value TC and the motor rotation angle θm are values related to different rotations, not the same rotation. Therefore, the count value TC and the motor rotation angle θm are appropriately converted by using the number of magnetic poles and the gear ratio, to be used for calculation. Thus, the configurations of the position detection unit 40 and the angle calculation unit 50 in the rotation angle sensor 31 are omitted from the rotation angle sensor 33. Note that, In the rotation angle sensor 33, the functions of the position detection unit 40 and the angle calculation unit 50 related to rotation angle detection are omitted, but the sensor 33 is still referred to as "rotation angle sensor" in the present specification.

In such case, the gear ratio between the steering shaft 92 and the motor 80 is set so that one count of the count value TC corresponds to equal to or less than one rotation of the motor 80. Further, for example, when the rotation of the detection gear 27 is detected as described in the ninth embodiment, the gear ratio can be increased, thereby enabling a size reduction of the detection gear 27. Further, when the sensors are integrated into one body as shown in the thirteenth embodiment, the sensor unit 425 may be provided with a sensor capable of detecting the number of rotations in addition to a sensor element for detecting the magnetic flux in the Z direction.

The control unit 1 includes a motor rotation angle sensor 85 that detects the rotation angle of the motor 80. The absolute angle calculator 75 calculates the absolute angle θa based on (i) the count value TC based on the detection value of the multi-turn detection unit 45 and (ii) the motor rotation angle θm based on the detection value of the motor rotation angle sensor 85. In such manner, the detection and calculation of the gear rotation angle θg in the detection device 401 is omissible, thereby simplifying the configuration. Further, the same effects as the preceding embodiments are also achievable.

Fifteenth Embodiment

Figure 34:
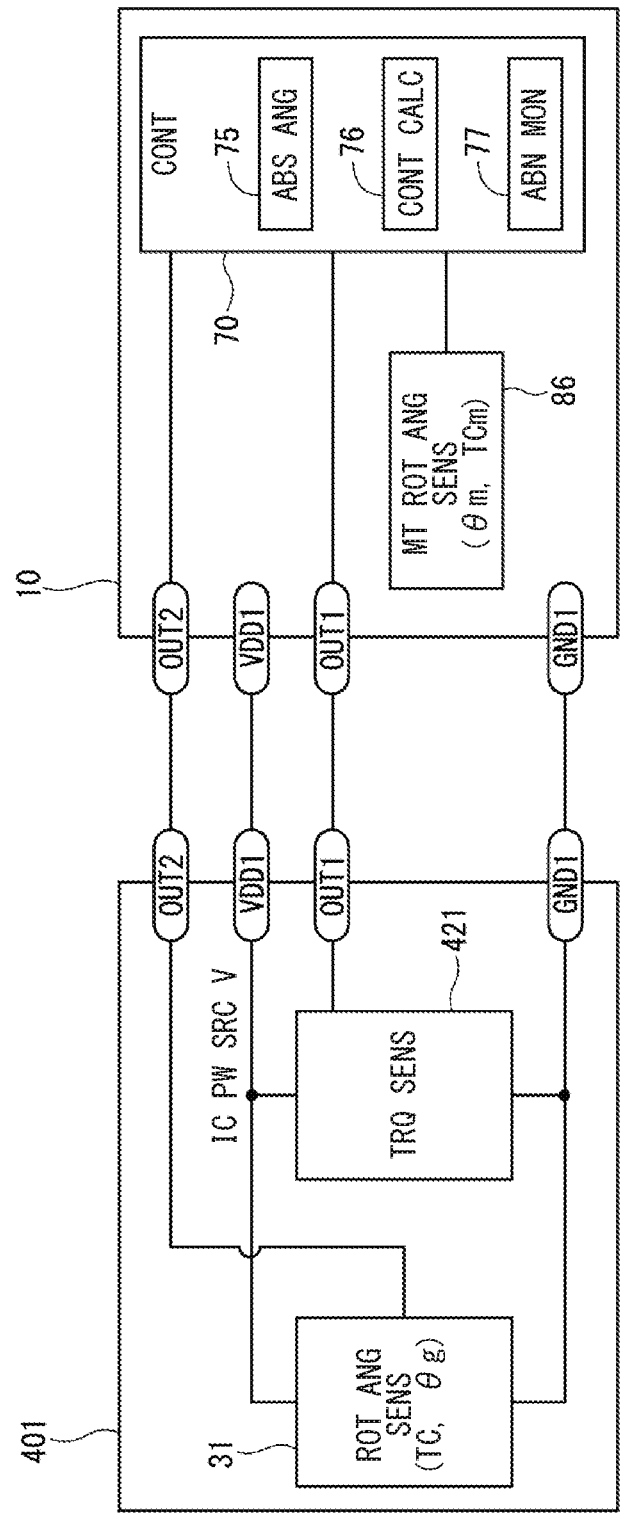
FIG. 34 is a block diagram of the detection device and the ECU according to a fifteenth embodiment.
Figure 35:
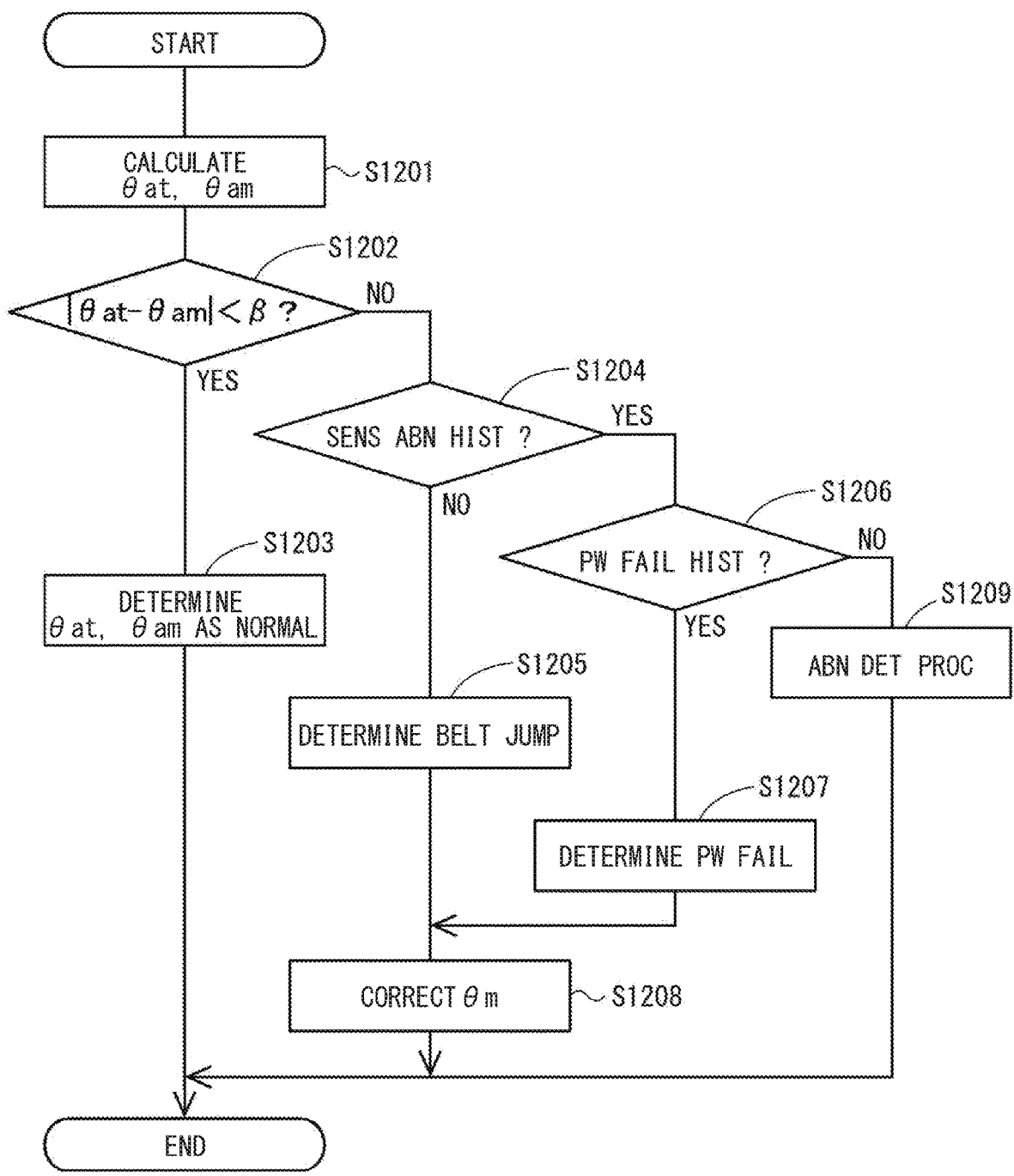
FIG. 35 is a flowchart of an abnormality detection process according to the fifteenth embodiment.

The fifteenth embodiment is shown in FIGS. 34 and 35. In the present embodiment, the detection device 401 of the ninth embodiment is described as an example. However, a detection device of an embodiment other than the ninth embodiment may also be usable. A motor rotation angle sensor 86 calculates a count value TCm that can be converted into the number of rotations of the rotor of the motor 80 in addition to the motor rotation angle θm. The sensor for detecting the motor rotation angle θm is supplied with electric power when a vehicle start switch such as an ignition switch is turned on, and the sensor for detecting the count value TCm is supplied with electric power at all times.

The absolute angle calculator 75 calculates a shaft-side absolute angle θat and a motor-side absolute angle θam. The shaft-side absolute angle θat is a value calculated based on a count value TC corresponding to the number of rotations of the detection gear 27 detected by the rotation angle sensor 31 and the gear rotation angle θg. It is a rotation angle including the multiple rotation information from the reference position. The motor-side absolute angle θam is a value calculated based on the count value TCm corresponding to the number of rotations of the motor 80 detected by the motor rotation angle sensor 85 and the motor rotation angle θm, and is calculated as a rotation angle from a reference position of the motor 80 including the multiple rotation information.

The abnormality monitoring unit 77 performs abnormality monitoring based on the absolute angles θat and θam. After conversion by the gear ratio, the shaft-side absolute angle θat and the motor-side absolute angle θam match with each other if they are both normal. Hereinafter, the absolute angles θat and θam will be described as values after gear ratio conversion.

For example, when the wheel 98 is rotated at a high speed due to an external factor, a connection between the steering shaft 92 and the motor 80 may be shifted. If the steering shaft 92 and the motor 80 are connected by a belt, a belt jump occurs, and if the steering shaft 92 and the motor 80 are connected by a gear, a tooth jump occurs. Hereinafter, the situation is described as a "belt jump."

Also, due to a reset of the count value TC caused by a power failure from battery replacement or the like, the reset value of the motor-side absolute angle θam may have a different value from the shaft-side absolute angle θat. Since such a belt jump or power failure is not an abnormality of an electronic component such as a sensor or the like, it may be desirable that such a situation is distinguished from other situations for the recovery to a normal operation.

The abnormality detection process according to the present embodiment is described with reference to the flowchart in FIG. 35. This process is performed by the controller 70 when, for example, the IG is turned on. In S1201, the absolute angle calculator 75 calculates the shaft-side absolute angle θat based on the count value TC of the rotation angle sensor 31 and the gear rotation angle θg, and calculates the motor-side absolute angle θam based on the count value TCm of the motor rotation angle sensor 86 and the motor rotation angle θm.

In S1202, the abnormality monitoring unit 77 determines whether an absolute value of difference between the shaft-side absolute angle θat and the motor-side absolute angle θam is smaller than an abnormality determination value β. The abnormality determination value β is set according to a value allowed as a difference between the shaft-side absolute angle θat and the motor-side absolute angle θam. When it is determined that the absolute value of difference between the absolute angles θat and θam is smaller than the abnormality determination value β (S1202: YES), the process proceeds to S1203, and it is determined that the absolute angles θat and θam are normal. When it is determined that the absolute value of difference between the absolute angles θat and θam is equal to or greater than the abnormality determination value β (S1202: NO), the process proceeds to S1204.

In S1204, the abnormality monitoring unit 77 determines whether at least one of the detection device 401 and the ECU 10 has an abnormality history. When it is determined that there is no abnormality history in the detection device 401 and the ECU 10 (S1204: NO), the process proceeds to S1205, and it is determined that the belt jump has happened. When it is determined that there is an abnormality history in the detection device 401 or the ECU 10 (S1204: YES), the process proceeds to S1206.

In S1206, the abnormality monitoring unit 77 determines whether there is a power failure history. For example, when the battery is replaced, the power supply to the motor rotation angle sensor 85 is interrupted, which is stored as history of a power failure abnormality. Further, a power failure abnormality may be detected by setting a specific flag at the time of startup with power-on. When it is determined that there is a power failure history (S1206: YES), the process proceeds to S1207, and it is determined as power failure. When it is determined that there is no power failure history (S1206: NO), the process proceeds to S1209.

In case that it is determined as the belt jump (S1205) or in case that it is determined as the power failure (S1207), subsequently in S1208, the controller 70 corrects the motor-side absolute angle θam so as to match the shaft-side absolute angle θat and the motor-side absolute angle θam. In S1209, it is determined that the absolute angles θat and θam are abnormal, and the process proceeds to a backup operation.

In the present embodiment, since the absolute angles θat and θam are calculated using different configurations, it is possible to appropriately detect an abnormality. Further, a same failure mode is avoidable.

Further, by using the shaft-side absolute angle θat and the motor-side absolute angle θam, the belt jump is appropriately detectable.

The absolute angle calculator 75 calculates (i) the shaft-side absolute angle θat based on the detection value of the multi-turn detection unit 45 and the detection value of the position detection unit 40 that detects the rotation position of the steering shaft 92 during one rotation, and (ii) the motor-side absolute angle θam based on the detection value of the motor rotation angle sensor 85. The controller 70 includes the abnormality monitoring unit 77 that performs abnormality monitoring based on the shaft-side absolute angle θat and the motor-side absolute angle θam. In such manner, a power failure, a belt jump, and the like are appropriately detectable. Further, the same effects as the preceding embodiments are also achievable.

Sixteenth Embodiment

Figure 36:
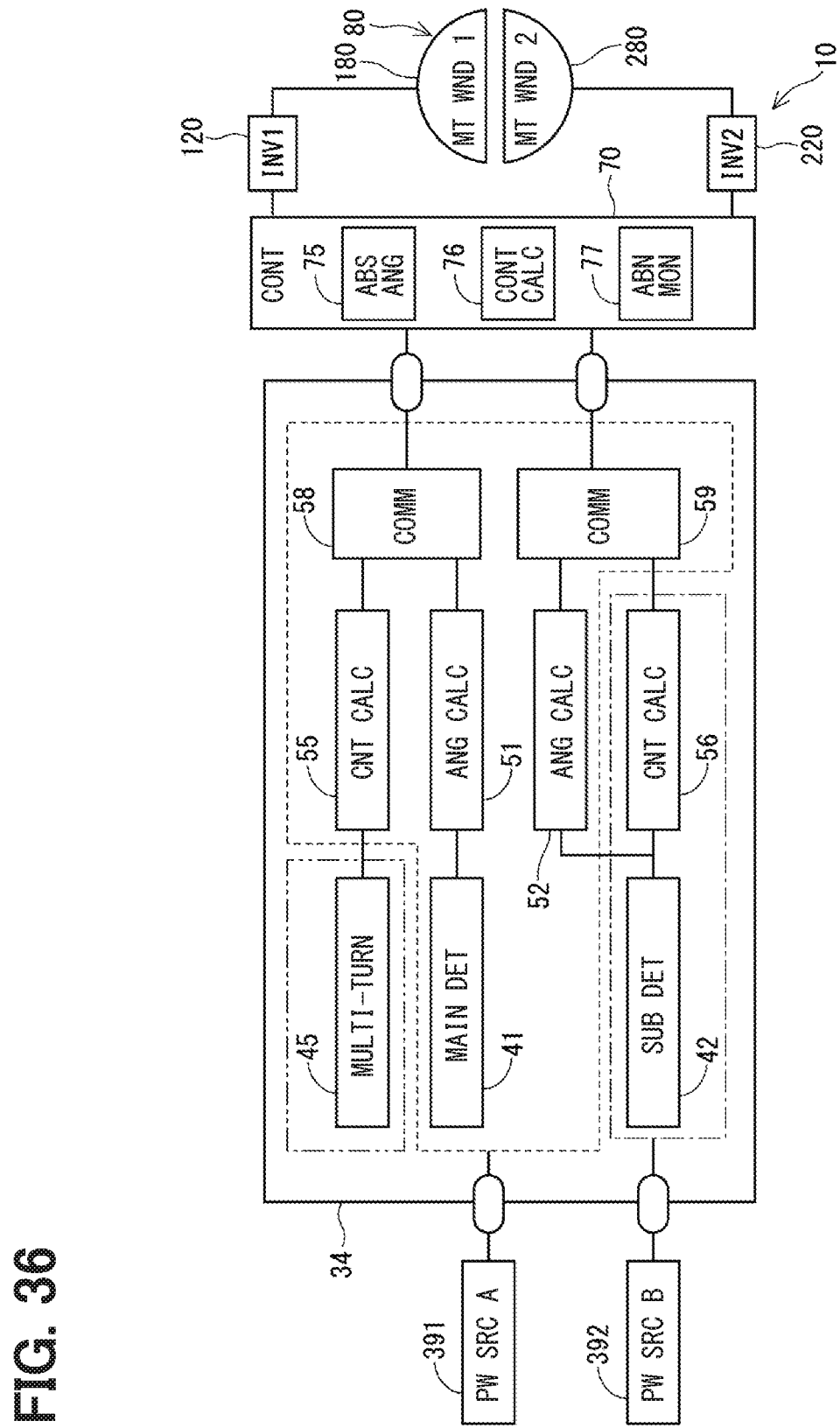
FIG. 36 is a block diagram of a rotation angle sensor and the ECU according to a sixteenth embodiment.
Figure 37:
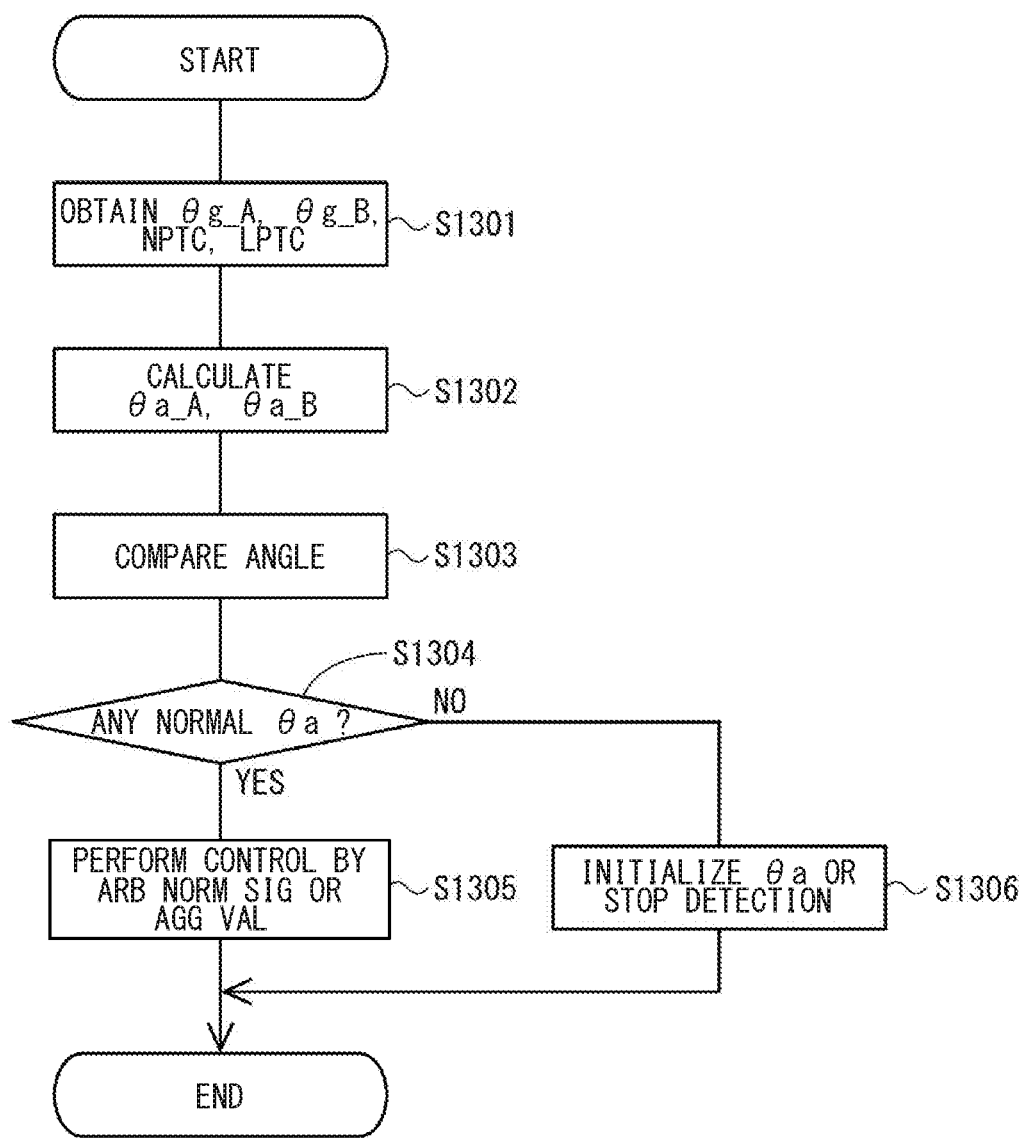
FIG. 37 is a flowchart of an abnormality monitoring process according to the sixteenth embodiment.

The sixteenth embodiment is shown in FIGS. 36 and 37. As shown in FIG. 36, a rotation angle sensor 34 includes the main detection unit 41, the sub detection unit 42, the multi-turn detection unit 45, angle calculators 51 and 52, count calculators 55 and 56, the torque sensor 421, and communication units 58 and 59, and receives supply of electric power from the power sources 391 and 392. In the following embodiments, illustration of the motor rotation angle sensor 85 and the torque sensor 421 is omitted as appropriate. The power source 391 can supply electric power to the rotation angle sensor 34 via the IG when the IG is turned on. The power source 392 is a constant voltage power source such as a regulator, and supplies electric power from a battery (not shown) to the rotation angle sensor 34 regardless of the on/off state of the IG. In the drawing, a block surrounded by a one-dot chain line always receives a supply of electric power.

The main detection unit 41 and the sub detection unit 42 detect the rotation of the detection gear 27 that engages with the output shaft gear 26 that rotates integrally with the output shaft 12, similarly to the position detection unit 40. Further, the main detection unit 41 and the sub detection unit 42 may alternatively detect the rotation of the multipole magnet 15 as in the tenth embodiment and the like. The same applies to the following embodiments.

It is desirable that the main detection unit 41 and the sub detection unit 42 have different sensor characteristics. For example, the main detection unit 41 may be an AMR element, and the sub detection unit 42 may be a TMR element. Here, even if the types of elements are the same, differences in layout and ratio of materials, manufacturing lots, wafer numbers in lots, and chip positions in wafers may be regarded as "different configurations related to the detection elements." In addition, a difference not only in the element but also in the detection circuit connected to the element, the calculation circuit, as well as the type and voltage of the power source supplied thereto may also be regarded as "different configurations related to the detection elements." The use of sensors having different sensor characteristics makes it difficult to cause a failure due to a common cause such as an abnormal magnetic flux density, which is preferable in terms of functional safety. The TMR element may preferably be used when the low power consumption is important, and the AMR element may preferably be used when the magnetic field resistance is important.

Here, with respect to the detection units 41 and 42, "main" and "sub" are added to distinguish the two, but the detection units 41 and 42 may be functionally equivalent to each other. Further, for example, the functions may be divided among the two units, such that the main detection unit 41 is used for control and the sub detection unit 42 is used for abnormality monitoring. The same applies to the following embodiments. Hereinafter, "A" is added to the configuration and value of the main detection unit 41, and "B" is added to the configuration and value of the sub detection unit 42 as appropriate.

The angle calculator 51 calculates a gear rotation angle θg_A based on the detection value of the main detection unit 41 that has been AD-converted by an AD converter (not shown). The angle calculator 52 calculates a gear rotation angle θg_B based on the detection value of the sub detection unit 42 that has been AD-converted by an AD conversion unit (not shown). Hereinafter, when the values calculated by the angle calculators 51 and 52 are appropriately distinguished, the values are referred to as the gear rotation angles θg_A and θg_B. When distinction therebetween is not required, both vales may be referred to as the gear rotation angle θg. By comparing the gear rotation angles θg_A and θg_B, it is possible to detect whether an abnormality has occurred.

The count calculator 56 is constantly supplied with electric power from the power source 392, and calculates the count value TC of the detection gear 27 based on the detection value of the sub detection unit 42. Hereinafter, when appropriately distinguishing the value calculated by the count calculator 55 and the value calculated by the count calculator 56, the value calculated by the count calculator 55 is referred to as the count value NPTC (i.e., No Power Turn Count), and the value calculated by the count calculator 56 is referred to as LPTC (i.e., Low Power Turn Count). The count values NPTC and LPTC are calculated using detection values of respectively-different detection methods, which provides a heterogeneous redundant configuration. Note that the count value NPTC may be counted by one in one rotation of the detection gear 27, and the count value LPTC may be counted by four in one rotation of the detection gear 27, and so on. In other words, the number of counts per rotation may be different between NPTC and LPTC. For example, when comparing the count values NPTC and LPTC, they may be appropriately converted from one to the other. Hereinafter, when it is not necessary to distinguish the detection units, the count value is simply referred to as the count value TC.

By comparing the count values NPTC and LPTC, it is possible to detect whether or not an abnormality has occurred. Further, the comparison of the count values may be performed in the rotation angle sensor 34 or may be performed in the controller 70. The same applies to the gear rotation angles θg_A and θg_B. The same effect can be obtained by comparing the after-conversion absolute angles θa_A and θa_B. The communication unit 58 outputs the gear rotation angle θg_A and the count value NPTC to the controller 70, and the communication unit 59 outputs the gear rotation angle θg_B and the count value LPTC to the controller 70.

Although the multi-turn detection unit 45 has the advantage of not requiring supply of electric power, there is a risk of shift of corresponding rotation number and/or data failure due to a disturbance magnetic field or long-term data retention. Therefore, in the present embodiment, in addition to the calculation of the count value NPTC using the detection value of the multi-turn detection unit 45, electric power is constantly supplied to the sub detection unit 42 and to the count calculator 56 to calculate the count value LPTC. Thereby, the calculation of the count value TC is made redundant, and an abnormality in the calculation is detectable. In addition, since the multi-turn detection unit 45 and the sub detection unit 42 have different configurations, a common cause failure is unlikely to occur, and an abnormality is easily detectable.

The absolute angle calculator 75 calculates the absolute angle θa_A based on the gear rotation angle θg_A and the count value NPTC, and calculates the absolute angle θa_B based on the gear rotation angle θg_B and the count value LPTC. The abnormality monitoring unit 77 performs abnormality monitoring based on the absolute angles θa_A and θa_B.

The abnormality monitoring process according to the present embodiment is described with reference to the flowchart in FIG. 37. This processing is performed by the controller 70. Here, when the count value TC is used in the initial calculation at the time of startup and the count value TC is not used during the operation, the process is performed when the IG switches from off to on or when the controller 70 is reset. When the count value TC is used not only during the initial calculation at the time of startup but also during operation, the process is performed at a predetermined cycle during operation. Hereinafter, "step" of step S1301 is simply indicated as a symbol "S."

In S1301, the controller 70 obtains the gear rotation angles θg_A and θg_B, and the count values NPTC and LPTC. In S1302, the controller 70 calculates the absolute angle θa_A using the count value NPTC and the gear rotation angle θg_A, and calculates the absolute angle θa_B using the count value LPTC and the gear rotation angle θg_B (see Equation (1)).

In S1303, the controller 70 performs abnormality determination by comparing the absolute angles θa_A and θa_B. When the number of values calculated in S1302 is two, it is determined as normal if the difference of the two values is within a normal range, and it is determined as abnormal when the difference of the two values is out of the normal range. Further, for example, when there are three or more detection units and three or more absolute angles θa are calculated, a normal value is identified by majority decision. The gear rotation angle θg and the count value TC used for the calculation of the normal absolute angle θa are referred to as "normal signals."

In S1304, the controller 70 determines whether or not there is a normal absolute angle θa. When it is determined that there is a normal absolute angle θa (S1304: YES), the process proceeds to S1305, and various control calculations such as calculation of the steering angle θs and the like are performed by using an arbitrary normal signal or a total value of a plurality of normal signals. When it is determined that there is no normal absolute angle θa (S1304: NO), the process proceeds to S1306, and the absolute angle θa is reset. In such case, since the correspondence between the absolute angle θa and the steering angle θs is indefinite, the relationship between the absolute angle θa and the steering angle θs is learned by, for example, detecting the absolute angle θa when the steering wheel 91 is in the neutral position during a straight travel of the vehicle. Learn correspondence. Alternatively, the detection of the absolute angle θa may be stopped, depending on the configuration.

The rotation angle sensor 34 includes the count calculator 56 that calculates a count value TC based on the detection value of the sub detection unit 42. Electric power is constantly supplied to the sub-detecting unit 42 and the count calculator 56 in which the detection value is used for the calculation of the count value TC. In such manner, even when a disturbance magnetic field abnormality or the like occurs in the multi-turn detection unit 45, the detection of the count value TC is continuable. Further, abnormality is detectable by comparing the count values NPTC and LPTC. Furthermore, since the detection principles of the detection values used for calculating the count values NPTC and LPTC are different, the probability of occurrence of a failure due to a common cause is reducible.

In the present embodiment, the main detection unit 41 and the sub detection unit 42 are provided as position detectors. In other words, there are a plurality of position detectors in the present embodiment. The detection value of the sub detection unit 42 as at least one position detector is shared by the angle calculator 52 and the count calculator 56. Thus, the calculation of the gear rotation angle θg and the count value TC can be made redundant with a relatively simple configuration.

The main detection unit 41 and the sub detection unit 42 are different in the configuration related to the detection element. As a result, occurrence of an abnormality due to the same cause can be suppressed, and functional safety can be improved. That "configuration related to the element" is different means that either (i) the type of the element is different (for example, difference between a TMR device, an AMR device, a Hall device, and the like), (ii) the internal configuration of the element is different (for example, the wafer is different, the layout is different, the material is different and the like, the manufacturing conditions are different, the manufacturing lot is different, and the like), (iii) the circuit configuration connected to the elements is different, or (iv) the type and/or voltage of the electric power supplied to the elements are different.

At least two absolute angles θa_A and θa_B are calculated using different count values NPTC and LPTC and different motor rotation angles θm_A and θm_B. The controller 70 includes the abnormality monitoring unit 77 that performs abnormality monitoring based on a plurality of absolute angles θa_A and θa_B calculated using different detection values. Thereby, abnormality monitoring of the rotation angle sensor 34 is appropriately performable. Further, the same effects as the preceding embodiments are achievable.

Seventeenth Embodiment, Eighteenth Embodiment

Figure 38:
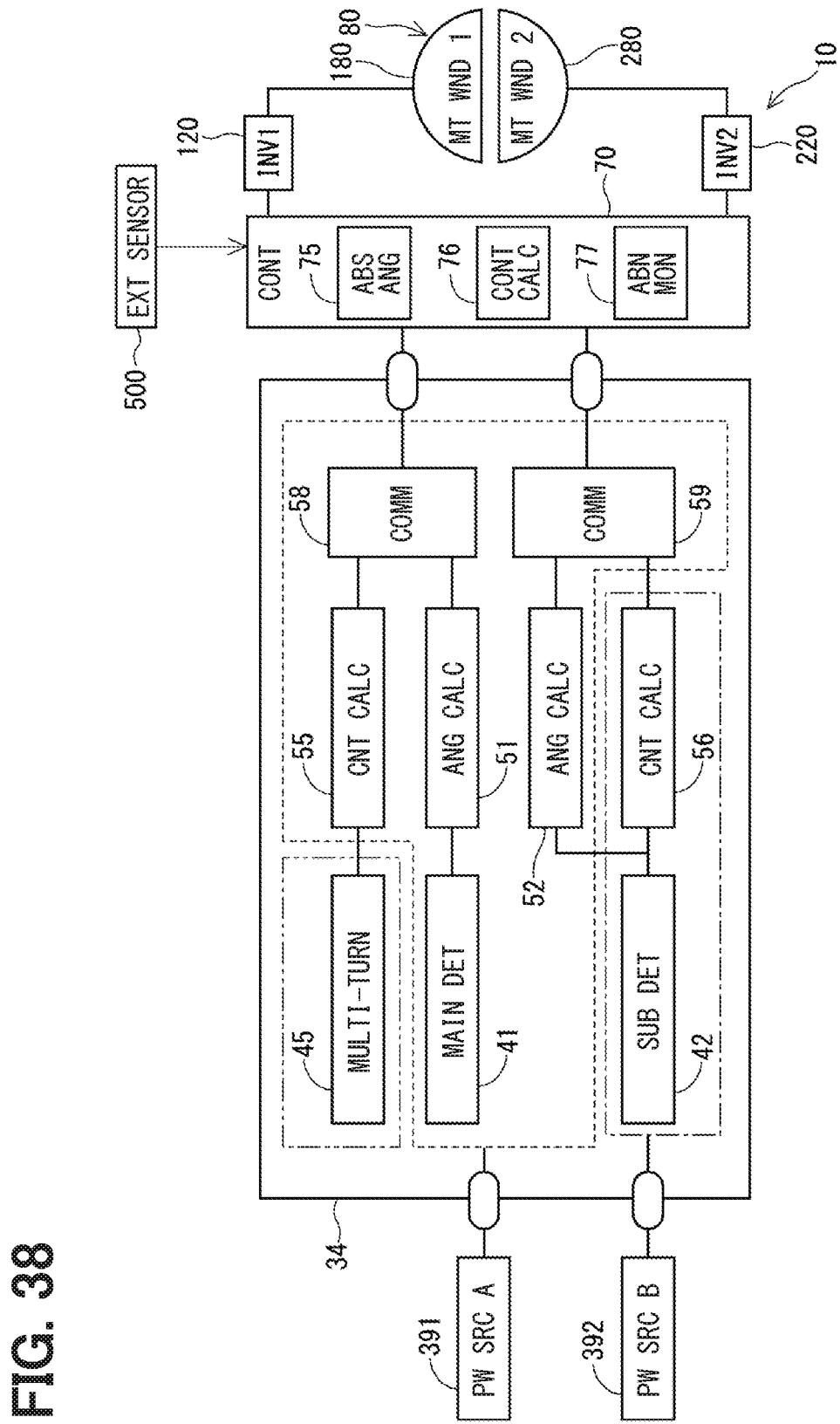
FIG. 38 is a block diagram of the rotation angle sensor and the ECU according to a seventeenth embodiment.
Figure 39:
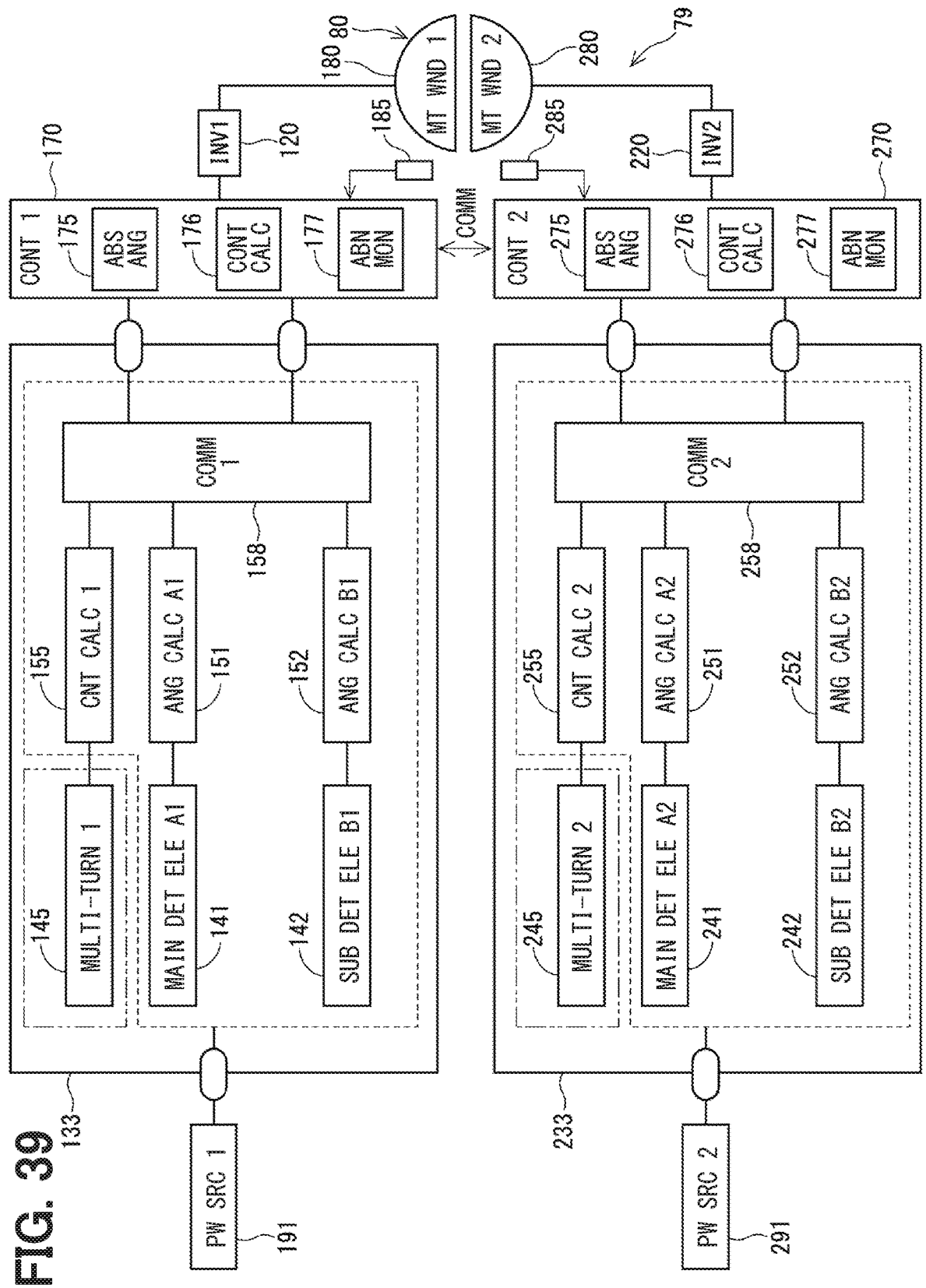
FIG. 39 is a block diagram of the rotation angle sensor and the ECU according to an eighteenth embodiment.

FIG. 38, along with FIG. 8, show the seventeenth embodiment, and FIG. 39 shows the eighteenth embodiment. As shown in FIGS. 38 and 39, the controller 70 of the present embodiment can obtain an external detection value that can be converted to the absolute angle θa from the external sensor 500. As the rotation angle sensor, FIG. 38 of the seventeenth embodiment shows the rotation angle sensor 34 of the sixteenth embodiment, and FIG. 39 of the eighteenth embodiment shows the rotation angle sensor 31 of the ninth embodiment. Communication between the external sensor 500 and the controller 70 may be performed by any communication method such as CAN (Controller Area Network), LIN (Local Interconnect Network), Flexray or the like. The external sensor 500 is, for example, a steering sensor, a stroke sensor, or the like. The value converted from the detection value of the external sensor 500 to be comparable with the absolute angles θa_A and θa_B by using the gear ratio of the gear connecting the motor 80 and the steering system is defined as the absolute angle θa_C.

Hereinafter, abnormality monitoring is described focusing on the seventeenth embodiment. In the seventeenth embodiment, three values can be used as the absolute angle θa. Therefore, in S1303 in FIG. 37, a value that is different from the other two values is identified as abnormal. As in FIG. 8, in this embodiment, comparison (1) is a comparison of the absolute angles θa_A and θa_B, comparison (2) is a comparison of the absolute angles θa_A and θa_C, and comparison (3) is a comparison of the absolute angles θa_B and θa_C. If the comparisons (1), (2), and (3) are all normal, the absolute angles θa_A, θa_B, and θa_C are all identified as normal, and the comparisons (1), (2), and (3) are all abnormal, normal values and abnormal values cannot be identified. Further, when two of the comparisons (1), (2), and (3) are normal and one is abnormal, the identification of normal and abnormal values is not possible.

If the comparisons (1) and (2) are abnormal and the comparison (3) is normal, the absolute angle θa_A is identified as abnormal. Abnormality of the absolute angle θa_A includes (i) a failure is being caused, preventing continuation of detection occurring and (ii) data skip is being caused in the multi-turn detection unit 45 due to a disturbance magnetic field.

When the comparisons (1) and (3) are abnormal and the comparison (2) is normal, the absolute angle θa_B is identified as abnormal. Abnormality of the absolute angle θa_B includes (i) a failure is being caused in the sub detection unit 42, preventing continuation of detection, and (ii) a power failure such as battery replacement or the like.

When the comparisons (2) and (3) are abnormal and the comparison (1) is normal, the absolute angle θa_C is identified as abnormal. Abnormality of the absolute angle θa_C includes (i) a failure is being caused in the external sensor 500, preventing continuation of detection.

That is, even when the absolute angles θa_A, θa_B, and θa_C are abnormal, abnormality may be being caused not by device failure but by abnormal data. Therefore, the internal monitoring function of each sensor and/or the external monitoring function may be employed for a determination of failure, and if it is determined that there is no failure, a correction process may be performed according to the difference from the normal sensor that has been determined as normal.

Further, a sensor configuration capable of calculating each of the absolute angles θa_A, θa_B, and θa_C multiple times may be employed, and, when both of the absolute angles θa_Ax and θa_Ay corresponding to the absolute angle θa_A are identified as abnormal, such a situation may be determined not as a device failure but as data abnormality with which detection is still continuable, by correcting abnormal data. When one of the absolute angles θa_Ax and θa_Ay is abnormal, it may be determined as a device failure.

The controller 70 has the abnormality monitoring unit 77 which performs abnormality monitoring by obtaining the external detection value that can be converted into the absolute angle θa from the external sensor 500, and by performing a comparison between (i) the absolute angle θa_C calculated from the detection value of the external sensor 500 and (ii) the absolute angles θa_A and θa_B based on the detection value of the rotation angle sensor 34. That is, the absolute angles θa_A, θa_B, and θa_C are "a plurality of absolute positions calculated using different detection values." Accordingly, abnormality monitoring is appropriately performable using the detection values of the external sensor 500. If at least one of (i) the absolute angle based on the detection value of the rotation angle sensor 34 and (ii) the absolute angle based on the detection value of the external sensor 500 is available as two values (e.g., as θa_Ax and θa_Ay), an abnormal position is determinable by majority decision. Further, the same effects as the preceding embodiments are achievable.

Nineteenth Embodiment

FIG. 9 further shows the nineteenth embodiment. An ECU 79 of the present embodiment includes the drive circuits 120 and 220, the controllers 170 and 270, motor rotation angle sensors 185 and 285, and the like. In the present embodiment, since the two controllers 170 and 270 are provided, the drive control of the motor 80 is continuable even if one of the two controllers fails.

The first controller 170 includes the absolute angle calculator 175, the control calculator 176, and an abnormality monitoring unit 177. The second controller 270 includes the absolute angle calculator 275, the control calculator 276, and an abnormality monitoring unit 277. The absolute angle calculators 175 and 275 calculate the steering angle θs in addition to the absolute angle θa.

The control calculator 176 controls the energization of the motor winding 180 by controlling the on/off operation of first switching elements included in the first drive circuit 120. The control calculator 276 controls the energization of the motor winding 280 by controlling the on/off operation of second switching elements included in the second drive circuit 220. The abnormality monitoring units 177 and 277 perform abnormality monitoring by mutual monitoring of the absolute angles. The controllers 170 and 270 can transmit and receive information by communication. Hereinafter, the communication between the controllers 170 and 270 is appropriately referred to as communication between microcomputers, or as an inter-microcomputer communications.

The first rotation angle sensor 133 includes the main detection unit 141, the sub detection unit 142, the multi-turn detection unit 145, the angle calculators 151 and 152, the count calculator 155, and the communication unit 158. The second rotation angle sensor 233 has the main detection unit 241, the sub detection unit 242, the multi-turn detection unit 245, the angle calculators 251, 252, the count calculator 255, and the communication unit 258. The first rotation angle sensor 133 receives a supply of electric power from the power source 191 when the IG is turned on, and the second rotation angle sensor 233 receives a supply of electric power from the power source 291 when the IG is turned on. The power sources 191 and 291 are constant voltage power sources such as regulators, just like the power source 391 of the previous embodiment.

The main detection units 141 and 241 are the same as the main detection unit 41 of the sixteenth embodiment, the sub detection units 142 and 242 are the same as the sub detection unit 42 of the sixteenth embodiment, and the angle calculators 151 and 251 are the same as the angle operator 51, and the angle calculators 152 and 252 are the same as the angle calculator 52. Hereinafter, as appropriate, the configuration and values of the main detection unit 141 have a sign "A1," the configuration and values of the sub detection unit 142 have a sign "B1," the configuration and values of the main detection unit 241 have a sign "A2," and the configuration and values of the sub detection unit 242 have "B2." The multi-turn detection units 145 and 245 are the same as the multi-turn detection unit 45, and the count calculators 155 and 255 are the same as the count calculator 55.

Here, the value calculated by the angle calculator 151 is the gear rotation angle θg_A1, the value calculated by the angle calculator 152 is the gear rotation angle θg_B1, and the value calculated by the angle calculator 251 is the gear rotation angle θg_A2, and the value calculated by the angle calculator 252 is referred to as the gear rotation angle θg_B2. The value calculated by the count calculator 155 is referred to as a count value NPTC1, and the value calculated by the count calculation unit 255 is referred to as a count value NPTC2.

The communication unit 158 transmits the gear rotation angles θg_A1, θg_B1 and the count value NPTC1 to the first controller 170. The communication unit 258 transmits the gear rotation angles θg_A2 and θg_B2 and the count value NPTC2 to the second controller 270.

In the present embodiment, the first rotation angle sensor 133 and the first controller 170 are included in the first system, and the second rotation angle sensor 233 and the second controller 270 are included in the second system. In each system, one count value NPTC is calculated, and two gear rotation angles θg are calculated. In the present embodiment, the rotation angle sensors 133 and 233 and the controllers 170 and 270 are configured in the same manner in the first system and the second system. Therefore, the processing in the first controller 170 is mainly described. Further, by replacing the value of the first system with the value of the second system, the processing in the second controller 270 may simply read on the processing in the first system, thereby the description regarding the second system is omitted as appropriate.

The first controller 170 calculates the steering angle θs by using the count value NPTC1 in the first calculation after switching of the IG from off to on, and thereafter integrates an amount of change of the gear rotation angle θg into the first calculation value, for the calculation of the steering angle θs. This eliminates the need of constant monitoring of the count value NPTC. Abnormality monitoring of the count value NPTC1 may be performed at a timing before the first calculation after the IG is turned on either as (i) self-monitoring in the subject system described in the eleventh embodiment or (ii) abnormality monitoring by comparison with the count value NPTC2 obtained by inter-microcomputer communications.

Further, the gear rotation angle θg is configured so that two values can be calculated for each system. By comparing the values in the respective systems, the IG is constantly monitored at a predetermined cycle while the IG is on. As a result, the communication load of the inter-microcomputer communications can be reduced as compared with the case where the gear rotation angle is obtained from the other system for abnormality monitoring by the inter-microcomputer communications. Further, since abnormality monitoring in the respective systems is made possible, the absolute angle θa can be calculated at high speed by using the value determined as normal. By devising such a configuration, constant supply of electric power is not required, and abnormality monitoring is appropriately performable. Further, the same effects as the preceding embodiments are achievable.

Twentieth Embodiment

Figure 40:
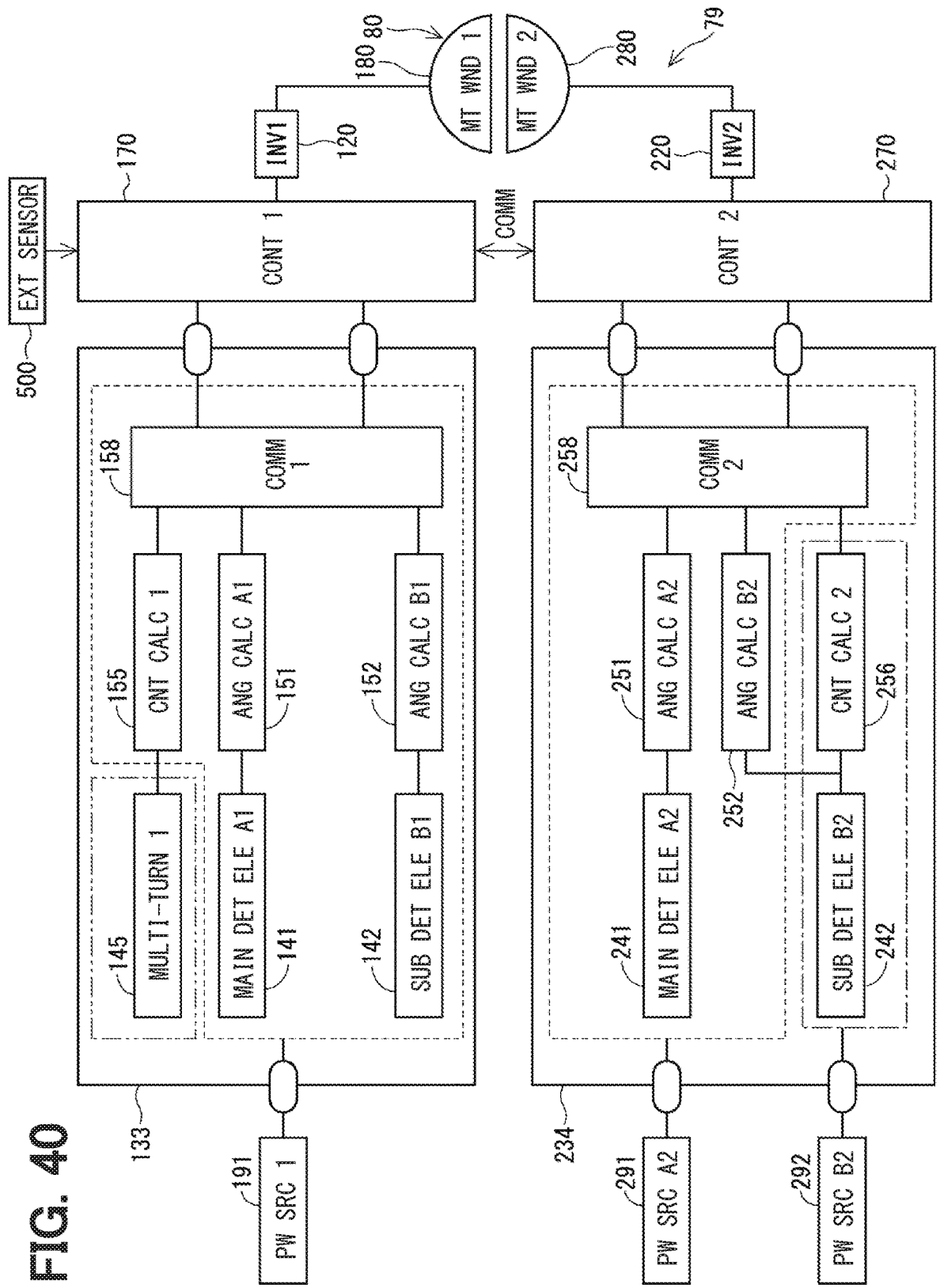
FIG. 40 is a block diagram of the rotation angle sensor and the ECU according to a twentieth embodiment.

FIG. 40 shows the twentieth embodiment. The second rotation angle sensor 234 includes the main detection unit 241, the sub detection unit 242, the angle calculators 251 and 252, the count calculator 256, and the communication unit 258, and receives a supply of electric power from the power sources 291 and 292. Like the power source 391, the power source 291 can supply electric power via the IG when the IG is turned on, and like the power source 392, the power source 292 can supply electric power from the battery regardless of the on/off state of the IG.

In the present embodiment, in the second rotation angle sensor 234, the multi-turn detection unit is omitted, and the count calculator 256 calculates the count value LPTC2 by using the detection value of the sub detection unit 242. The count calculator 256 is the same as the count calculator 56. The communication unit 258 transmits the gear rotation angles θg_A2 and θg_B2 and the count value LPTC2 to the second controller 270. Further, the first controller 170 can obtain the detection value of the external sensor 500.

In the present embodiment, three values are used for abnormality monitoring, i.e., (i) the absolute angle θa_A1 calculated by using the count value NPTC in the first system L1, (ii) the absolute angle θa_B2 calculated by using the count value LPTC in the second system L2, and (iii) the absolute angle θa_C based on the detection value of the external sensor 500. The absolute angles θa_A1, θa_B2, and θa_C are shared by the controllers 170 and 270 by the inter-microcomputer communications.

The details of the abnormality monitoring are substantially the same as those in the seventeenth embodiment, in which three values of the absolute angles θa_A1, θa_B2, and θa_C are compared. When a power failure occurs due to a dead battery, battery replacement, or the like, abnormality monitoring is performed by comparing the absolute angles θa_A1 and θa_C, and when the count value NPTC becomes abnormal due to a disturbance such as a strong magnetic field or the like, abnormality monitoring is performed by comparison of the absolute angles θa_B2 and θa_C.

In the present embodiment, since three values of the absolute angles θa_A1, θa_B2, and θa_C can be used, abnormality due to power failure or disturbance is appropriately detectable. Further, abnormality monitoring is still performable in a situation of removing the drive device 400 from the steering system, by comparing (i) the absolute value θa_C based on the detection value of the external sensor 500 with (ii) an absolute angle derived from a part of the steering system on a steering wheel side of the gear. Further, the same effects as the preceding embodiments are achievable.

Twenty-First Embodiment

Figure 41:
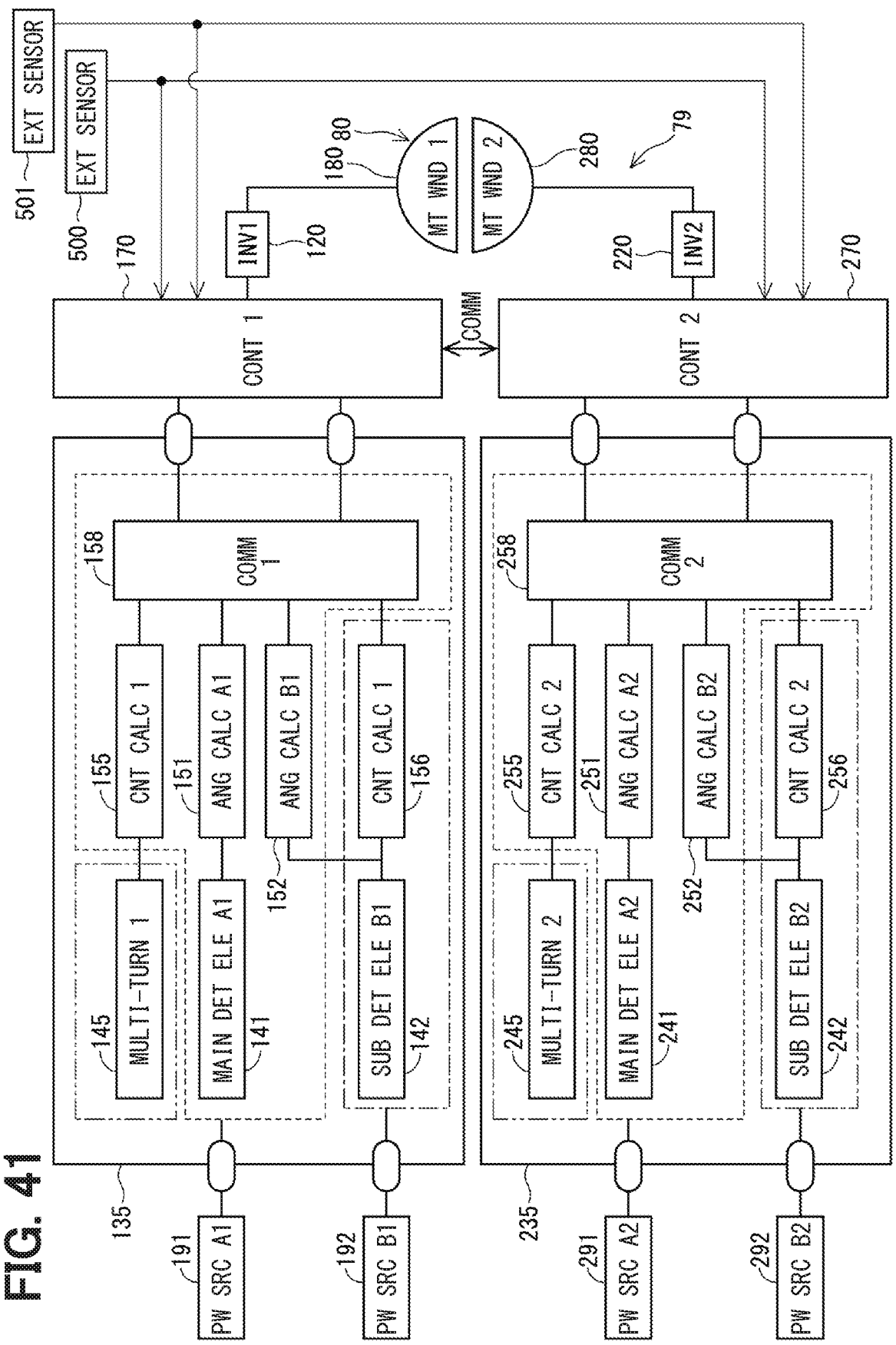
FIG. 41 is a block diagram of the rotation angle sensor and the ECU according to a twenty-first embodiment.

The twenty-first embodiment is shown in FIG. 41. The first rotation angle sensor 135 has the count calculator 156 in addition to the configuration of the first rotation angle sensor 133 of the twelfth embodiment, and receives a supply of electric power from the power source 191 when the IG is turned on, and from the power source 192 constantly, i.e., regardless of the on and off of the IG. The count calculator 156 calculates the count value LPTC1 by using the detection value of the sub detection unit 142. The communication unit 158 transmits the gear rotation angles θg_A1 and θg_B1 and the count values NPTC1 and LPTC1 to the first controller 170.

The second rotation angle sensor 235 has the count calculator 256 in addition to the configuration of the second rotation angle sensor 233 of the eighteenth embodiment, and receives supply of electric power from the power source 291 when the IG is turned on, and from the power source 292 constantly, i.e., regardless of the on and off of the IG. The communication unit 258 transmits the gear rotation angles θg_A2 and θg_B2 and the count values NPTC2 and LPTC2 to the second controller 270. Although the second rotation angle sensor 235 has one multi-turn detection unit 245, a more robust system can be constructed by using a plurality of the multi-turn detection units 245 for redundancy. The same applies to the first rotation angle sensor 135.

The controllers 170 and 270 can obtain external detection values that can be converted into the absolute angles from the two external sensors 500 and 501. The external sensors 500 and 501 are, for example, steering sensors, stroke sensors, or the like, and may be of the same type or of different types. In the seventeenth embodiment and the eighteenth embodiment, external detection values may also be obtained from a plurality of external sensors, just like other embodiments.

In the present embodiment, in each system, two gear rotation angles θg, the count values NPTC, LPTC, and external detection values from two external sensors 500 and 501 can be used, which enables majority decision in respective systems for identification of abnormality. Further, control using a normal detection value is continuable. Further, even when one of the rotation angle sensors 135 and 235 fails, the controllers 170 and 270 share the detection value of the normal rotation angle sensor by the inter-microcomputer communications, thereby enabling continuation of motor control in two systems. Further, the same effects as the preceding embodiments are achievable.

In the above embodiments, the steering shaft 92 is a "detection object," the output shaft gear 26 is a "detection object gear," the multipole magnet 15 is a "magnet," the count calculators 55, 155, and 255 are a "multiple rotation position calculation unit," the absolute angle calculators 75, 175, and 275 are an "absolute position calculator." Further, the count value TC is "multiple rotation position information," the gear rotation angle θg and the motor rotation angle θm are "rotation angle information," the shaft-side absolute angle θat is "detection object side absolute position," and the motor side absolute angle θam is "motor side absolute position."

Other Embodiments

In the above-described embodiment, the multi-turn detection unit magnetically holds the rotation position of multiple rotations. In other embodiment, the multi-turn detection unit may use a device other than a magnetic device as long as detection of a rotation position of multiple rotations is continuable without using electric power. Further, the detection gear 27 may have a greater size than the output shaft gear 26. Even with such a configuration, it is possible to detect rotation position of multiple rotations without using electric power. Further, such a configuration enables reduction of the number of parts as compared with a normal steering sensor.

In addition, "the detection of the rotation position of multiple rotations continuable without a supply of electric power from the outside" is not limited to the detection by using magnetism without a supply of electric power or the like as shown in the above-described embodiment. By providing an internal battery in the sensor, the detection of the rotation position of multiple rotations may be continued without a supply of electric power from the outside. In other embodiment, when the count value TC reaches the maximum value Cmax, the count value may be subsequently counted "up" to the minimum value Cmin, and when the count value TC reaches the minimum value Cmin, the count value may be subsequently counted down to the maximum value Cmax. That is, the value TC may be counted in loop.

In the above-described embodiment, the control unit is used for an electric power steering device. In other embodiments, the control unit may be used in a steer-by-wire system. In the above embodiment, the multi-turn detection unit is provided in the torque sensor unit. In other embodiment, the multi-turn detection unit may be provided at a position other than the torque sensor unit. For example, when torque detection is not required, such as a steer-by-wire system, the torque sensor unit may be arranged at any position where a detection gear can be arranged, such as a rack gear or a steering wheel side of a steering shaft.

Further, the control unit can be suitably applied to applications requiring a number of rotations and a rotation angle other than the steer-by-wire system. Furthermore, if a stroke position is converted into a rotating system by using gears, the present disclosure can be applied to a stroke sensor.

In the eleventh embodiment, a steering sensor and a stroke sensor are described as the external sensors. In other embodiment, an analysis value of an image obtained by a laser displacement meter or by a camera may be used as the external sensor.

In the above-described embodiment, communication between the controllers is performed by the inter-microcomputer communications. In other embodiment, communication between the controllers may be performed via a vehicle communication network such as CAN, for example, instead of the inter-microcomputer communications.

In the above-described embodiment, one sensor unit is provided with one multi-turn detection unit and one or two position detection units. In other embodiment, one or more sensor units may be provided with two or more multi-turn sensors or three or more position detection units.

In the above-described embodiment, one controller is provided for one sensor unit, and the number of systems is one or two. In other embodiment, the number of systems may be three or more. Further, one controller may be provided for a plurality of sensor units, or one sensor unit may be provided for a plurality of controllers.

In the above-described embodiment, the motor is a three-phase brushless motor. In other embodiment, the motor is not limited to a three-phase brushless motor, but may be any motor. Further, the motor is not limited to the electric motor, and may be a generator, or a so-called motor generator having both functions of the electric motor and the generator. In the above-described embodiment, the inverter and the motor winding are of two systems. In another embodiment, the number of inverters and motor windings may be one or three or more. Further, the numbers of inverter windings and motor windings may be different. In the above-described embodiment, the control unit is applied to the electric power steering device. In other embodiment, the control unit may be applied to other device different from the electric power steering device.

The controller described in the present disclosure and the method thereof may be realized by a dedicated computer that is configured as a combination of a processor and a memory programmed to perform one or more functions embodied by a computer program. Alternatively, the controller described in the present disclosure and the method thereof may be realized by a dedicated computer that is provided as a configuration of a processor including one or more dedicated hardware logic circuits. Alternatively, the controller and the method described in the present disclosure may be realized by one or more dedicated computers which is provided as a combination of (i) a processor and a memory programmed to perform one or more functions and (ii) a processor configured by one or more hardware logic circuits. Further, the computer programs mentioned above may be stored, as instructions executable by a computer, in a tangible, non-transitory, computer-readable storage medium. The present disclosure is not limited to the above embodiments, but may encompass various modifications implementable without departing from the spirit of the present disclosure. The present disclosure is not limited to the above-described embodiment, and various modifications may be implemented without departing from the spirit of the present disclosure.

What is claimed is:

1. A detection device comprising:
a multi-turn detection unit configured to continually detect a rotation position of multiple rotations of a detection object without supply of electric power from outside;
a position detector configured to detect a rotation position in one rotation of the detection object;
a multiple rotation position calculator configured to calculate multiple rotation position information related to the rotation position of multiple rotations based on a detection value of the multi-turn detection unit, the multiple rotation position information being a count value that divides one rotation of the detection object by an integer of 1 or more; and
an angle calculator configured to calculate rotation angle information related to the rotation position in one rotation based on a detection value of the position detector, wherein
the multiple rotation position information is a count value either counted up or down according to a rotation direction by a number of n, where n is the integer of 1 or more, in one rotation of the detection object, and
the multiple rotation position calculator is configured to count the count value as a number m between an upper limit value and a lower limit value, where m is an integer of 2n or more, and, upon having the count value reaching the upper limit value, count up the count value to the lower limit value in a subsequent count up and, upon having the count value reaching the lower limit value, count down the count value to the upper limit value in a subsequent count down,
the detection device further comprising, in the multiple rotation position calculator,
a first multiple rotation position calculator configured to calculate the multiple rotation position information based on a detection value of the multi-turn detection unit, and
a second multiple rotation position calculator configured to calculate the multiple rotation position information based on a detection value of the position detector,
wherein the first multiple rotation position calculator and the second multiple rotation position calculator are provided as a heterogeneously-redundant configuration for the calculation of the multiple rotation information, and electric power is constantly supplied to the position detector and the second multiple rotation position calculator respectively providing a detection value for the calculation of the multiple rotation position information.

2. The detection device of claim 1, wherein
the multiple rotation position calculator is configured to initialize the count value, and, upon having the multiple rotation position information normally initialized, start the counting of the count value.

3. The detection device of claim 1, wherein
the multi-turn detection unit is configured to magnetically hold the rotation position of multiple rotations, which is readable by a supply of electric power.

4. The detection device of claim 1, wherein
the position detector comprises a plurality of position detectors, and
the detection value of at least one position detector is shared among the angle calculator and the second multiple rotation position calculator.

5. The detection device of claim 4, wherein
a configuration of a detection element is respectively different among the plurality of position detectors.

6. A control unit comprising:
a detection device having:
  a multi-turn detection unit configured to continue detection of a rotation position of multiple rotations of a detection object without supply of electric power from outside;
  a position detector configured to detect a rotation position in one rotation of the detection object;
  a multiple rotation position calculator configured to calculate multiple rotation position information related to the rotation position of multiple rotations based on a detection value of the multi-turn detection unit, the multiple rotation position information being a count value that divides one rotation by an integer of 1 or more; and
  an angle calculator configured to calculate rotation angle information related to the rotation position in one rotation based on a detection value of the position detector; and
a controller configured to obtain information related to a rotation of the detection object from the detection device, wherein
the detection device or the controller includes an absolute position calculator calculating an absolute position as a displacement amount from a reference position based on the multiple rotation position information and the rotation angle,
the multiple rotation position information is a count value either counted up or down according to a rotation direction by a number of n, where n is the integer of 1 or more, in one rotation of the detection object, and
the multiple rotation position calculator is configured to count the count value as a number m between an upper limit value and a lower limit value, where m is an integer of 2n or more, and, upon having the count value reaching the upper limit value, count up the count value to the lower limit value in a subsequent count up and, upon having the count value reaching the lower limit value, count down the count value to the upper limit value in a subsequent count down,
the detection device further includes, in the multiple rotation position calculator, a first multiple rotation position calculator configured to calculate the multiple rotation position information based on a detection value of the multi-turn detection unit, and
a second multiple rotation position calculator configured to calculate the multiple rotation position information based on a detection value of the position detector,
wherein the first multiple rotation position calculator and the second multiple rotation position calculator are provided as a heterogeneously-redundant configuration for the calculation of the multiple rotation information, and
electric power is constantly supplied to the position detector and the second multiple rotation position calculator respectively providing a detection value for the calculation of the multiple rotation position information.

7. The control unit of claim 6, wherein
the multiple rotation position information is a count value either counted up or down according to a rotation direction by a number of n, where n is the integer of 1 or more, in one rotation of the detection object.

8. The control unit of claim 6, wherein
the absolute position calculator calculates the absolute position by using a corrected value of the multiple rotation position information corrected by a rotation information correction value.

9. The control unit of claim 6, wherein
the controller obtains an external detection value from an external sensor which is convertible to the absolute position.

10. The control unit of claim 6, wherein
the controller is provided with an abnormality monitor configured to monitor abnormality based on a plurality of the absolute positions calculated by using respectively different detection values.

11. A detection device comprising:
a rotation detection unit configured to continue detection of a rotation position of a rotor as a detection object; and
a count calculator configured to calculate a count value, which divides one rotation of the detection object by an integer of 1 or more, either counted up or down according to a rotation direction by n times during one rotation of the detection object, where n is the integer of 1 or more, wherein
the count calculator is configured to count, as a count value, a number m between a lower limit value and an upper limit value, where m is an integer of 2n or more, the count value either (i) set to the lower limit value next time the count value is counted up after reaching the upper limit value or (ii) set to the upper limit value next time the count value is counted down after reaching the lower limit value,
the detection device further comprises, in a multiple rotation position calculator,
a first multiple rotation position calculator configured to calculate multiple rotation position information based on a detection value of a multi-turn detection unit, which is configured to continually detect a rotation position of multiple rotations of a detection object without supply of electric power from outside, and
a second multiple rotation position calculator configured to calculate the multiple rotation position information based on a detection value of the position detector, which is configured to detect the rotation position in one rotation of the detection object, wherein the first multiple rotation position calculator and the second multiple rotation position calculator are provided as a heterogeneously-redundant configuration for the calculation of the multiple rotation information, and electric power is constantly supplied to the position detector and the second multiple rotation position calculator respectively providing a detection value for the calculation of the multiple rotation position information.

12. A control unit comprising:
a detection device comprising:
a multi-turn detection unit configured to continue detection of a rotation position of multiple rotations of a detection object driven by a motor without supply of electric power from outside;
a position detector configured to detect a rotation position in one rotation of the detection object;
a multiple rotation position calculator configured to calculate multiple rotation position information related to the rotation position of multiple rotations based on a detection value of the multi-turn detection unit, the multiple rotation position information being a count value that divides one rotation of the detection object by an integer of 1 or more; and
an angle calculator configured to calculate rotation angle information related to the rotation position in one rotation of the detection object based on a detection value of the position detector, wherein
the multi-turn detection unit is disposed at a position different from a position of the motor,
the multiple rotation position information is a count value either counted up or down according to a rotation direction by a number of n, where n is the integer of 1 or more, in one rotation of the detection object, and
the multiple rotation position calculator is configured to count the count value as a number m between an upper limit value and a lower limit value, where m is an integer of 2n or more, and, upon having the count value reaching the upper limit value, count up the count value to the lower limit value in a subsequent count up and, upon having the count value reaching the lower limit value, count down the count value to the upper limit value in a subsequent count down, and
a controller for controlling a drive of a motor, wherein
the detection device or the controller includes an absolute position calculator configured to calculate an absolute position representing a displacement amount of the detection object from a reference position based on the multiple rotation position information and the rotation angle information,
a motor rotation angle sensor configured to detect a rotation angle of the motor, wherein
the absolute position calculator calculates the absolute position based on (i) the multiple rotation position information based on the detection value of the multi-turn detection unit and (ii) the rotation angle information based on the detection value of the motor rotation angle sensor, and the controller includes an abnormality monitoring unit configured to monitor abnormality based on a detection object side absolute position and a motor side absolute position, wherein the abnormality monitoring unit determines, when (i) a difference between the detection object side absolute position and the motor side absolute position is equal to or greater than an abnormality threshold value and (ii) no abnormality history is recorded for the detection device nor the controller, that a shift has occurred at a connection between a detection target and a motor.

13. The control unit of claim 12, wherein
the multi-turn detection unit is configured to magnetically hold the rotation position of the multiple rotations, and read the rotation position held therein by supplying electric power.

14. The control unit of claim 12, wherein
the multi-turn detection unit is provided in a sensor unit having a torque sensor that detects a torque input to the detection object.

15. The control unit of claim 14, wherein
the torque sensor is configured to detect a change in magnetic flux of a magnet that rotates integrally with the detection object, and
the multi-turn detection unit detects the rotation position of the magnet.

16. The control unit of claim 12, wherein
the multi-turn detection unit is configured to detect the rotation position of a detection gear that engages with a detection object gear that rotates integrally with the detection object.

17. The control unit of claim 16, wherein
the multi-turn detection unit is provided in a sensor unit having a torque sensor that detects a torque input to the detection object, and
the sensor unit has a gear fixing mechanism applied thereto configured to fix the detection object gear and the detection gear when the detection object gear, the detection gear and the multi-turn detection unit are assembled onto the detection object.

18. The control unit of claim 12, wherein
the multi-turn detection unit is configured to perform an initialization process that initializes the detection value.

19. The control unit of claim 5, wherein
the multiple rotation detection unit is configured to learn a reference value after operating the detection object from one end to another end of an operation range.

20. The control unit of claim 12, wherein the absolute position calculator calculates, as the absolute position, (i) the detection object side absolute position based on the detection values of the multi-turn detection unit and the position detection unit and (ii) the motor side absolute position based on the detection value of the motor rotation angle sensor.

* * * * *